(12) United States Patent
Noda et al.

(10) Patent No.: US 8,055,777 B2
(45) Date of Patent: Nov. 8, 2011

(54) ESTABLISHING CALL OVER INTRANET AND EXTERNAL NETWORK VIA DMZ

(75) Inventors: Masahide Noda, Kawasaki (JP); Kenichi Horio, Kawasaki (JP); Masaaki Noro, Kawasaki (JP); Noriyuki Fukuyama, Kawasaki (JP); Hideaki Miyazaki, Kawasaki (JP); Masanobu Morinaga, Kawasaki (JP); Masahiro Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 804 days.

(21) Appl. No.: 10/361,726

(22) Filed: Feb. 11, 2003

(65) Prior Publication Data
US 2003/0161297 A1 Aug. 28, 2003

(30) Foreign Application Priority Data

Feb. 26, 2002 (JP) .................................. 2002-049371
Nov. 25, 2002 (JP) .................................. 2002-341227

(51) Int. Cl.
*G06F 15/16* (2006.01)
(52) U.S. Cl. .................................. 709/227; 709/229
(58) Field of Classification Search .................. 709/227, 709/229, 230, 238
See application file for complete search history.

(56) References Cited

U.S. PATENT DOCUMENTS

| | | | | |
|---|---|---|---|---|
| 5,867,494 A | * | 2/1999 | Krishnaswamy et al. | 370/352 |
| 6,611,498 B1 | * | 8/2003 | Baker et al. | 370/252 |
| 6,633,985 B2 | * | 10/2003 | Drell | 726/11 |
| 6,956,845 B2 | * | 10/2005 | Baker et al. | 370/352 |

FOREIGN PATENT DOCUMENTS

| | | | |
|---|---|---|---|
| JP | 02002190827 A | * | 12/2000 |
| WO | 00/70839 | | 11/2000 |

OTHER PUBLICATIONS

H323PROXY Server (http://www3.noc.intec.co.jp/products/H323Proxy/.
INTEC Web and Genome Informatics Corporation (2000-2001) "H323Proxy Server Over View" pp. 1-9, Jun. 8, 2001.

* cited by examiner

*Primary Examiner* — Faruk Hamza
(74) *Attorney, Agent, or Firm* — Staas & Halsey LLP

(57) ABSTRACT

An information processing apparatus can be installed in a DMZ and is connectable to an intranet and to an external network. The apparatus includes first means for transmitting or receiving a signal over the intranet, and transmitting or receiving a signal over the external network, to cause a call to be established over both of the intranet and the external network; and second means for transmitting and receiving data over the established call.

11 Claims, 44 Drawing Sheets

ESTABLISHING CALL OVER INTRANET AND EXTERNAL NETWORK VIA DMZ

FIELD OF THE INVENTION

The present invention relates to communication between an intranet and an external network, and more particularly to establishment of a call between an intranet having a firewall and an external network.

BACKGROUND OF THE INVENTION

Telephone communication between two personal computers (PCs) over a local area network (LAN) is known. Voice over IP (VoIP) communication, which provides Internet telephone communication between two PCs over the Internet, is also known.

A technique in which, in response to a connection request from the Internet, a server in a DMZ (DeMilitarized Zone) sends a connection request to a terminal on an intranet via a firewall is known in, for example, literature "H323ProxyServer" of INTEC Web and Genome Informatics Corporation [searched on Oct. 23, 2002, URL:http:www3.noc.intec.co.jp/products/H323Proxy/]. However, once an access from such a server to a terminal on an intranet is allowed, there arises the possibility that a malicious user may perform an illegal access or the like to an apparatus on the intranet.

There is a need for realizing the VoIP communication between a terminal connected to an intranet having an firewall and another terminal connected to the Internet. However, it is not known how the VoIP communication can be realized between such two terminals, while allowing an firewall that is necessary for security to effectively operate.

The inventors have recognized that the VoIP communication between a terminal on an intranet and another terminal on the Internet can be realized by terminating calls for both of the terminals in a DeMilitarized Zone (DMZ) between the intranet and the Internet and associating the one call with other call.

It is an object of the invention to realize a call to be established between a terminal connected to an intranet and another terminal connected to an external network.

It is another object of the invention to realize multimedia communication between a terminal connected to an intranet and another terminal connected to an external network.

It is a further object of the invention to realize, in a safer manner, a call to be established between a terminal connected to an intranet and another terminal connected to an external network.

SUMMARY OF THE INVENTION

In accordance with an aspect of the present invention, an information processing apparatus can be installed in a DMZ and is connectable to an intranet and to an external network. The apparatus includes first means for transmitting or receiving a signal over the intranet, and transmitting or receiving a signal over the external network, to cause a call to be established over both of the intranet and the external network; and second means for transmitting and receiving data over the established call.

In accordance with another aspect of the invention, an information processing apparatus can be installed in a DMZ and is connectable to an intranet and to an external network. The apparatus includes first means for causing connections to be established over the intranet and the external network, respectively, wherein at least a connection in a direction from said intranet to said external network is caused to be established. The first means further causes a call to be established over the established connections. The apparatus further includes second means for transmitting and receiving data over the established call.

In accordance with a further aspect of the invention, an information processing apparatus is connectable to another apparatus in a DMZ and to an intranet. The apparatus includes first means for establishing a connection with the other apparatus, and thereafter causing a connection to be established over the intranet and then transmitting or receiving a signal over the intranet, to thereby cause a call to be established between the other apparatus and a terminal; and second means for transmitting and receiving data over the established call.

In accordance with a still further aspect of the invention, a program (which may be stored on a storage medium) is provided for use in an information processing apparatus, which can be installed in a DMZ and is connectable to an intranet and to an external network. The program is operable to effect the step of transmitting or receiving a signal over the intranet, and transmitting or receiving a signal over the external network, to cause a call to be established over both of the intranet and the external network; and the step of transmitting and receiving data over the established call.

In accordance with a still further aspect of the invention, a program (which may be stored on a storage medium) is provided for use in an information processing apparatus, which can be installed in a DMZ and is connectable to an intranet and to an external network. The program is operable to effect the step of causing connections to be established over the intranet and the external network, respectively, wherein at least a connection in a direction from said intranet to said external network is caused to be established; the step of causing a call to be established over the established connections; and the step of transmitting and receiving data over the established call.

In accordance with a still further aspect of the invention, a program (which may be stored on a storage medium) is provided for use in an information processing apparatus which is connectable to another apparatus in a DMZ and to an intranet. The program is operable to effect the step of establishing a connection with the other apparatus, and thereafter causing a connection to be established over the intranet and then transmitting or receiving a signal over the intranet, to thereby cause a call to be established between the other apparatus and a terminal; and the step of transmitting and receiving data over the established call.

In accordance with a still further aspect of the invention, a method for communication is for use in a DMZ, which is connectable to an intranet and to an external network. The method comprises the step of transmitting or receiving a signal over the intranet, and transmitting or receiving a signal over the external network, to cause a call to be established over both of the intranet and the external network; and the step of transmitting and receiving data over the established call.

In accordance with a still further aspect of the invention, a method for communication is for use in a DMZ, which is connectable to an intranet and to an external network. The method comprises the step of causing connections to be established over the intranet and the external network, respectively, wherein at least a connection in a direction from said intranet to said external network is caused to be established; the step of causing a call to be established over the established connections; and the step of transmitting and receiving data over the established call.

In accordance with a still further aspect of the invention, a method for communication is for use on an intranet, which is connectable to an apparatus in a DMZ. The method comprises the step of establishing a connection with the other apparatus, and thereafter causing a connection to be established over the intranet and then transmitting or receiving a signal over the intranet, to thereby cause a call to be established between the other apparatus and a terminal; and the step of transmitting and receiving data over the established call.

In accordance with a still further aspect of the invention, an information processing apparatus is connectable to another apparatus in a DMZ and to an intranet. The apparatus includes: first means for intermittently establishing a first connection for monitoring with the other apparatus, to detect presence of a call connection request by an external terminal, establishing a second connection for signaling with the other apparatus in response to detection of presence of the call connection request, to receive a signal related to the call connection request, and establishing a call with the other apparatus; and second means for establishing a third connection for data communication with the other apparatus over the established call, to transmit and receive data.

In accordance with a still further aspect of the invention, an information processing apparatus is connectable to another apparatus in a DMZ and to an intranet. The apparatus includes: first means for intermittently establishing a first connection with the other apparatus, to detect presence of a call connection request by an external terminal, changing the first connection to be maintained, in response to detection of presence of the call connection request, to receive a signal related to the call connection request, and establishing a call with the other apparatus over the first connection; and second means for establishing a second connection for data communication with the other apparatus over the established call, to transmit and receive data.

In accordance with a still further aspect of the invention, an information processing apparatus which is connectable to another apparatus in a DMZ and to an intranet. The apparatus includes: first means for detecting presence of a call connection request by an external terminal in the other apparatus via a message which is reachable to the intranet, such as an electronic mail; second means for establishing a first connection for signaling with the other apparatus in response to detection of presence of the call connection request, to receive a signal related to the call connection request, and establishing a call with the other apparatus; and third means for establishing a second connection for data communication with the other apparatus over the established call, in response to detection of presence of the call connection request, to transmit and receive data.

In accordance with a still further aspect of the invention, a program (which may be stored on a storage medium) is provided for use in for an information processing apparatus which is connectable to another apparatus in a DMZ and to an intranet. The program is operable to effect the steps of intermittently establishing a first connection for monitoring with the other apparatus, to detect presence of a call connection request by an external terminal, establishing a second connection for signaling with the other apparatus in response to detection of presence of the call connection request, to receive a signal related to the call connection request, and establishing a call with the other apparatus; and the step of establishing a third connection for data communication with the other apparatus over the established call, to transmit and receive data.

In accordance with a still further aspect of the invention, a program (which may be stored on a storage medium) is provided for use in an information processing apparatus which is connectable to another apparatus in a DMZ and to an intranet. The program is operable to effect the step of intermittently establishing a first connection with the other apparatus, to detect presence of a call connection request by an external terminal, changing the first connection to be maintained, in response to detection of presence of the call connection request, to receive a signal related to the call connection request, and establishing a call with the other apparatus over the first connection; and the step of establishing a second connection for data communication with the other apparatus over the established call, to transmit and receive data.

In accordance with a still further aspect of the invention, a method for communication on an intranet, which is connectable to an apparatus in a DMZ. The method comprises the step of intermittently establishing a first connection for monitoring with the apparatus, to detect presence of a call connection request by an external terminal, establishing a second connection for signaling with the apparatus in response to detection of presence of the call connection request, to receive a signal related to the call connection request, and establishing a call with the apparatus; and the step of establishing a third connection for data communication with the apparatus over the established call, to transmit and receive data.

According to the invention, a call can be established between a terminal connected to an intranet and another terminal connected to an external network, and multimedia communication can be realized between the terminals, while ensuring security of the intranet.

Throughout the drawings, similar symbols and numerals indicate similar items and functions.

BRIEF DESCRIPTION OF THE DRAWINGS

FIG. 21 also shows multimedia communication protocols which are used in communication between the management section of the SIG. C. component and the connection management information transmitting/receiving section of the MM. C. component in the MM. C. server of FIGS. 7 and 9, and between the management section of the SIG. C. relay component and the connection management information transmitting/receiving section of the MM. C. relay component in the MM. C. relay server of FIGS. 8 and 10.

DESCRIPTION OF THE PREFERRED EMBODIMENTS

Figure 1:
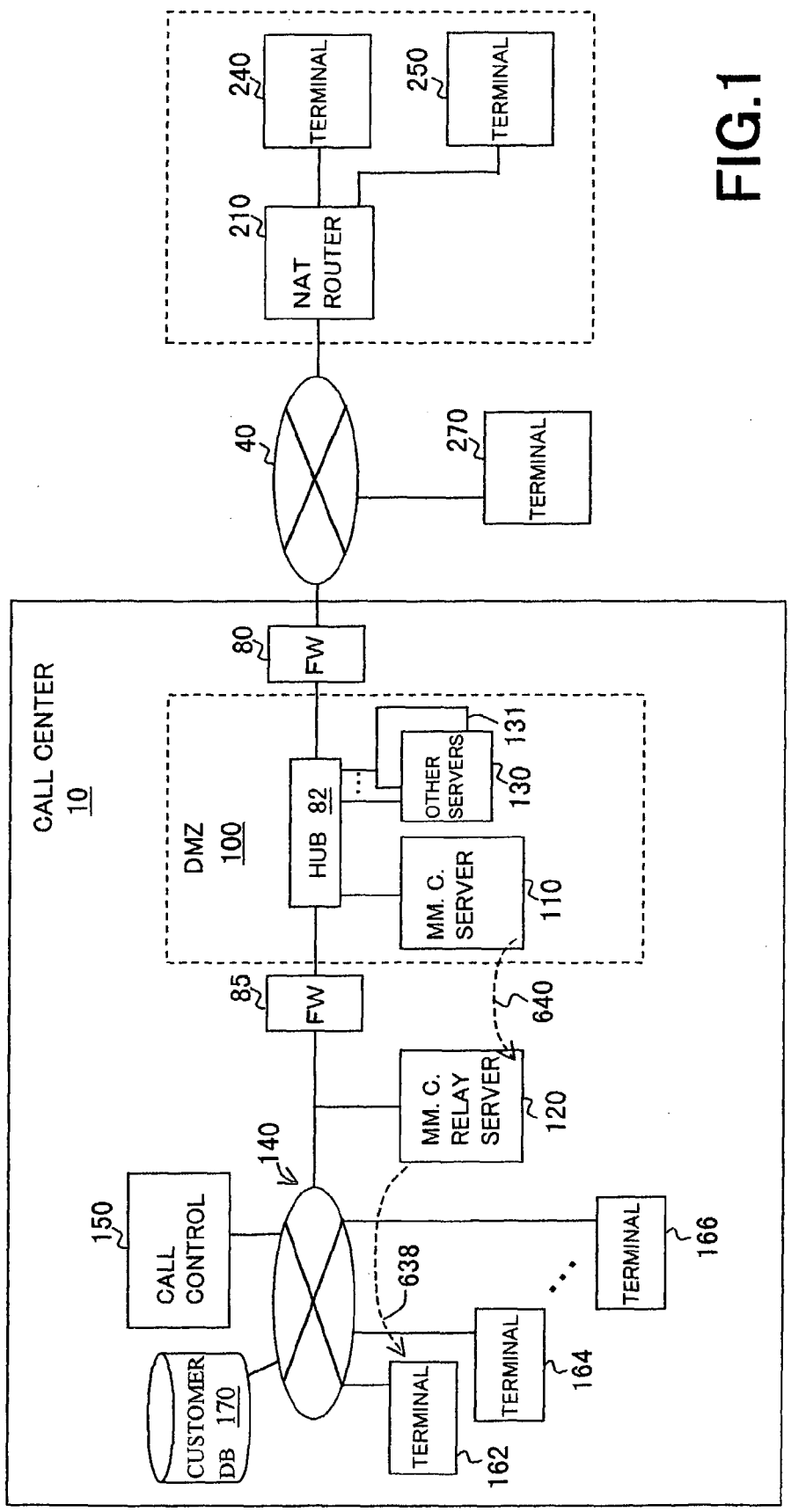
FIG. 1 shows the configuration of a system including an intranet connected to servers and terminals, and an external network connected to external terminals, in accordance with the invention.

FIG. 1 shows the configuration of a system including an intranet 140 connected to servers and terminals, and an external network 40 connected to external terminals, in accordance with an embodiment of the present invention. The intranet 140 is a local area network (LAN) in a call center 10. Typically, the external network 40 is the Internet, and may include an ISDN, a PSTN, an ADSL, a cable television network or the like.

In the call center 10, a firewall (FW) 80 is connected between a DeMilitarized Zone (DMZ) 100 and the external network 40, and an firewall 85 is connected between the DMZ 100 and the intranet 140. A multimedia communication (MM. C.) server 110 and other servers 130 to 131 are connected to a hub 82 of a communication line in the DMZ 100 between the firewalls 80 and 85. A multimedia communication (MM. C.) relay server 120 is connected to the intranet 140 and to the firewall 85, and to a communication line between the intranet 140 and the firewall 85 in this embodiment.

A call controlling apparatus 150, a plurality of terminals 162 to 166, and a customer database 170 for authentication or the like are connected to the intranet 140. The customer database 170 is referred to by the servers 110 and 130 to 131, and referred to by an operator or agent on the terminals 162 to 166 during conversation over a call with a customer. A plurality of terminals 240 and 250 on the premises are connected to the external network 40 via a Network Address Translation (NAT) router 210, and also a single terminal 270 is connected to the external network 40.

Figure 2:
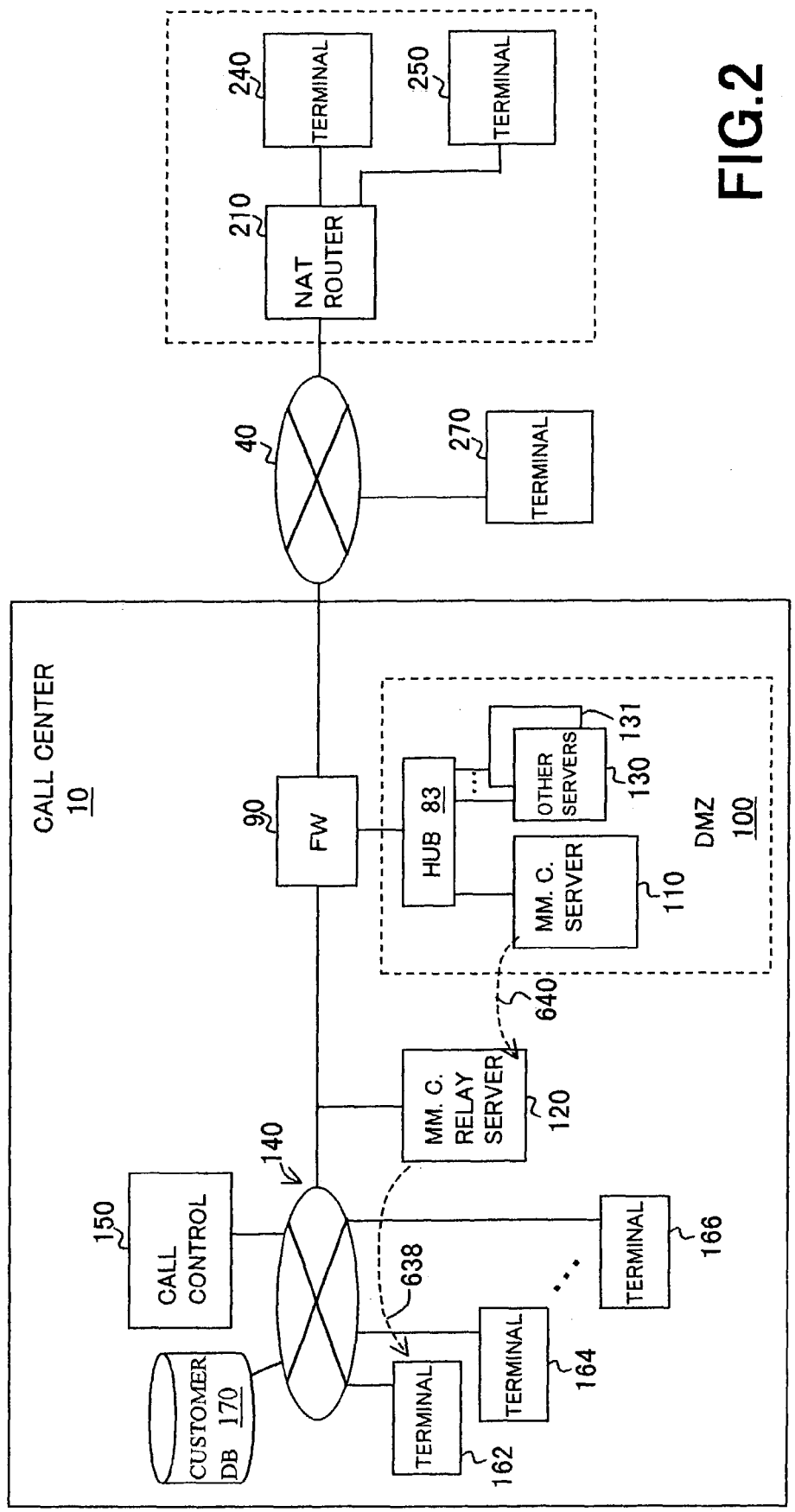
FIG. 2 shows the configuration of another system including the intranet and the external network, in accordance with the invention.

FIG. 2 shows the configuration of another system including the intranet 140 and the external network 40, in accordance with another embodiment of the invention, which is a modification of the embodiment shown in FIG. 1. As shown in the figure, in the call center 10, a single firewall 90 is connected to the DMZ 100 between the external network 40 and the intranet 140. The MM. C. server 110 and the other servers 130 to 131 are connected to the firewall 90 via a hub 83. The MM. C. relay server 120 is connected between the intranet 140 and to the firewall 90, and to a communication line between the intranet 140 and the firewall 90 in this embodiment.

The firewalls 80 and 85 in FIG. 1, and the firewall 90 in FIG. 2 filter, in accordance with predetermined filtering rules, connection requests which are received via the external network 40 and the intranet 140, allow only a connection request that conforms to the rules to be connected to the server 110, 130, . . . or 131 in the DMZ 100, and reject a connection request which does not conform to the rules. The firewalls 80, 85 and 90 further filter, in accordance with the rules, packets which are received via the external network 40 and the intranet 140, allow only a packet that conforms to the rules to pass through them to the intranet 140, the external network 40, and the servers 110 and 130 to 131, and discard a packet which does not conform to the rules.

Figure 3:
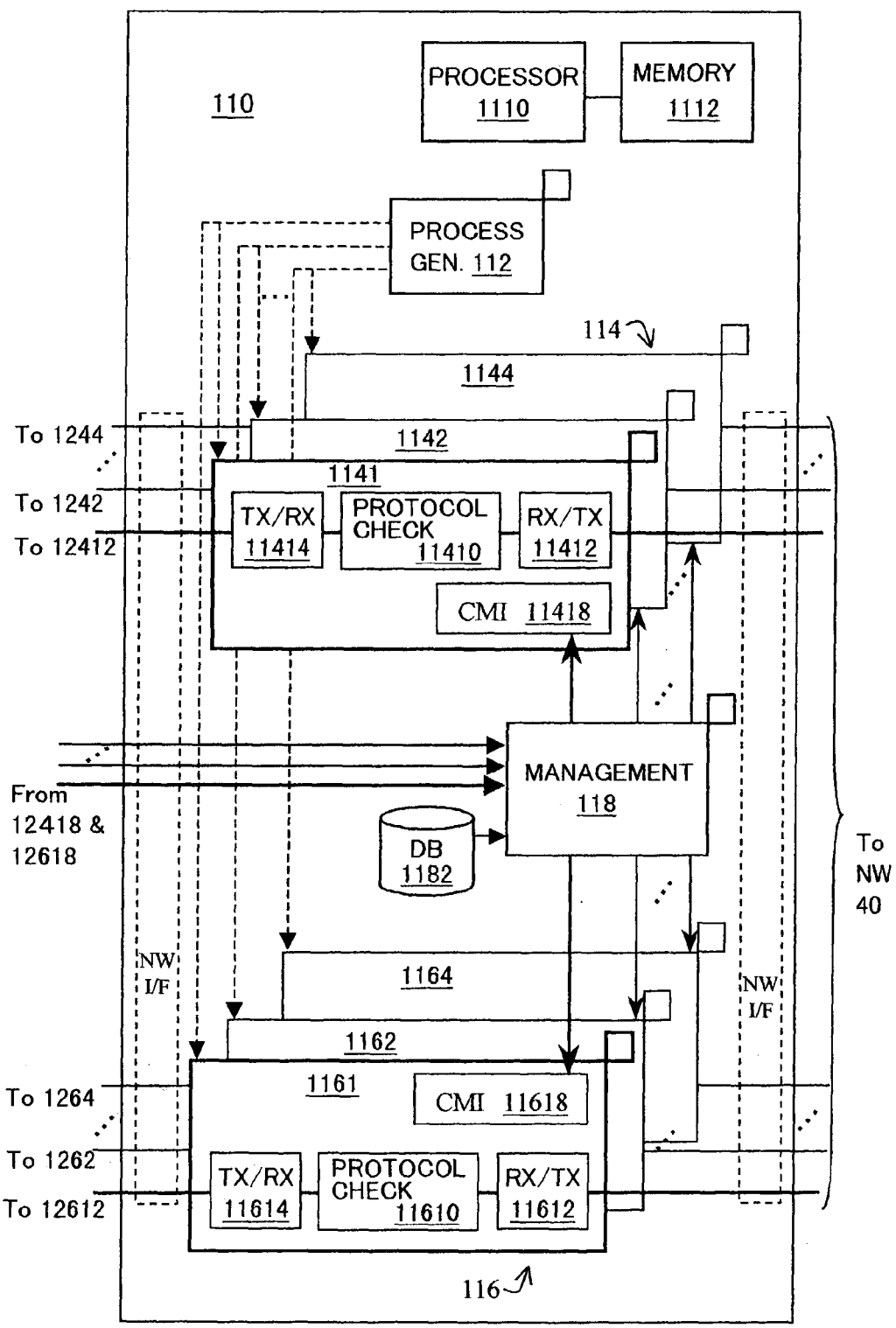
FIG. 3 shows the configuration of a multimedia communication (MM. C.) server.

FIG. 3 shows the configuration of the MM. C. server 110. The MM. C. server 110, which includes a processor 1110 and a memory or memory device 1112, is physically connected to the hub 82 via a network interface or network interfaces (NW I/F). The memory device 1112 stores a program for handling or processing signaling communication and multimedia communication to thereby couple a call or connection via the intranet 140 with another call or connection via the external network 40. A process generator 112 is implemented on the processor 1110 in accordance with the program. The process generator 112 dynamically generates signaling communication (SIG. C.) components 1141, 1142, . . . and 1144 which have the identical configuration serving as an SIG. C. section 114, and also multimedia communication (MM. C.) components 1161, 1162, . . . and 1164 which have the identical configuration serving as an MM. C. section 116. A management component 118 is further implemented on the processor 1110 in accordance with the program. Thus, ports of such components, which will be described later, are virtual.

The SIG. C. components 1141 to 1144 handle signaling communication with the external network terminals 240 to 270 over the TCP (Transmission Control Protocol) developed by the IETF (Internet Engineering Task Force), in accordance with the standard protocol H.323 for extended VoIP which is recommended by the ITU-T, or with the SIP (Session Initiation Protocol), and handle also signaling communication with the MM. C. relay server 120 over the TCP in accordance with standard H.323 based protocol. The MM. C. components 1161 to 1164 handle multimedia communication for audio, video, text and/or the like with the external network terminals 240 to 270 and with the MM. C. relay server 120 over the TCP or UDP (User Datagram Protocol), in accordance with the standard protocol RTP (Real Time Protocol)/RTCP (Real Time Control Protocol) which is defined in the RFC 1889 specification.

Figure 4:
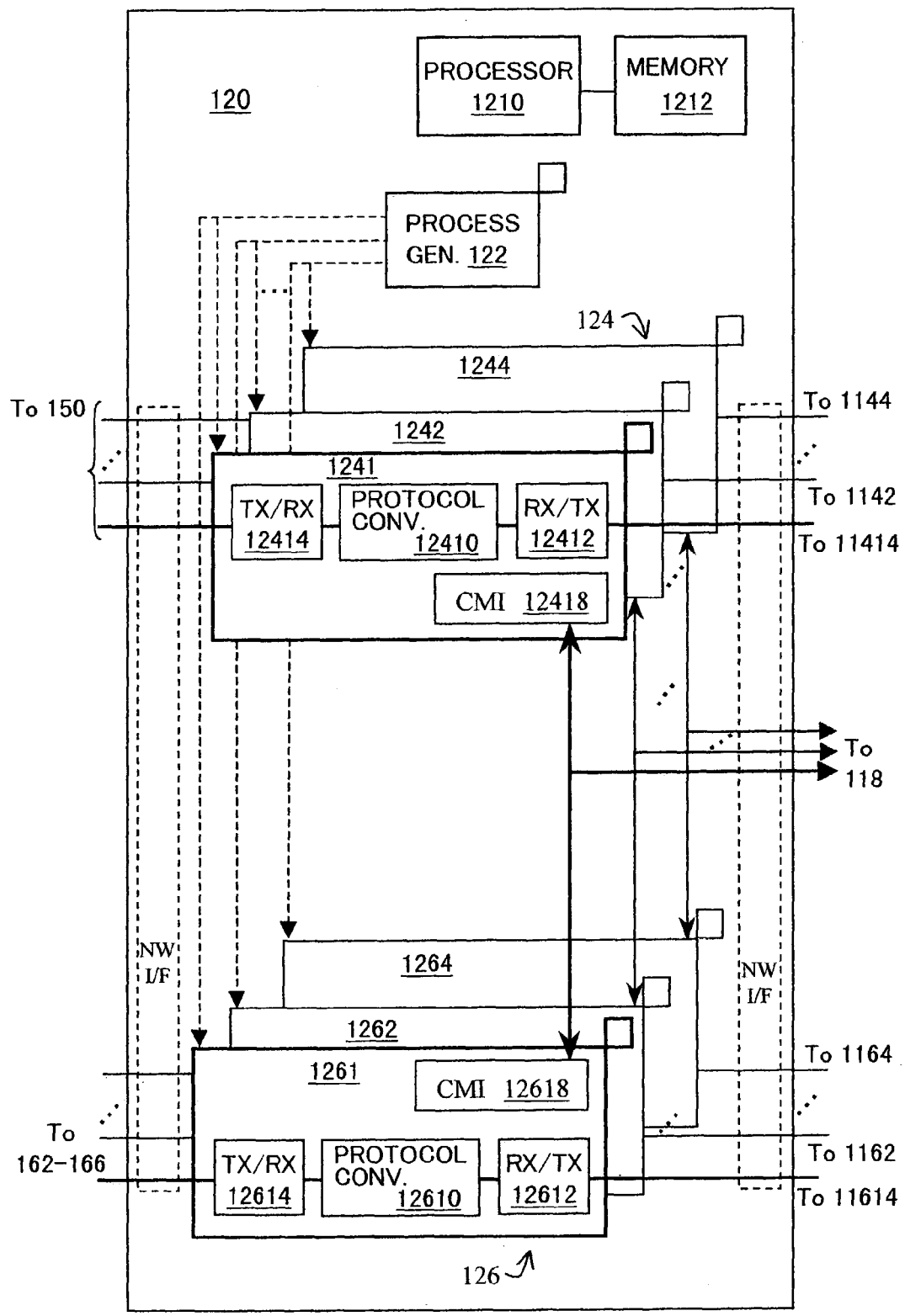
FIG. 4 shows the configuration of a MM. C. relay server which is coupled to the MM. C. server of FIG. 3.

FIG. 4 shows the configuration of the MM. C. relay server 120 which is coupled to the MM. C. server 110 of FIG. 3. The MM. C. relay server 120, which includes a processor 1210 and a memory or storage device 1212, is physically connected to the intranet 140 via the network interface (NW I/F). A program for properly relaying signaling communication and multimedia communication is stored in the memory device 1212. A process generator 122 is implemented on the processor 1210 in accordance with the program. The process generator 122 dynamically generates signaling communication (SIG. C.) relay components 1241, 1242, . . . and 1244 which have the identical configuration serving as a signaling communication (SIG. C.) section 124, and also multimedia communication (MM. C.) relay components 1261, 1262, . . . and 1264 which have the identical configuration serving as a multimedia communication (MM. C.) section 126.

The SIG. C. relay components 1241 to 1244 perform conversion between the H.323 standard which is used by the terminals 162 to 166 configured to the intranet 140, and an H.323-based signaling protocol which is used by the MM. C. server 110. The MM. C. relay components 1261 to 1264 perform conversion between the multimedia communication protocol RTP/RTCP over the UDP which is used by the terminals 162 to 166 configured to the intranet 140, and the multimedia communication protocol RTP/RTCP over the UDP implemented over the TCP which is used by the MM. C. server 110.

Referring back to FIG. 3, the SIG. C. component 1141 of the MM. C. server 110 includes: a protocol checking section 11410; a receiver/transmitter section 11412 which is connected to the terminals 240 to 270 via the network 40; a transmitter/receiver section 11414 which is connected to a corresponding receiver/transmitter section (12412) of the SIG. C. relay component 1241 in the MM. C. relay server 120 of FIG. 4; and a connection management information transmitting/receiving section 11418. The receiver/transmitter section 11412, the protocol checking section 11410, and the transmitter/receiver section 11414 are connected in series. The protocol checking section 11410 checks a TCP connection request and a signaling message in accordance with a predetermined communication protocol, and, in response to them, sends a connection response or another connection request.

Similarly, the MM. C. component 1161 includes: a protocol checking section 11610; a receiver/transmitter section 11612 which is connected to the terminals 240 to 270 via the network 40; a transmitter/receiver section 11614 which is connected to a corresponding receiver/transmitter section (12612) of the MM. C. relay component 1261 in the MM. C. relay server 120 of FIG. 4; and a connection management information transmitting/receiving section 11618. The receiver/transmitter section 11612, the protocol checking section 11610, and the transmitter/receiver section 11614 are connected in series. The protocol checking section 11610 checks a TCP connection request and a received packet of a multimedia data stream in accordance with a predetermined protocol, and, in response to them, sends a connection response or allows a conforming packet to pass therethrough and discards a nonconforming packet.

Referring to FIG. 4, the SIG. C. relay component 1241 of the MM. C. relay server 120 includes: a protocol converting section 12410; a receiver/transmitter section 12412 which is connected to the transmitter/receiver section 11414 of the corresponding SIG. C. component 1141 in the MM. C. server 110 of FIG. 3; a transmitter/receiver section 12414 which is connected to the terminals 162 to 166 via the intranet 140; and a connection management information transmitting/receiving section 12418. The receiver/transmitter section 12412, the protocol converting section 12410, and the transmitter/receiver section 12414 are connected in series. The protocol converting section 12410 performs protocol conversion for signaling and a connection request between the MM. C. server 110 and the intranet 140.

Similarly, the MM. C. relay component 1261 includes: a protocol converting section 12610; a receiver/transmitter section 12612 which is connected to the corresponding transmitter/receiver section 11614 of the MM. C. component 1161 in the MM. C. server 110 of FIG. 3; a transmitter/receiver section 12614 which is connected to the terminals 162 to 166 via the intranet 140; and a connection management information transmitting/receiving section 12618. The receiver/transmitter section 12612, the protocol converting section 12610, and the transmitter/receiver section 12614 are connected in series. The protocol converting section 12610 performs protocol conversion for a connection request and a received packet of a multimedia data stream between the MM. C. server 110 and the intranet 140.

The management component 118 manages calls in the MM. C. server 110 and the MM. C. relay server 120. The management component 118 stores management information related to calls and multimedia communication which are handled by the other components 1141 to 1144, 1161 to 1164, 1241 to 1244, and 1261 to 1264, such as an IP address and a port number of each session, into a database 1182 of the component, and, upon a request, provides the management information in the database 1182 to the other components.

The management component 118 communicates via one listen port with, for example, the connection management information transmitting/receiving section 11418 of the SIG. C. component 1141 of the MM. C. server 110, and with the connection management information transmitting/receiving section 11618 of the MM. C. component 1161, and manages and controls the association of the SIG. C. component 1141 with the MM. C. component 1161 while referring to the database 1182.

The management component 118 communicates via the listen port with, for example, the connection management information transmitting/receiving section 12418 of the SIG. C. relay component 1241 of the MM. C. relay server 120, and with the connection management information transmitting/receiving section 12618 of the MM. C. relay component 1261, and manages association of the SIG. C. relay component 1241 with the MM. C. relay component 1261 while referring to the database 1182.

The management component 118 communicates with the connection management information transmitting/receiving sections 11418, 11618, 12418, and 12618, to thereby associate the SIG. C. components 1141 to 1144 of the MM. C. server 110 with the SIG. C. relay components 1241 to 1244 of the MM. C. relay server 120, respectively, and also associate the MM. C. components 1161 to 1164 of the MM. C. server 110 with the MM. C. relay components 1261 to 1264 of the MM. C. relay server 120, respectively.

All the functions of the MM. C. relay server 120 of FIG. 4 may be incorporated as one server into the MM. C. server 110 of FIG. 3 and installed in the DMZ 100.

The call controlling apparatus 150 causes a call to be established between one of the SIG. C. components 1141 to 1144 of the MM. C. server 110, and one of the terminals 162 to 166 on the intranet 140.

Figure 5:
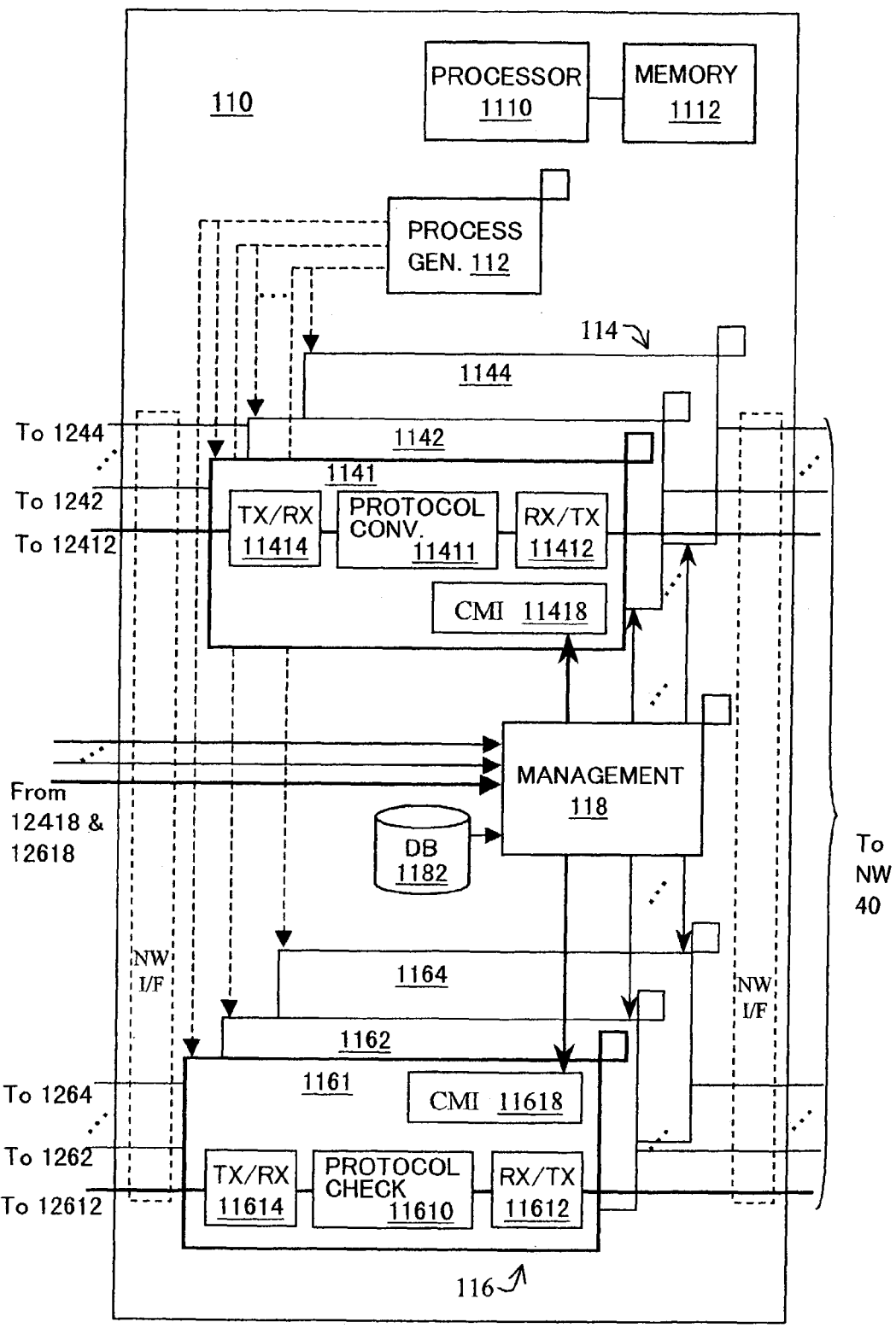
FIG. 5 shows a modification of the MM. C. server of FIG. 3.
Figure 6:
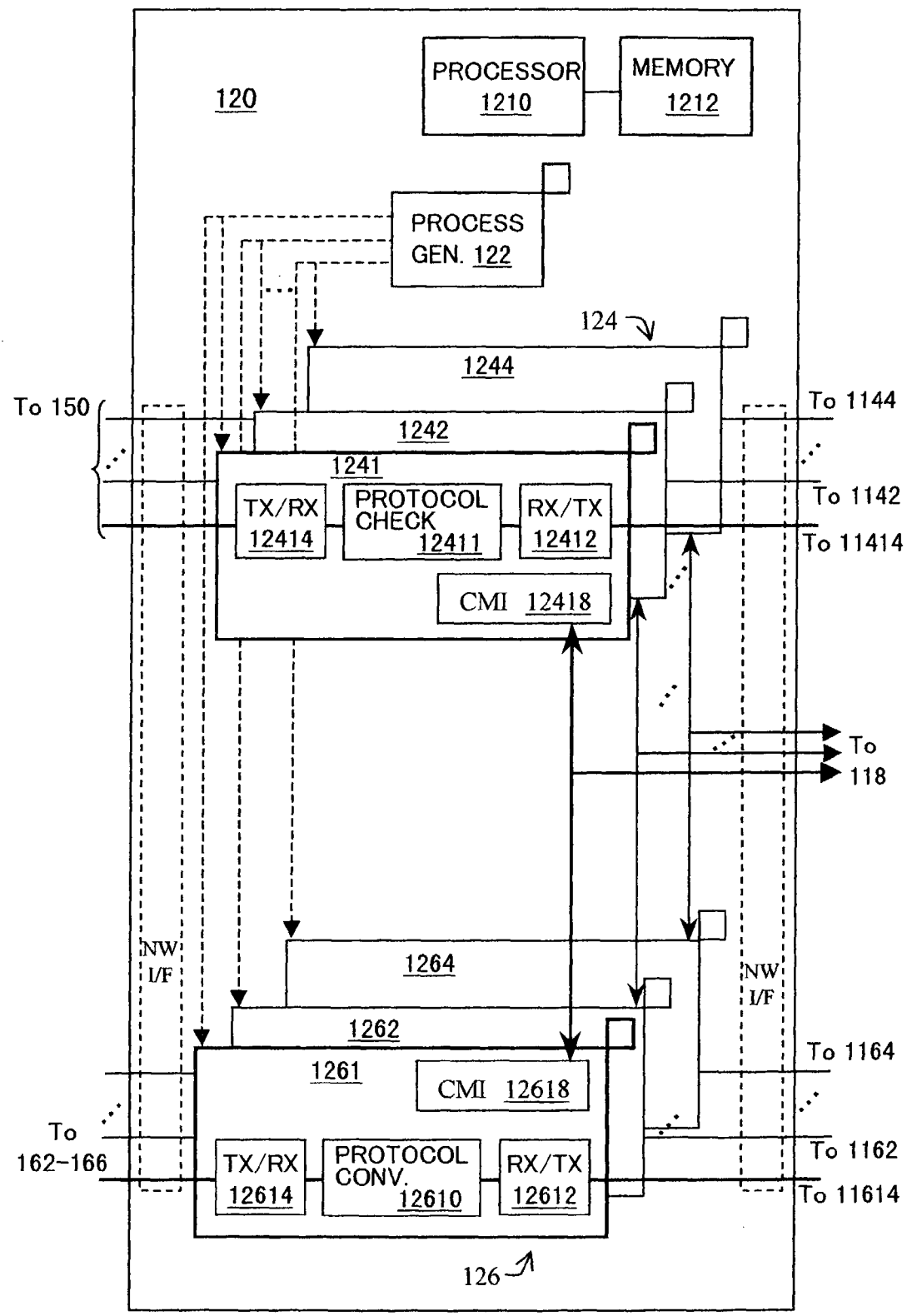
FIG. 6 shows a modification of the MM. C. relay server of FIG. 4.

FIG. 5 shows a modification of the MM. C. server 110 of FIG. 3. FIG. 6 shows a modification of the MM. C. relay server 120 of FIG. 4. In FIG. 5, the protocol checking section 11410 in FIG. 3 is replaced with a protocol converting section 11411 which is similar to the protocol converting section 12410 in FIG. 4. In FIG. 6, the protocol converting section 12410 in FIG. 4 is replaced with a protocol checking section 12411 which is similar to the protocol checking section 11410 in FIG. 3.

Figure 7:
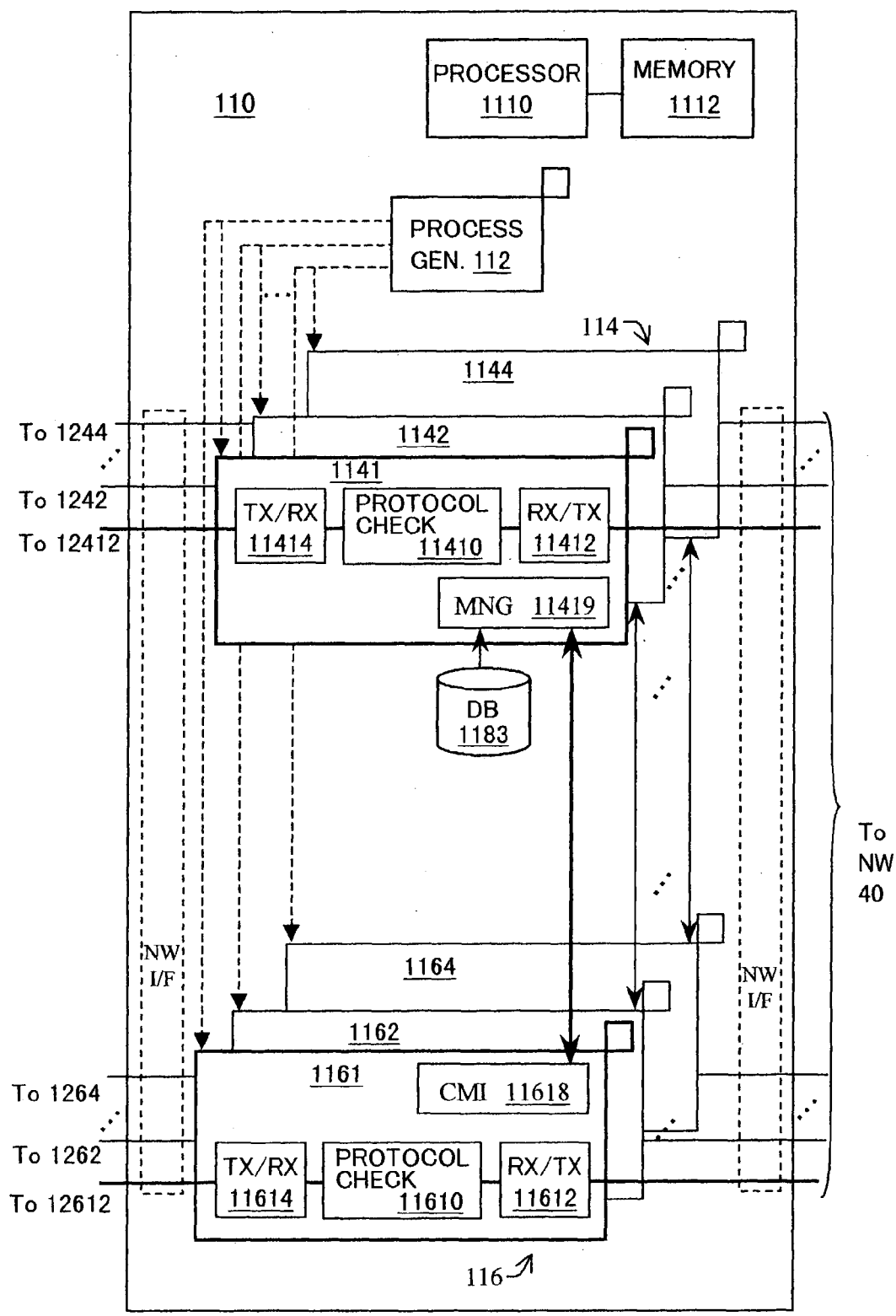
FIG. 7 shows another modification of the MM. C. server of FIG. 3.
Figure 8:
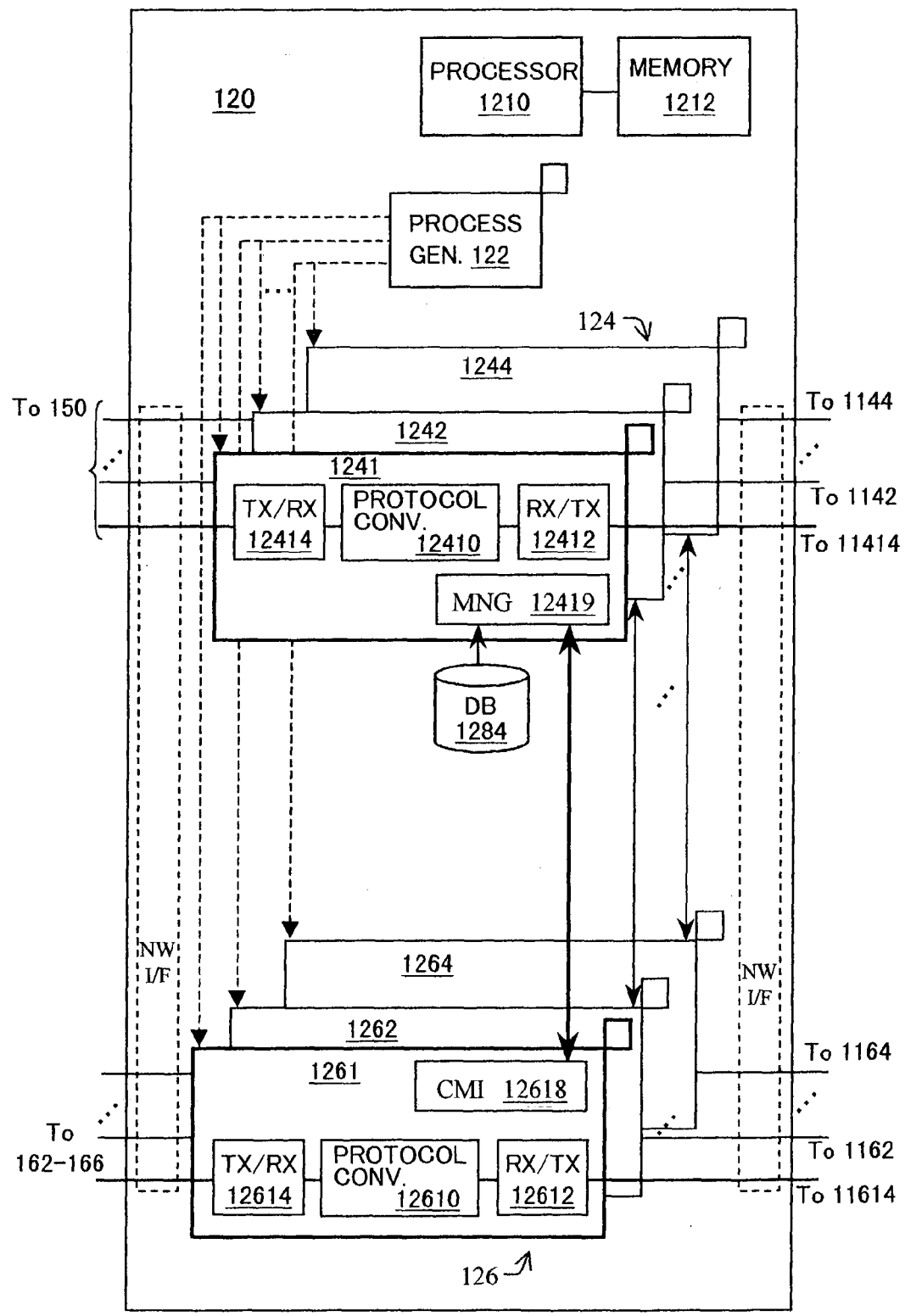
FIG. 8 shows another modification of the MM. C. relay server of FIG. 4.

FIG. 7 shows another modification of the MM. C. server 110 of FIG. 3. FIG. 8 shows another modification of the MM. C. relay server 120 of FIG. 4. In the MM. C. server 110 of FIG. 7, a component corresponding to the management component 118 in FIG. 3 is not disposed. Instead, the connection management information transmitting/receiving section 11418 in FIG. 3 is replaced with a management section 11419 which is responsible for a portion of the function of the management component 118 related to the MM. C. server 110. The connection management information transmitting/receiving section 12418 in FIG. 4 is replaced with a management section 12419 which is responsible for a portion of the function of the management component 118 related to the MM. C. relay server 120. The management section 11419 stores management information related to a call and multimedia communication which are handled by the other components 1142 to 1144 and 1161 to 1164, such as an IP address and a port number of each session, into a database 1183 of the component, and, upon a request, provides the management information to the other components. The management section 12419 stores management information related to a call and multimedia communication which are handled by the other components 1242 to 1244 and 1261 to 1264, such as an IP address and a port number of each session, into a database 1284 of the component, and, upon a request, provides the management information to the other components. Each of the management sections 11419 and 12419 communicates with the other section to obtain the management information of the other section in the database 1284 or 1183, via the receiver/transmitter section 11412 and the transmitter/receiver section 12414.

Figure 9:
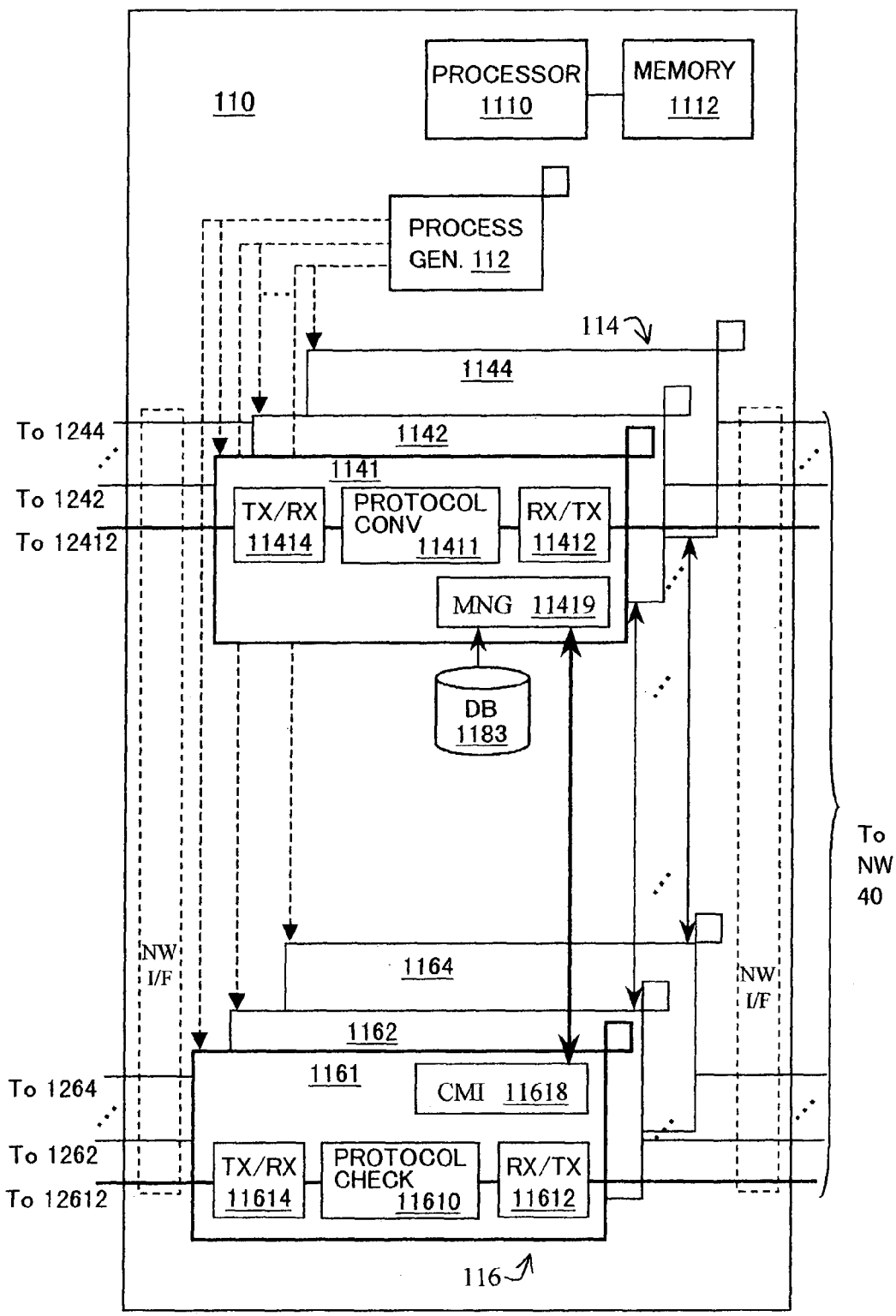
FIG. 9 shows a modification of the MM. C. server of FIG. 7.
Figure 10:
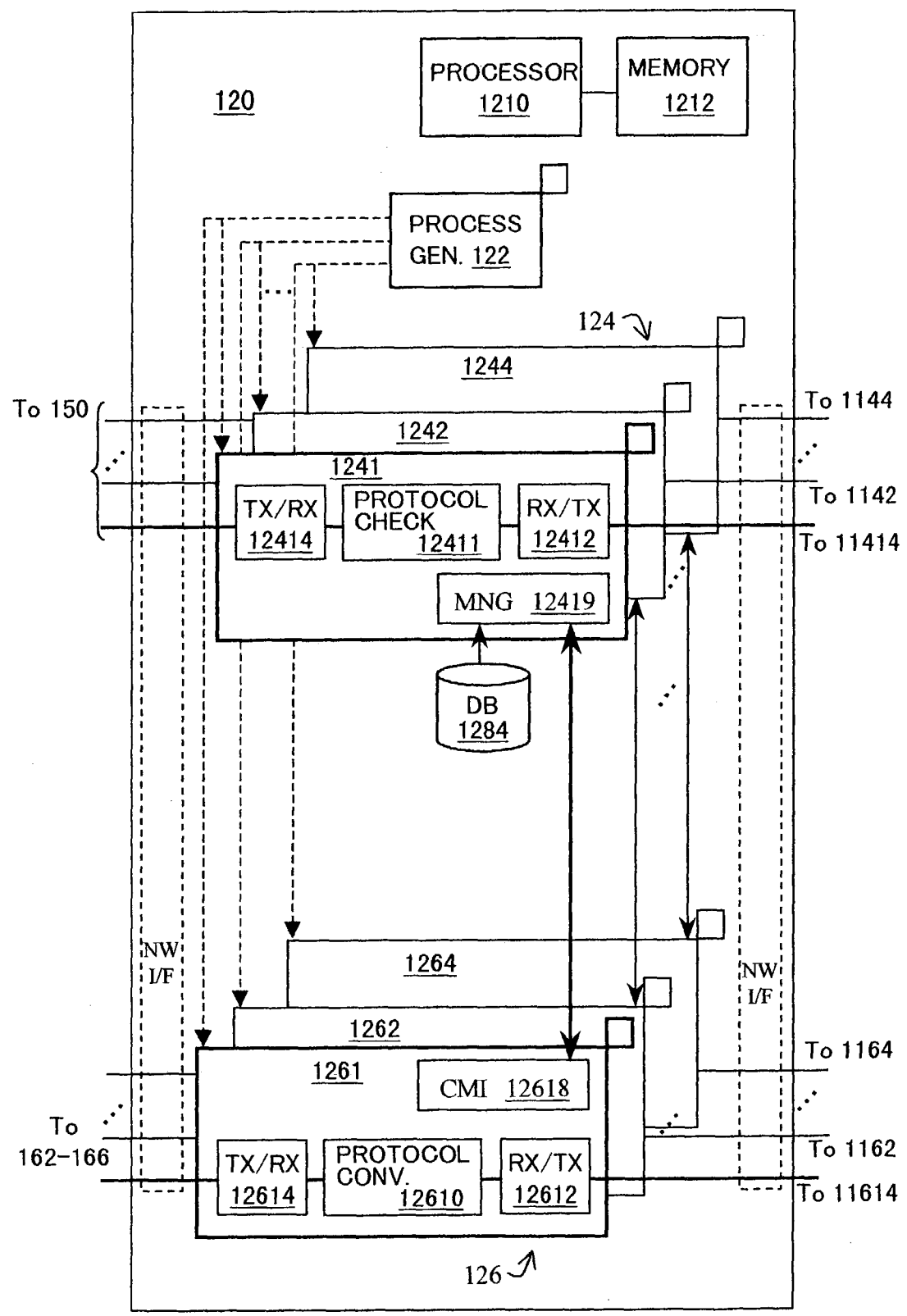
FIG. 10 shows a modification of the MM. C. relay server of FIG. 8.

FIG. 9 shows a modification of the MM. C. server 110 of FIG. 7. FIG. 10 shows a modification of the MM. C. relay server 120 of FIG. 8. In FIG. 9, the protocol checking section 11410 in FIG. 7 is replaced with a protocol converting section 11411 which is similar to the protocol converting section 12410 in FIG. 8. In FIG. 10, the protocol converting section 12410 in FIG. 8 is replaced with a protocol checking section 12411 which is similar to the protocol checking section 11410 in FIG. 7.

Figure 11:
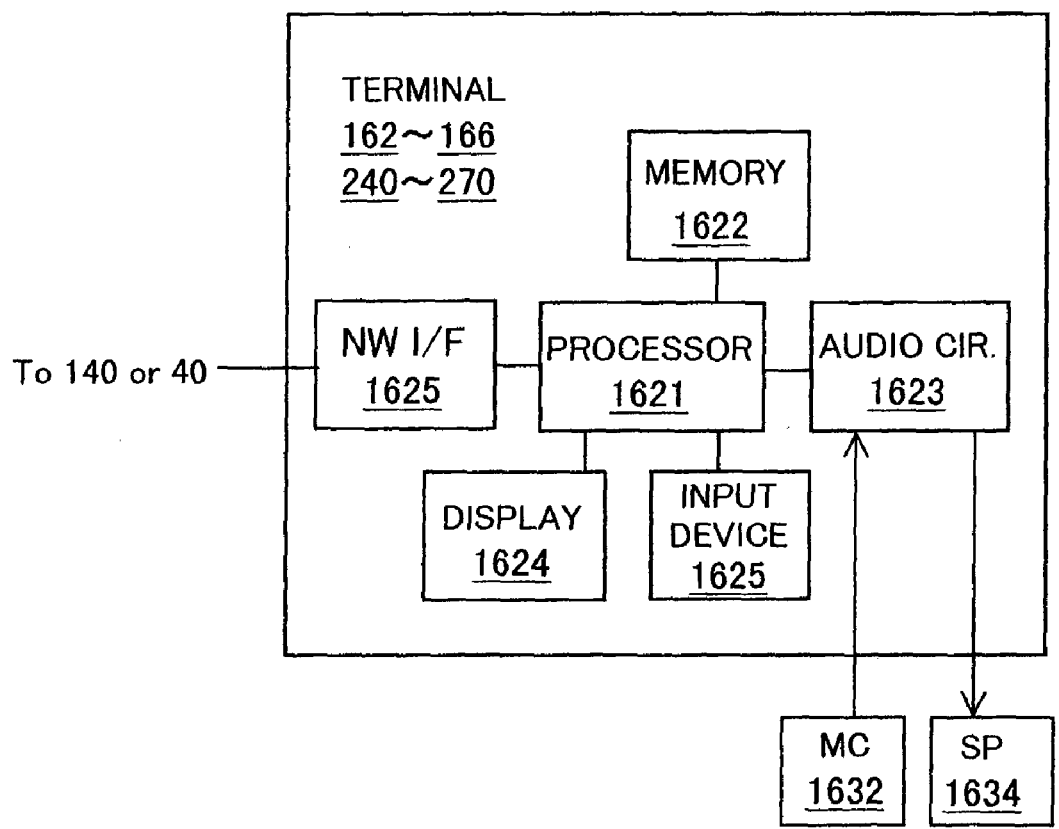
FIG. 11 shows the basic configuration of the intranet terminals and the external network terminals shown in FIGS. 1 and 2.

FIG. 11 shows the basic configuration of the intranet terminals 162 to 166 and the external network terminals 240 to 270 in FIGS. 1 and 2. Each of the terminals includes a processor 1621, a memory device 1622, an audio circuit 1623, a display device 1624, and an input device 1625. The memory device 1622 stores programs for signaling communication and multimedia communication which are to be executed by the processor 1621 and which are used in a terminal-to-terminal communication application, such as an IP telephone application. The audio circuit 1623 is connected to a microphone 1632 and a loudspeaker 1634. The terminals 162 to 166 and 240 to 270 have a signaling section and an MM. C. section which are implemented on the processor 1621 in accordance with the programs. As described later in connection with to FIG. 24, a fixed IP address or an IP telephone number may be allocated to the external network terminals 240 and 250 or the NAT router 210, and the terminal 270.

The NAT router 210 has a global address and is connected to the terminals 240 and 250, each having a private address. As described later in connection with FIG. 24, the NAT router 210 may have a specific port which is connected only to the specific terminal 240 or 250.

Now, protocols and communication procedures which are used in, as an example, the terminals 240 and 270, the SIG. C. component 1141, the SIG. C. relay component 1241, the MM. C. component 1161, the MM. C. relay component 1261, and the terminal 162 will be described. Similar protocols and similar communication procedures are used in the other equivalent terminals and components described above. The communication procedure is divided into Phase I for pre-establishing a connection immediately after activating the MM. C. server 110 and the MM. C. relay server 120, Phase II for establishing a call between the terminal 240 or 270 and the terminal 162 after Phase I, and Phase III for multimedia communication between the terminal 240 or 270 and the terminal 162 after Phase II.

Figure 12:
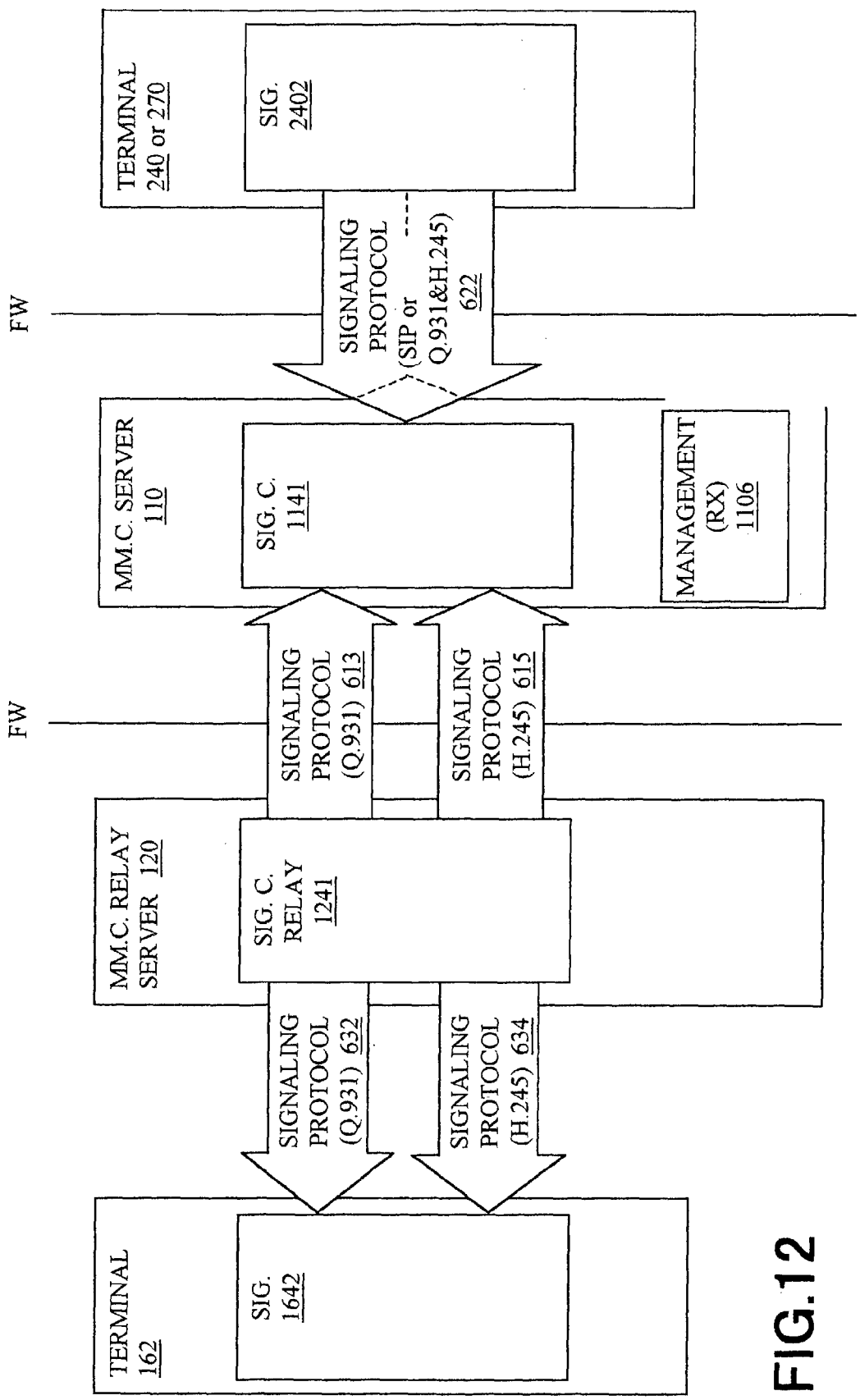
FIG. 12 shows a combination of the directions of connections and signaling communication protocols which are used in one way of establishing a call between a signaling section of the external network terminal, a signaling communication (SIG. C.) component of the MM. server, an SIG. C. relay component of the MM. C. relay server, and a signaling section of the intranet terminal, in accordance with the invention.

FIG. 12 shows a combination of the directions of connections and signaling communication protocols which are used in one way of establishing a call between a signaling section 2402 of the external network terminal 240 or 270, the SIG. C. component 1141 of the MM. C. server 110, the SIG. C. relay component 1241 of the MM. C. relay server 120, and a signaling section 1642 of the intranet terminal 162, in accordance with the invention. FIGS. 13 to 16 show other combinations of the directions of connections and signaling communication protocols which are used in other ways of call establishment between the components, in accordance with the invention. In the figures, the unidirectional wide arrows indicate the respective directions of connections.

Referring to FIGS. 12 to 15, the SIG. C. relay component 1241 establishes a TCP connection with the SIG. C. component 1141, and transmits and receives signaling messages to and from the SIG. C. component 1141 in accordance with the signaling protocol Q.931 of H.323 as indicated by 613, and with the signaling protocol H.245 of H.323 as indicated by 615. For this purpose, the SIG. C. relay component 1241 and the SIG. C. component 1141 use their respective ports for Q.931 and respective ports for H.245.

Referring to FIG. 12, the signaling section 2402 of the terminal 240 or 270 establishes a TCP connection with the SIG. C. component 1141, and transmits and receives signaling messages to and from the SIG. C. component 1141 in accordance with the signaling protocol SIP or the signaling protocols Q.931 and H.245, as indicated by 622. For this purpose, the SIG. C. component 1141 uses one port for the SIP, or two ports for Q.931 and H.245, respectively.

The SIG. C. relay component 1241 establishes a TCP connection with the signaling section 1642 of the terminal 162, and transmits and receives signaling message to and from the signaling section 1642 in accordance with the signaling protocol Q.931 as indicated by 632, and with the signaling protocol H.245 as indicated by 634.

Figure 13:
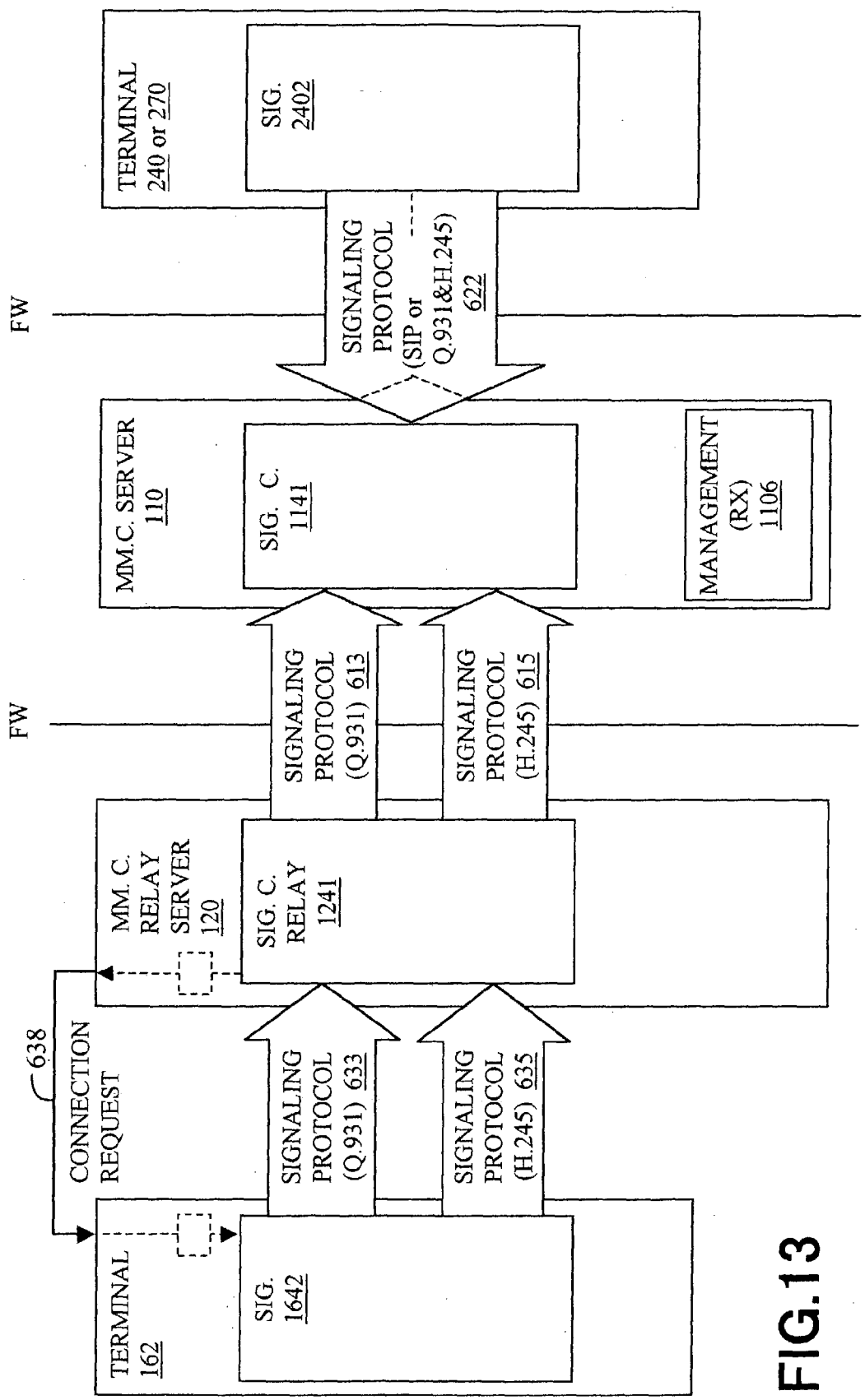
FIG. 13 shows another combination of the directions of connections and signaling communication protocols which are used in another way of call establishment between the signaling section of the external network terminal, the SIG. C. component of the MM. C. server, the SIG. C. relay component of the MM. C. relay server, and the signaling section of the intranet terminal, in accordance with the invention.

Now referring to FIG. 13, similarly to the protocols shown in FIG. 12, the signaling section 2402 establishes a TCP connection with the SIG. C. component 1141, and transmits and receives signaling messages to and from the SIG. C. component 1141 in accordance with the signaling protocol SIP, or with the signaling protocols Q.931 and H.245, as indicated by 622.

The MM. C. relay server 120 transmits a connection request to the terminal 162 in accordance with another arbitrary protocol, through another communication path 638 which may be provided by way of the known IRC (Internet Relay Chat), the known instant message or the like, or another special technique.

The signaling section 1642 establishes a TCP connection with the SIG. C. relay component 1241, and transmits and receives signaling messages to and from the SIG. C. relay component 1241 in accordance with the signaling protocol Q.931 as indicated by 633, and with the signaling protocol H.245 as indicated by 635.

Figure 14:
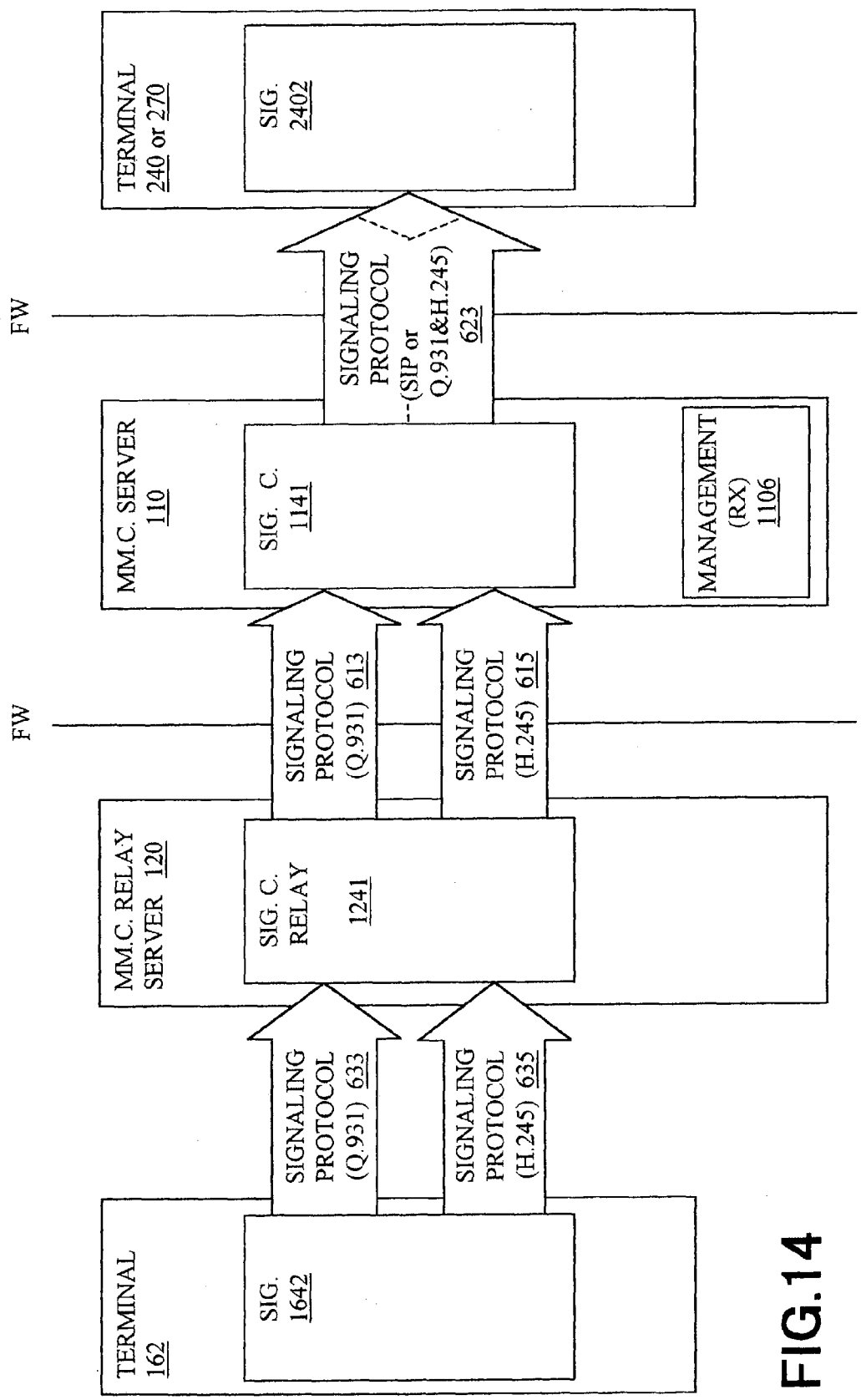
FIG. 14 shows a further combination of the directions of connections and signaling communication protocols which are used in another way of call establishment between the signaling section of the external network terminal, the SIG. C. component of the MM. C. server, the SIG. C. relay component of the MM. C. relay server, and the signaling section of the intranet terminal, in accordance with the invention.

Now referring to FIG. 14, the SIG. C. component 1141 establishes a TCP connection with the signaling section 2402, and transmits and receives signaling messages to and from the signaling section 2402 in accordance with the signaling protocol SIP, or with the signaling protocols Q.931 and H.245, as indicated by 623.

The signaling section 1642 establishes a TCP connection with the SIG. C. relay component 1241, and transmits and receives signaling messages to and from the SIG. C. relay component 1241 in accordance with the signaling protocol Q.931 as indicated by 633, and with the signaling protocol H.245 as indicated by 635.

Figure 15:
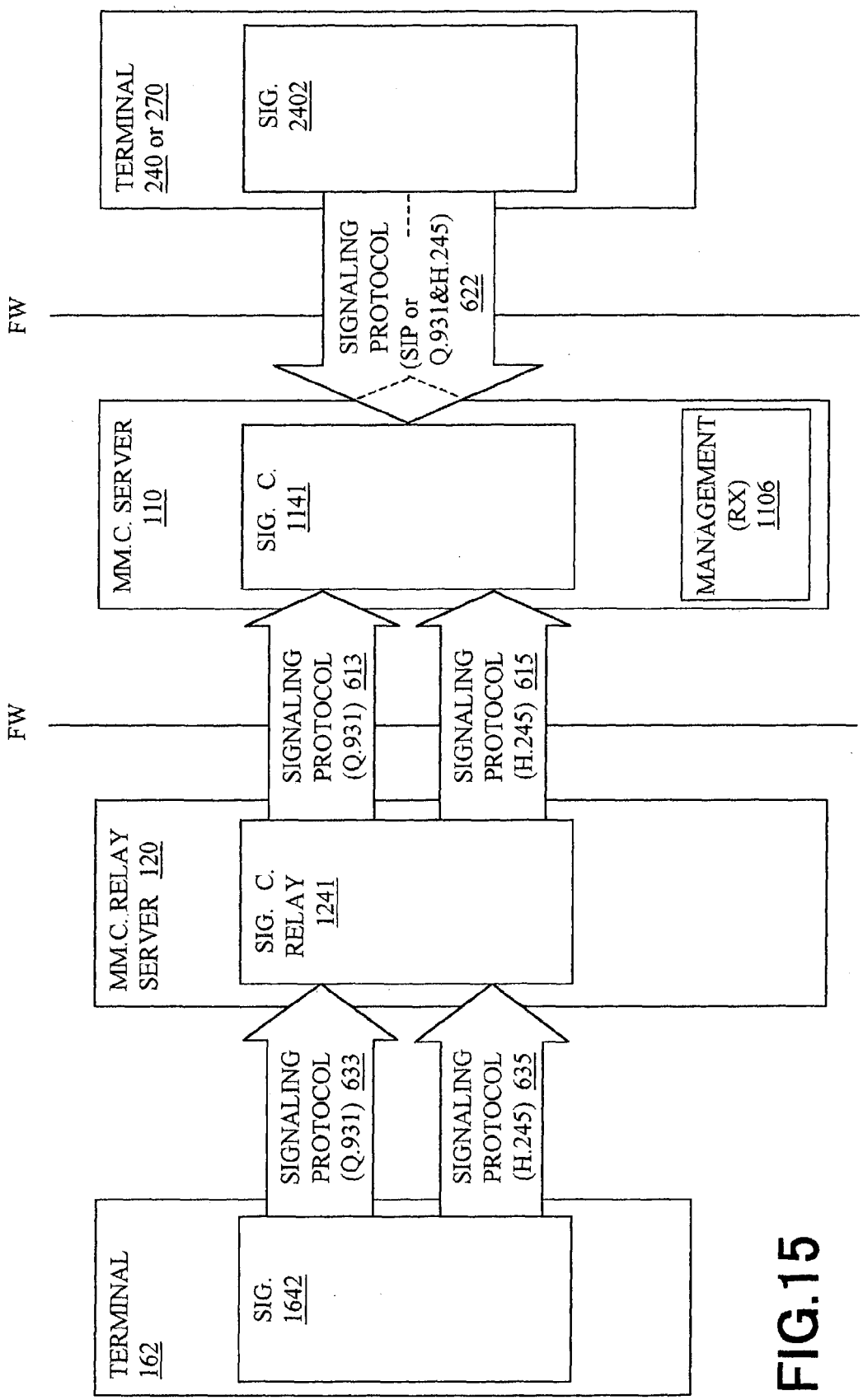
FIG. 15 shows a still further combination of the directions of connections and signaling communication protocols which are used in another way of call establishment between the signaling section of the external network terminal, the SIG. C. component of the MM. C. server, the SIG. C. relay component of the MM. C. relay server, and the signaling section of the intranet terminal, in accordance with the invention.

Now referring to FIG. 15, similarly to the protocols shown in FIGS. 12 and 13, the signaling section 2402 establishes a TCP connection with the SIG. C. component 1141, and transmits and receives signaling messages to and from the SIG. C. component 1141 in accordance with the signaling protocol SIP, or with the signaling protocols Q.931 and H.245, as indicated by 622.

Similarly to the protocols shown in FIG. 14, the signaling section 1642 establishes a TCP connection with the SIG. C. relay component 1241, and transmits and receives signaling messages to and from the SIG. C. relay component 1241 in accordance with the signaling protocol Q.931 as indicated by 633, and with the signaling protocol H.245 as indicated by 635.

Figure 16:
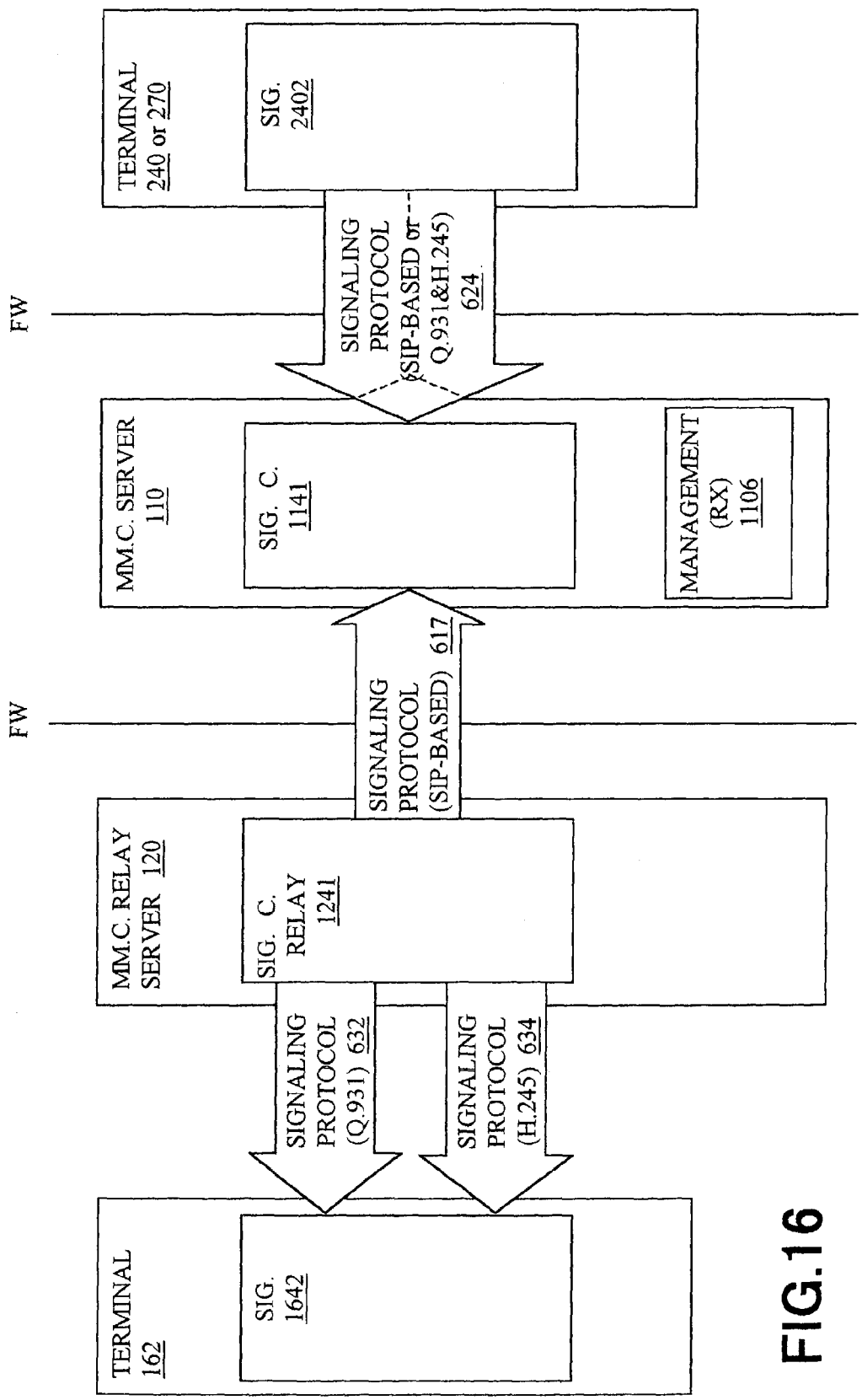
FIG. 16 shows a still further combination of the directions of connections and signaling communication protocols which are used in another way of call establishment between the signaling section of the external network terminal, the SIG. C. component of the MM. C. server, the SIG. C. relay component of the MM. C. relay server, and the signaling section of the intranet terminal, in accordance with the invention.

Referring to FIG. 16, the SIG. C. relay component 1241 establishes a TCP connection with the SIG. C. component 1141, and transmits and receives signaling messages to and from the SIG. C. component 1141 in accordance with the SIP based signaling protocol indicated by 617. For this purpose, the SIG. C. component 1241 uses one port for the SIP.

Similarly to the protocols shown in FIG. 12, the signaling section 2402 of the terminal 240 or 270 establishes a TCP connection with the SIG. C. component 1141, and transmits and receives signaling messages to and from the SIG. C. component 1141 in accordance with the SIP based signaling protocol or the signaling protocols Q.931 and H.245 indicated by 624. For this purpose, the SIG. C. component 1141 uses one port for the SIP.

Similarly to the protocols shown in FIG. 12, the SIG. C. relay component 1241 establishes a TCP connection with the signaling section 1642 of the terminal 162, and transmits and receives signaling messages to and from the signaling section 1642 in accordance with the signaling protocol Q.931 indicated by 632 and the signaling protocol H.245 indicated by 634.

Figure 17:
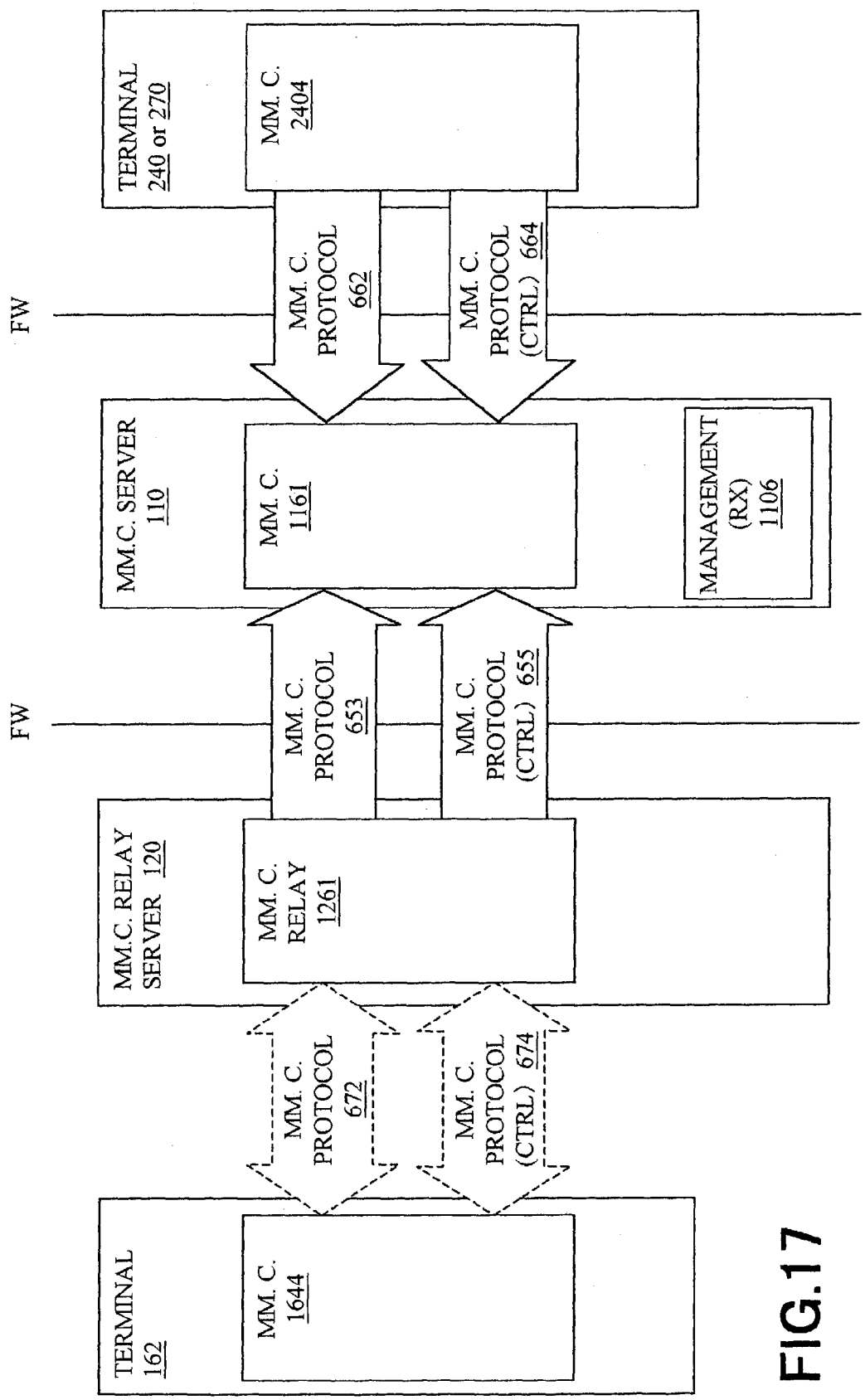
FIG. 17 shows a combination of the directions of connections and multimedia communication protocols which are used over the established call between an MM. C. section of the external network terminal, an MM. C. component of the MM. C. server, an MM. C. relay component of the MM. C. relay server, and an MM. C. section of the intranet terminal, in accordance with the invention.
Figure 18:
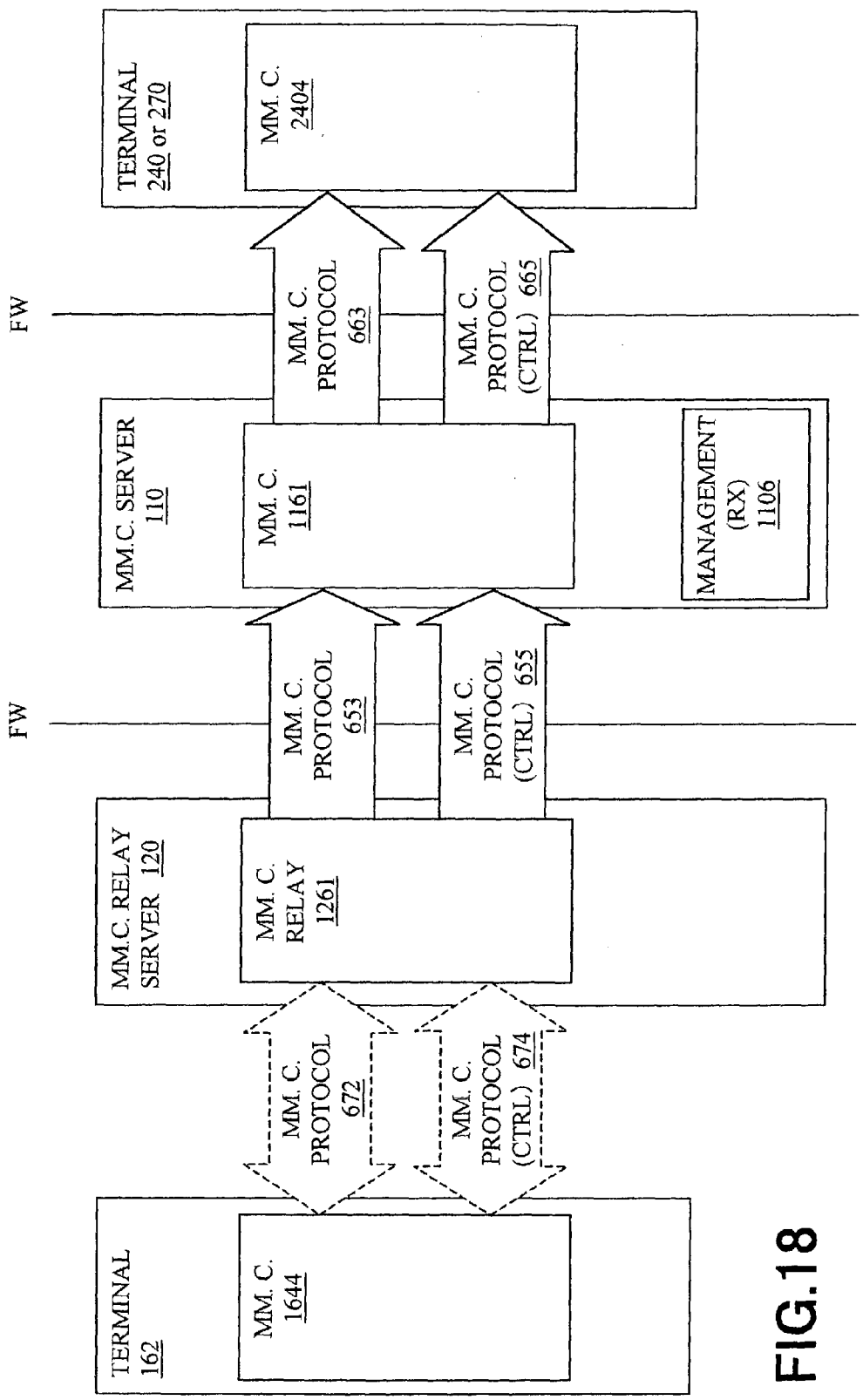
FIG. 18 shows another combination of the directions of connections and multimedia communication protocols which are used over the established call between the MM. C. section of the external network terminal, the MM. C. component of the MM. C. server, the MM. C. relay component of the MM. C. relay server, and the MM. C. section of the intranet terminal, in accordance with the invention.
Figure 19:
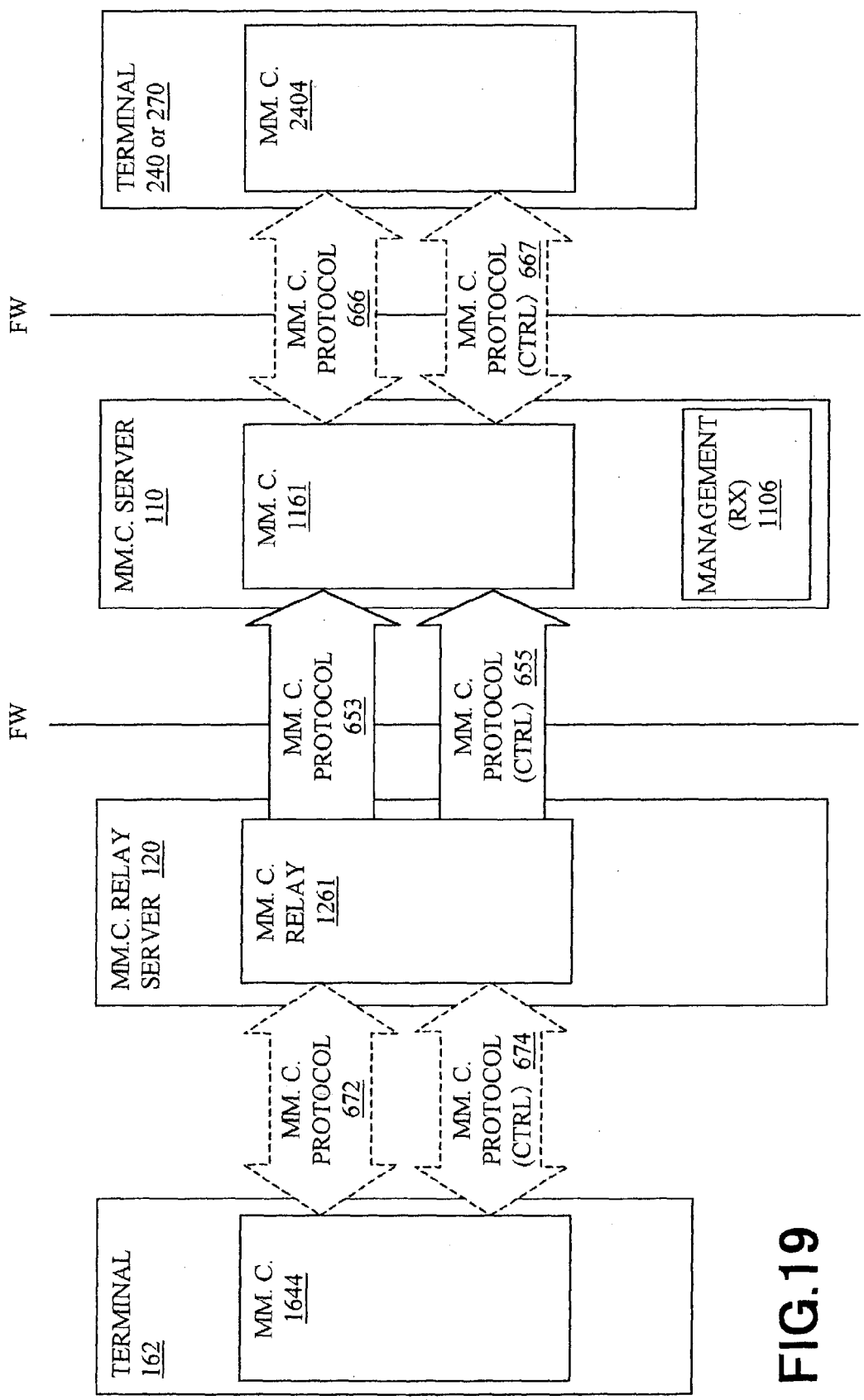
FIG. 19 shows a further combination of the directions of connections and multimedia communication protocols which are used over the established call between the MM. C. section of the external network terminal, the MM. C. component of the MM. C. server, the MM. C. relay component of the MM. C. relay server, and the MM. C. section of the intranet terminal, in accordance with the invention.

FIG. 17 shows a combination of the directions of connections and multimedia communication protocols which are used over the established call between an MM. C. section 2404 of the external network terminal 240 or 270, the MM. C. component 1161 of the MM. C. server 110, the MM. C. relay component 1261 of the MM. C. relay server 120, and an MM. C. section 1644 of the intranet terminal 162, in accordance with the invention. FIGS. 18 and 19 show other combinations of the directions of connections and multimedia communication protocols which are used over the established call, in accordance with the invention. In the figures, the unidirectional wide arrows indicate the directions of connections, and the bidirectional wide arrows indicate the bidirectional UDP connections, respectively.

Referring to FIGS. 17 to 19, the MM. C. relay component 1261 establishes a TCP connection with the MM. C. component 1161, and transmits and/or receives a multimedia data stream to and/or from the MM. C. component 1161 in accordance with the RTP over a multimedia communication protocol H.323 for a data stream as indicated by 653, and with the RTCP over the multimedia communication protocol H.323 for controlling a data stream as indicated by 655. For this purpose, each of the MM. C. relay component 1261 and the MM. C. component 1161 uses two or more ports depending on the type of media communication, such as audio, video or text.

The MM. C. relay component 1261 and the MM. C. section 1644 transmit and/or receive a data stream to and/or from each other via their respective UDP ports over a UDP connection, in accordance with the multimedia communication protocol RTP for a data stream over H.323 as indicated by 672, and with the multimedia communication protocol RTCP for controlling a data stream over H.323 as indicated by 674.

In FIG. 17, the MM. C. section 2404 establishes a TCP connection with the MM. C. component 1161, and transmits and/or receives a data stream to and/or from the MM. C. component 1161 in accordance with the multimedia communication protocol RTP for a data stream over the SIP or H.323 as indicated by 662, and with the multimedia communication protocol RTCP for controlling a data stream over the SIP or H.323 as indicated by 664.

Now referring to FIG. 18, the MM. C. component 1161 establishes a TCP connection with the MM. C. section 2404, and transmits and/or receives a data stream to and/or from the MM. C. section 2404 in accordance with the multimedia communication protocol RTP for a data stream over the SIP or H.323 as indicated by 663, and the multimedia communication protocol RTCP for controlling a data stream over the SIP or H.323 as indicated by 665.

Now referring to FIG. 19, the MM. C. section 2404 and the MM. C. component 1161 transmit and/or receive a data stream to and/or from each other over a UDP connection, in accordance with the multimedia communication protocol RTP for a data stream over the SIP or H.323 as indicated by 666, and the multimedia communication protocol RTCP for controlling a data stream over the SIP or H.323 as indicated by 667.

Figure 20:
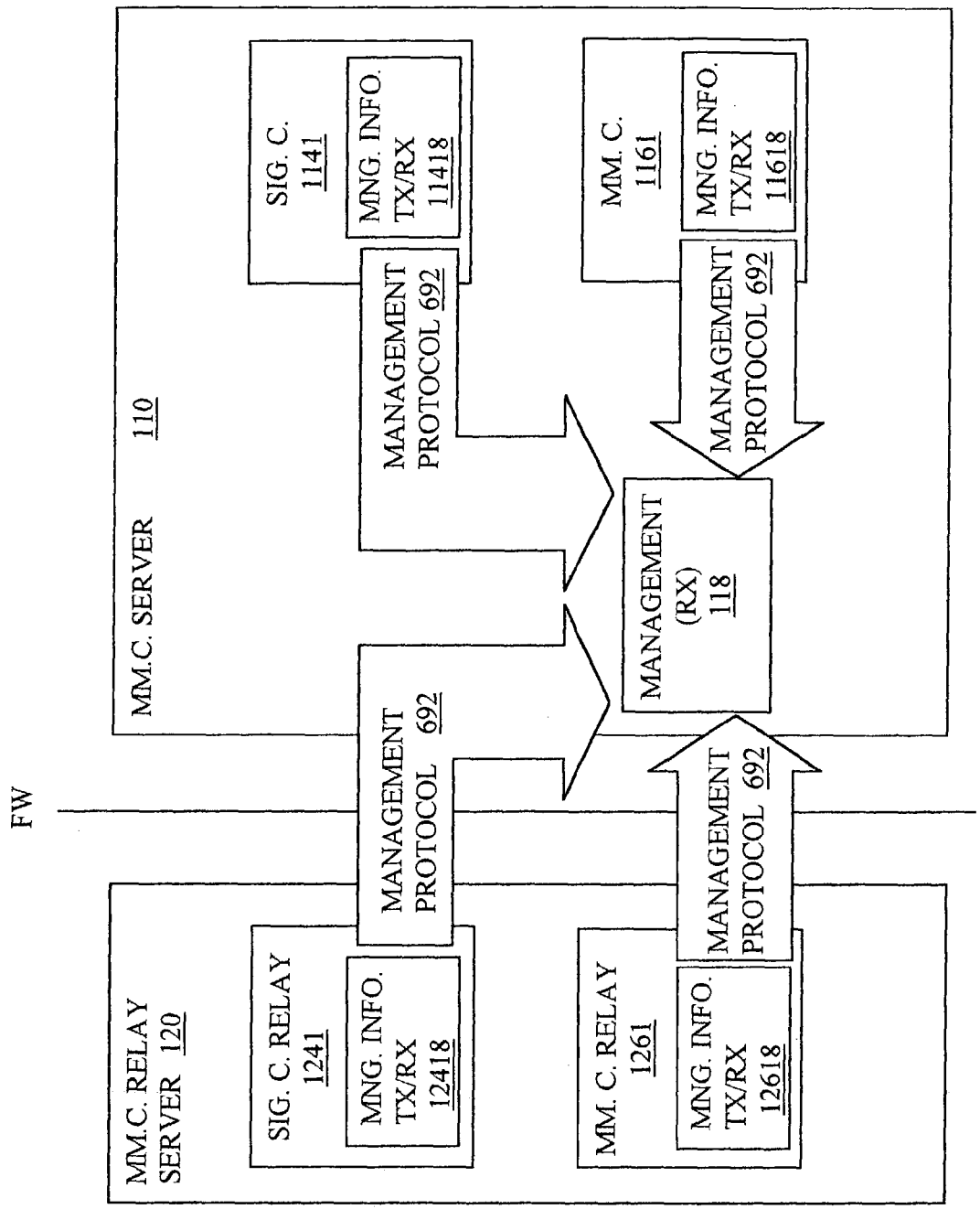
FIG. 20 shows management protocol which is used in communication between a management component, and each of connection management information transmitting/receiving sections of the SIG. C. component, the MM. C. component, the SIG. C. relay component and the MM. C. relay component, respectively, in accordance with the invention.

FIG. 20 shows management protocol in the invention which is used in communication between the management component 118, and the connection management information transmitting/receiving section 11418 of the SIG. C. component 1141 and the connection management information transmitting/receiving section 11618 of the MM. C. component 1161 in the MM. C. server 110 of FIG. 3, and the connection management information transmitting/receiving section 12418 of the SIG. C. relay component 1241 and the connection management information transmitting/receiving section 12618 of the MM. C. relay component 1261 in the MM. C. relay server 120 of FIG. 4. The unidirectional wide arrows indicate the directions of respective connections.

In FIG. 20, each of the connection management information transmitting/receiving sections 11418, 11618, 12418, and 12618 establishes, as occasion demands, a TCP connection with the management component 118 via its one listen port in accordance with the management protocol as indicated by 692, transmits and receives a connection management message, and thereafter releases the connection.

Figure 21:
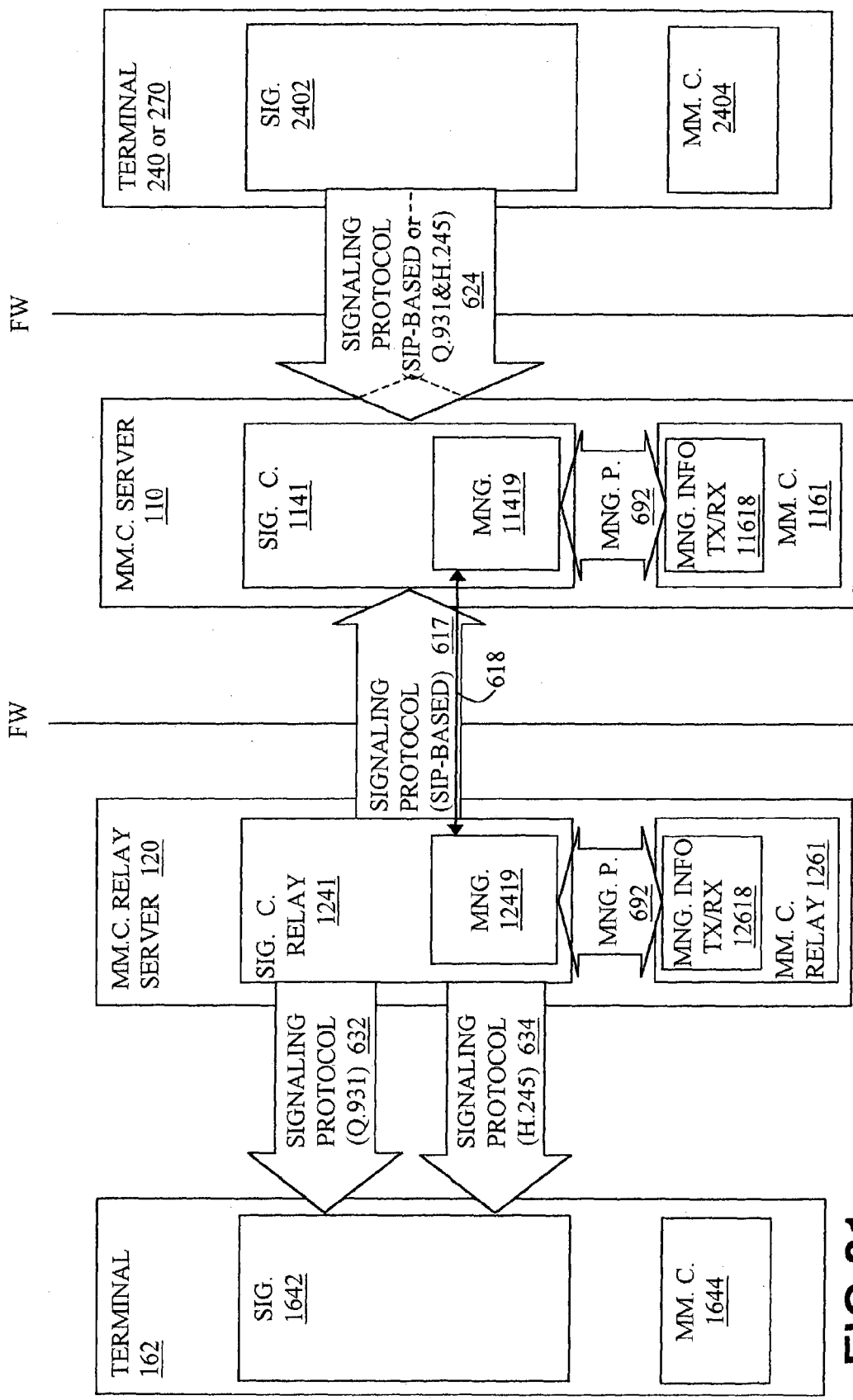
FIG. 21 shows a combination of the directions of connections which are used in one way of establishing a call between a signaling section of the external network terminal, the SIG. C. component of the MM. C. server, the SIG. C. relay component of the MM. C. relay server, and a signaling section of the intranet terminal, in accordance with the invention, in which the MM. C. server and the MM. C. relay server of FIG. 21 have the configuration of FIGS. 7 and 8, or of FIGS. 9 and 10, in accordance with the invention.

FIG. 21 shows a combination of the directions of connections which are used in one way of establishing a call between a signaling section 2402 of the external network terminal 240 or 270, the SIG. C. component 1141 of the MM. C. server 110, the SIG. C. relay component 1241 of the MM. C. relay server 120, and a signaling section 1642 of the intranet terminal 162, in accordance with the invention, in which the MM. C. server 110 and the MM. C. relay server 120 of FIG. 21 have the configuration of FIGS. 7 and 8, or of FIGS. 9 and 10, in accordance with the invention. FIG. 21 also shows multimedia communication protocols which are used in communication between the management section 11419 of the SIG. C. component 1141 and the connection management information transmitting/receiving section 11618 of the MM. C. component 1161 in the MM. C. server 110 of FIGS. 7 and 9, and between the management section 12419 of the SIG. C. relay component 1241 and the connection management information transmitting/receiving section 12618 of the MM. C. relay component 1261 in the MM. C. relay server 120 of FIGS. 8 and 10. The unidirectional wide arrows indicate the respective directions of connections. The management section 11419 and the management section 12419 mutually transmit and receive connection management information in signaling messages as indicated by 618, in accordance with the SIP based signaling protocol indicated by 617.

Figure 22:
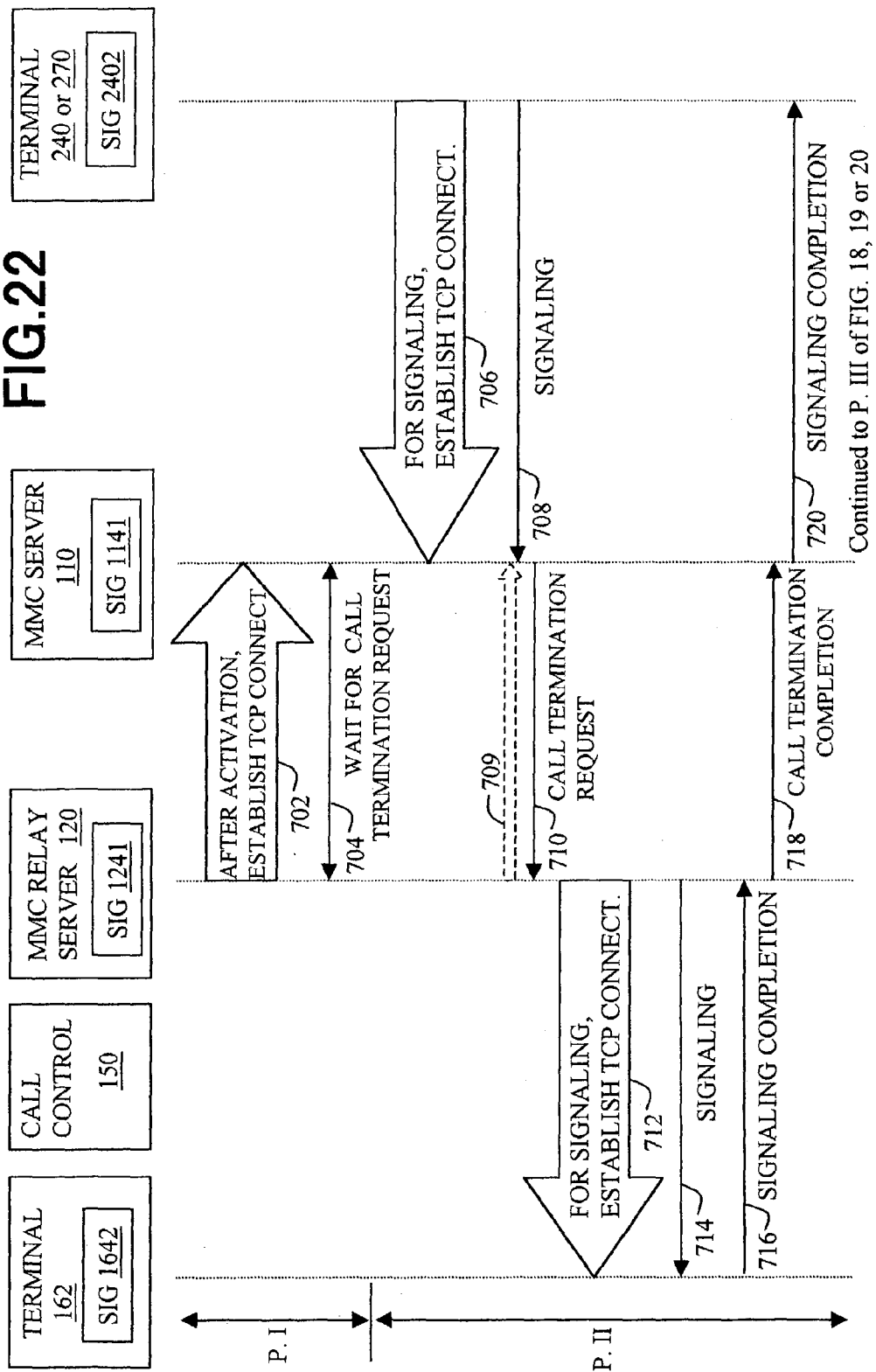
FIG. 22 shows a signaling procedure which, when a user of the external network terminal originates a call to a call center, is executed, between the external network terminal, the MM. C. server, the MM. C. relay server and of the intranet terminal in accordance with the protocols shown in FIG. 12, in accordance with the invention.
Figure 23:
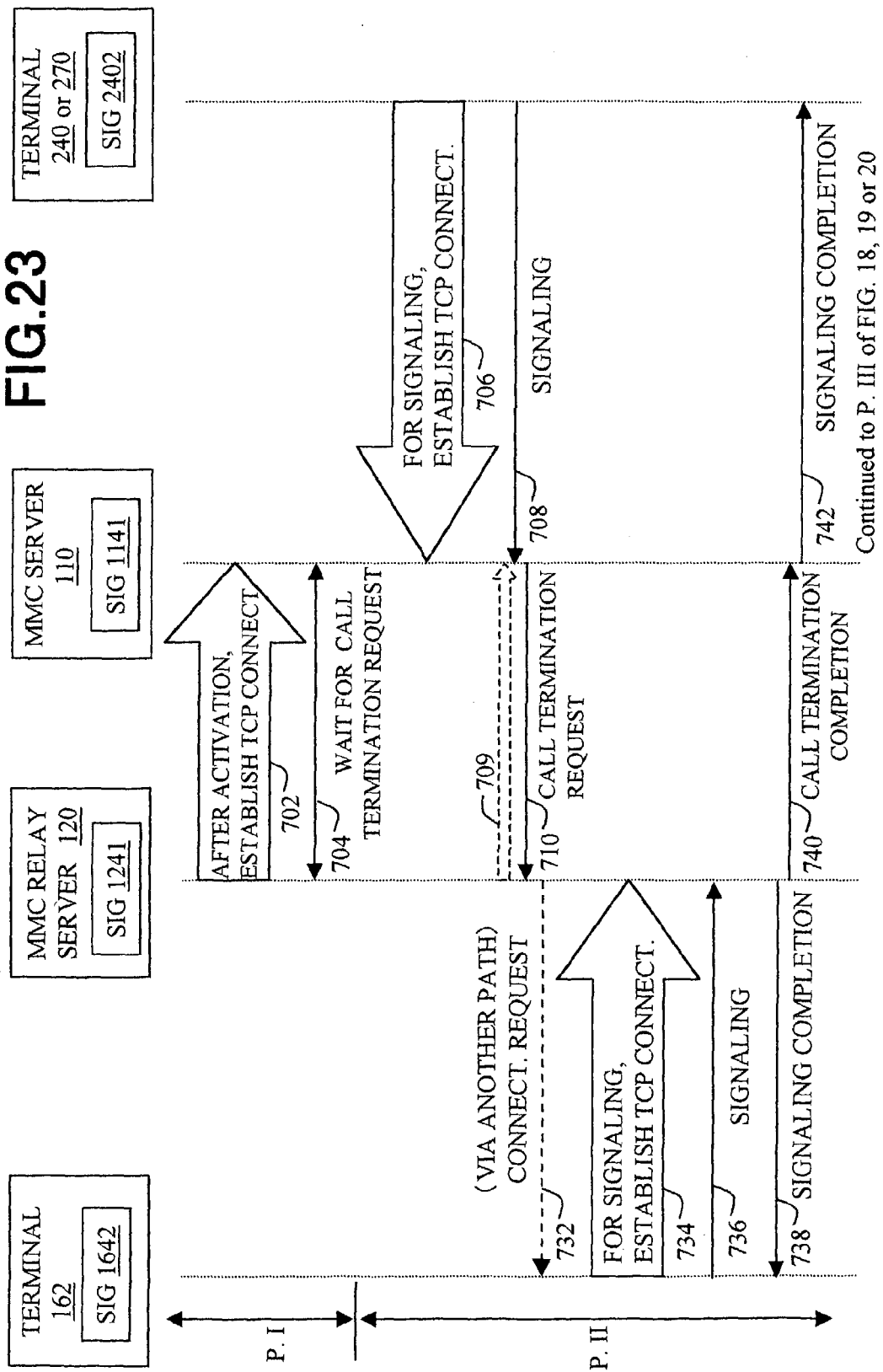
FIG. 23 shows an alternative signaling procedure which, when the user of the external network terminal originates a call to the call center, is executed between the external network terminal, the MM. C. server, the MM. C. relay server, and of the intranet terminal in accordance with the protocols shown in FIG. 13, in accordance with the invention.

FIG. 22 shows a signaling procedure which, when the user of the external network terminal 240 or 270 originates a call to the call center 10, is executed, in accordance with the protocols shown in FIG. 12, between the signaling section 2402 of the external network terminal 240 or 270, the SIG. C. component 1141 of the MM. C. server 110, the SIG. C. relay component 1241 of the MM. C. relay server 120, and the signaling section 1642 of the intranet terminal 162, in accordance with the invention. FIG. 23 shows an alternative signaling procedure which is executed between them in accordance with the protocols shown in FIG. 13, in accordance with the invention.

Figure 24:
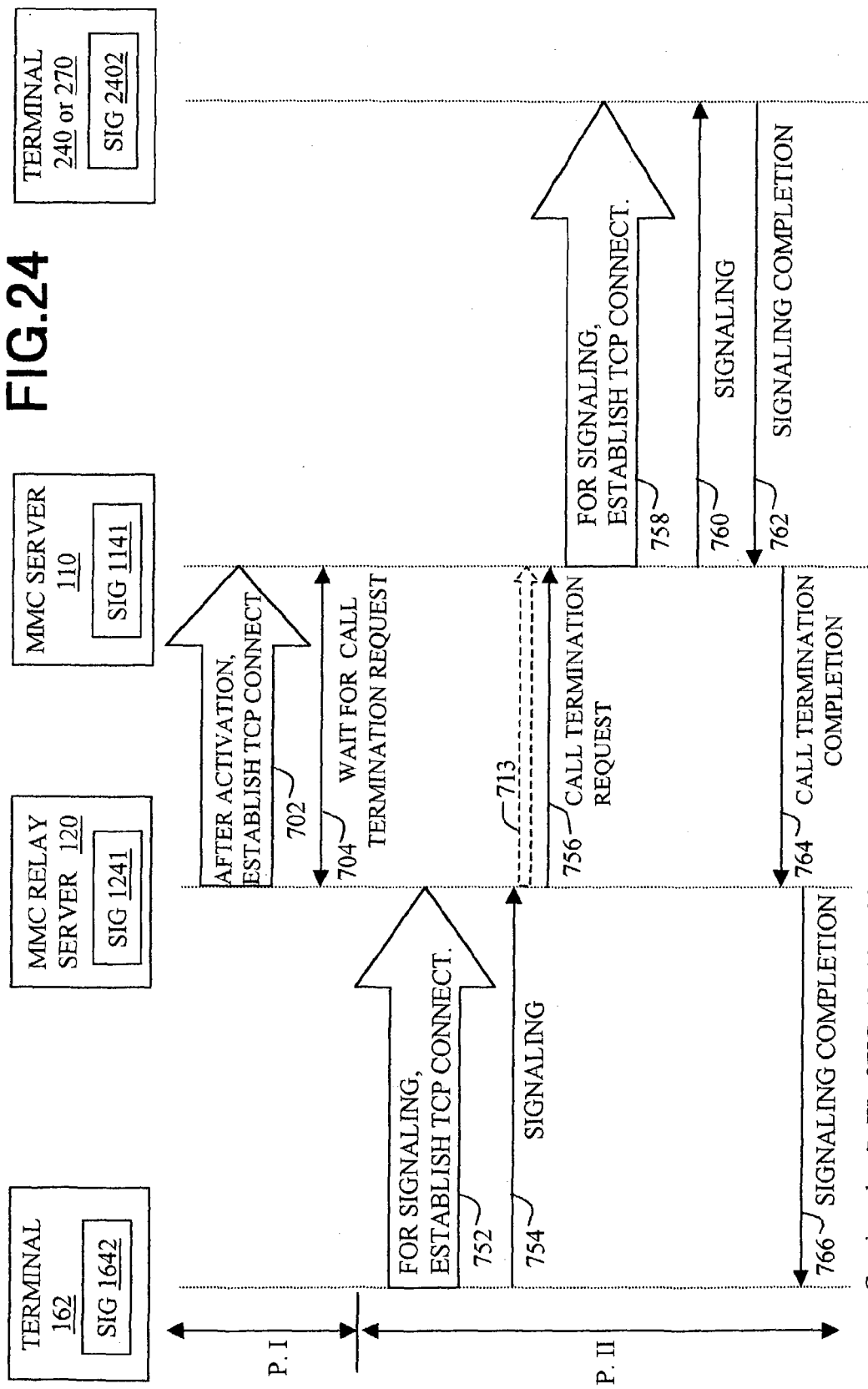
FIG. 24 shows a signaling procedure which, when an operator or agent of the call center originates a call to the external network terminal, is executed between the intranet terminal, the MM. C. relay server, the MM. C. server and the external network terminal in accordance with the protocols shown in FIG. 14, in accordance with the invention.
Figure 25:
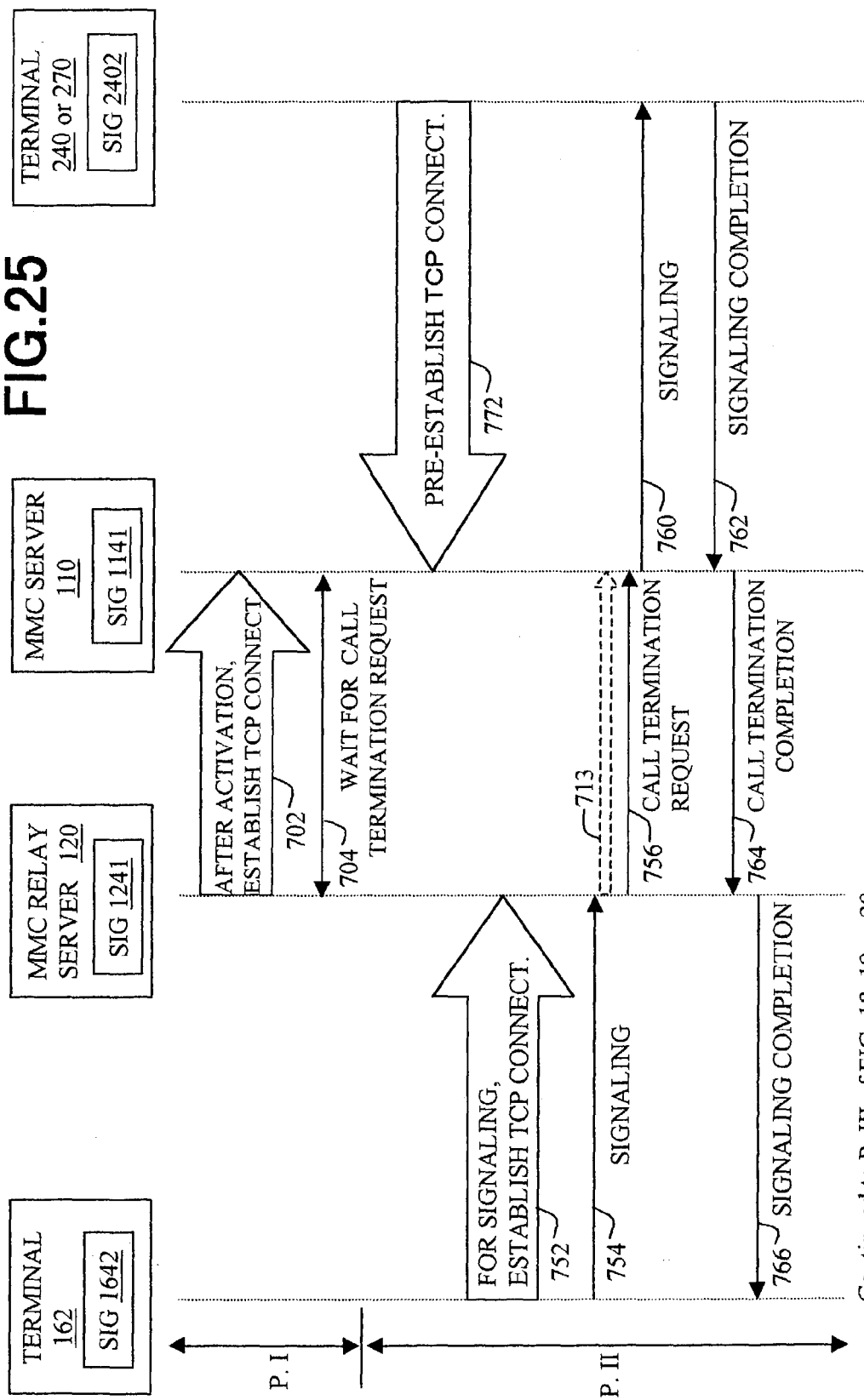
FIG. 25 shows an alternative signaling procedure which, when the operator or agent of the call center originates a call to the external network terminal, is executed between the intranet terminal, the MM. C. relay server, the MM. C. server and the external network terminal in accordance with the protocols shown in FIG. 15, in accordance with the invention.

FIG. 24 shows a signaling procedure which, when the operator or agent of the call center 10 originates a call to the external network terminal 240 or 270, is executed, in accordance with the protocols shown in FIG. 14, between the signaling section 1642 of the intranet terminal 162, the SIG. C. relay component 1241 of the MM. C. relay server 120, the SIG. C. component 1141 of the MM. C. server 110, and the signaling section 2402 of the terminal 240 or 270, in accordance with the invention. FIG. 25 shows an alternative signaling procedure which is executed between them in accordance with the protocols shown in FIG. 15, in accordance with the invention.

In FIGS. 22 to 25, the procedures include Phase I for connection pre-establishment immediately after the activation, and Phase II for call establishment, as described above. In Phase I, the SIG. C. relay component 1241 of the MM. C. relay server 120 pre-establishes a TCP connection 702 with the SIG. C. component 1141 of the MM. C. server 110. In other words, the SIG. C. relay component 1241 starts a TCP connection to send a TCP connection request to the SIG. C. component 1141, and then receives a TCP connection response from the component 1141. Then, the SIG. C. relay component 1241 and the SIG. C. component 1141 transmit and receive send/receive ready messages 704 to and from each other, and then both of the components enter a state of waiting for a request for terminating a call.

Figure 26:
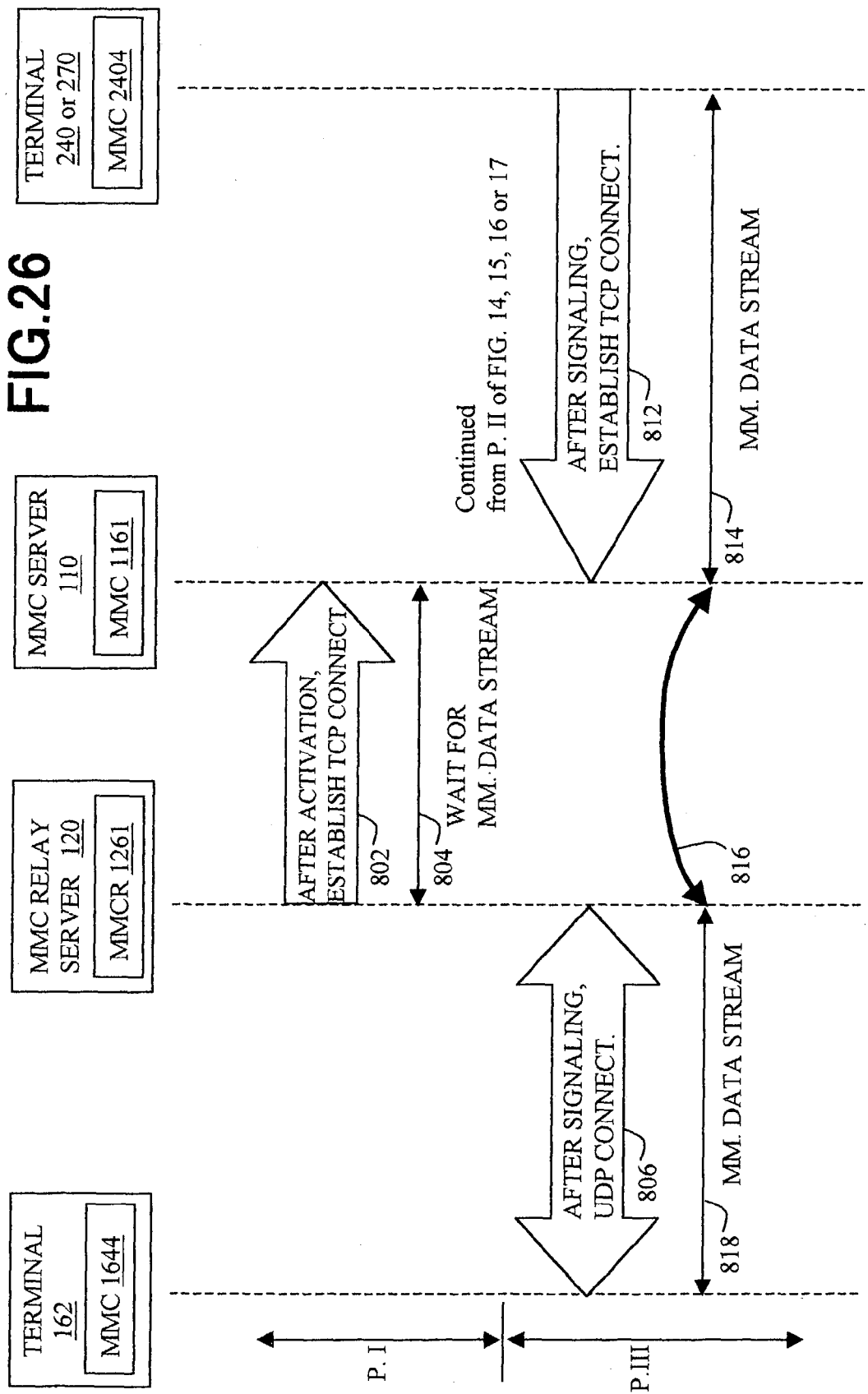
FIG. 26 shows a multimedia communication procedure which is executed between the external network terminal, the MM. C. server, the MM. C. relay server and of the intranet terminal in accordance with the protocol of FIG. 17, in accordance with the invention.

FIG. 26 shows a multimedia communication procedure which is executed, in accordance with the protocol of FIG. 17, between the MM. C. section 2404 of the external network terminal 240 or 270, the MM. C. component 1161 of the MM. C. server 110, the MM. C. relay component 1261 of the MM. C. relay server 120, and the MM. C. section 1644 of the intranet terminal 162, in accordance with the invention.

Figure 27:
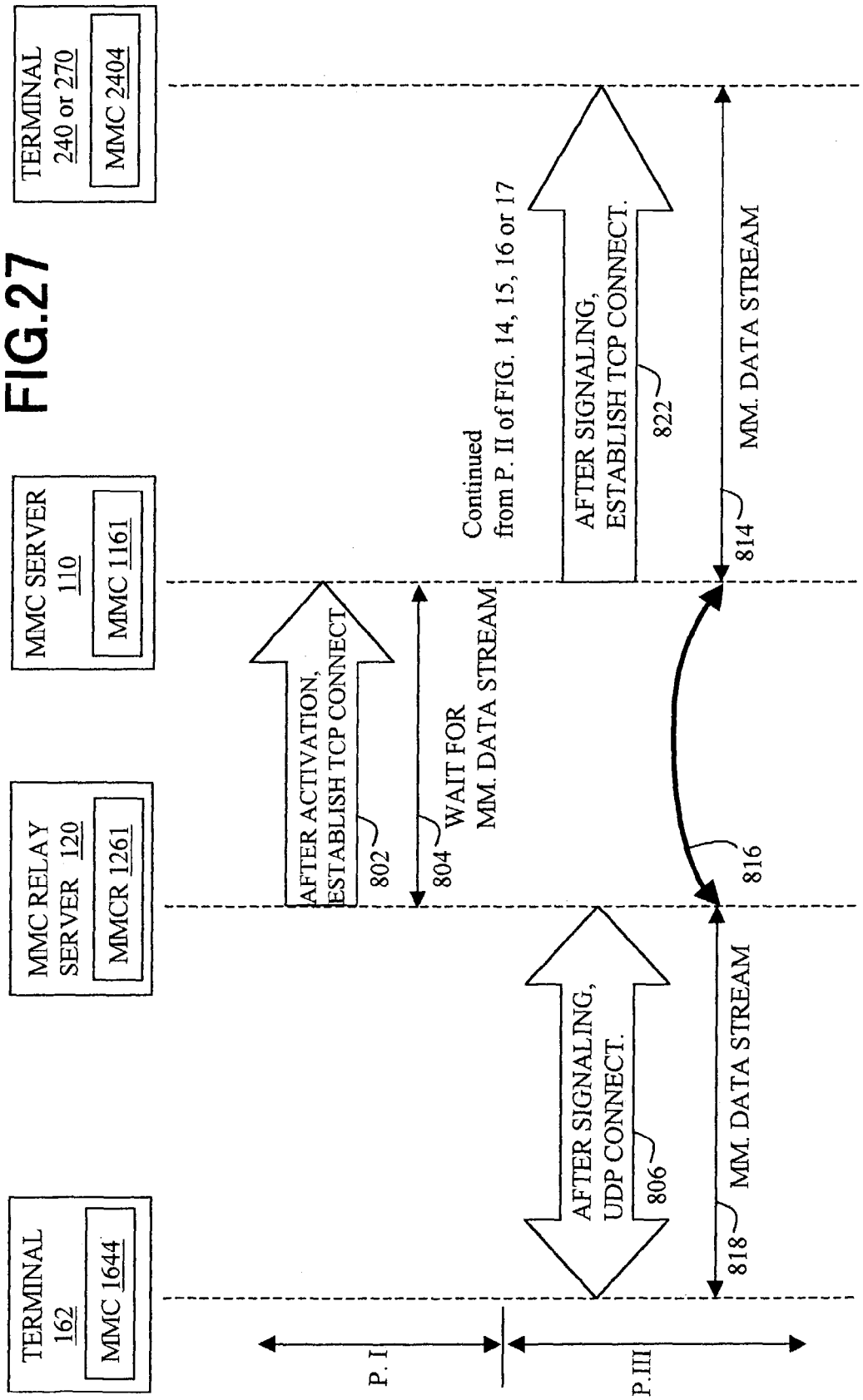
FIG. 27 shows an alternative multimedia communication procedure which is executed between the external network terminal, the MM. C. server, the MM. C. relay server, and the intranet terminal in accordance with the protocols of FIG. 18, in accordance with the invention.

FIG. 27 shows an alternative multimedia communication procedure which is executed between them in accordance with the protocols of FIG. 18, in accordance with the invention.

Figure 28:
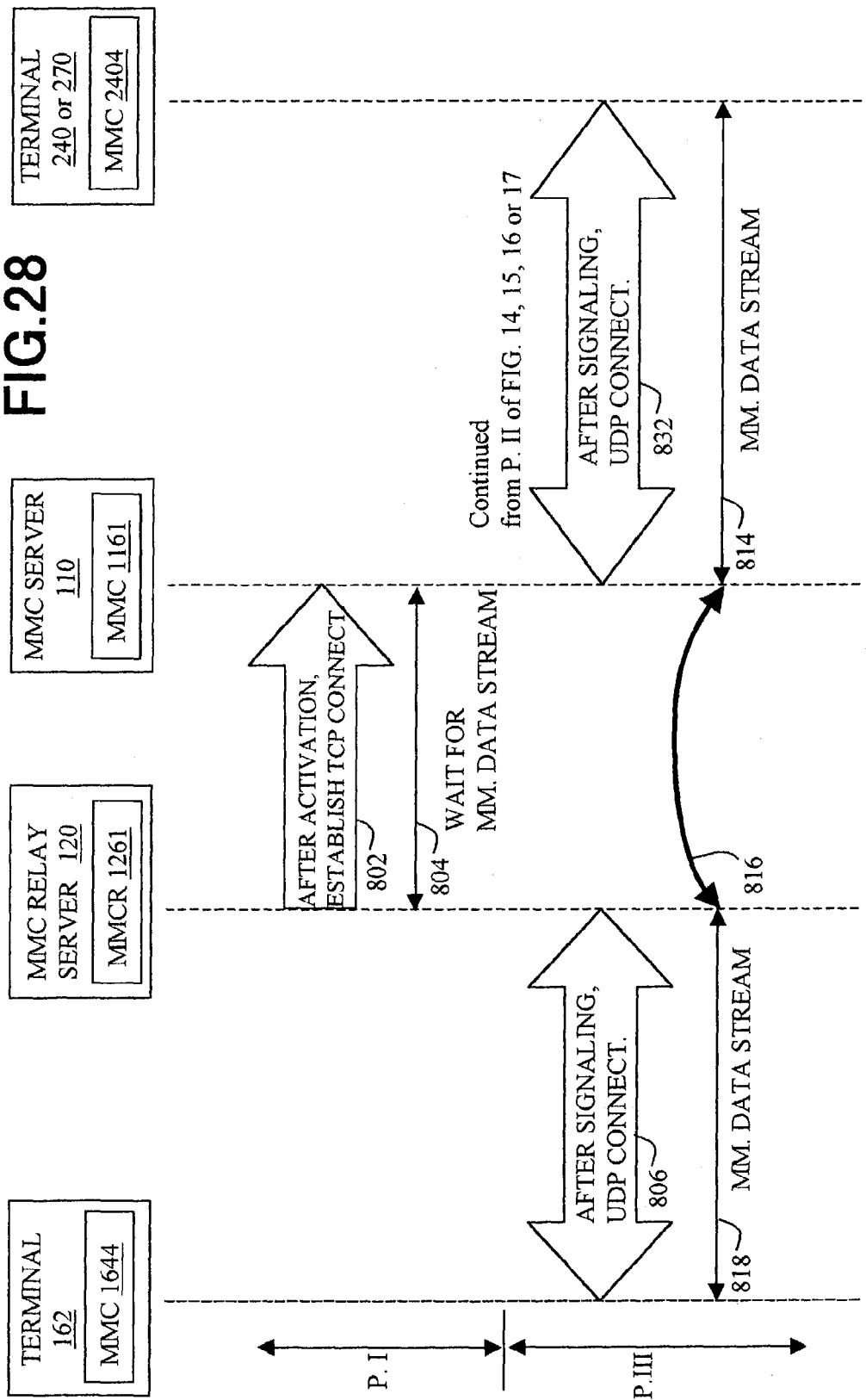
FIG. 28 shows another alternative multimedia communication procedure which is executed between the external network terminal, the MM. C. server, the MM. C. relay server, and the intranet terminal in accordance with the protocols of FIG. 19, in accordance with the invention.

FIG. 28 shows another alternative multimedia communication procedure which is executed between them in accordance with the protocols of FIG. 19, in accordance with the invention.

Referring to FIGS. 26, 27, and 28, the procedures include Phase I for connection pre-establishment immediately after the activation, and Phase III for multimedia communication after Phase II, as described above. In Phase I, at the same time, immediately before, or immediately after when the MM. C. relay server 120 in FIG. 22, 23, 24 or 25 establishes a TCP connection with the MM. C. server 110, the MM. C. relay component 1261 of the MM. C. relay server 120 pre-establishes a TCP connection 802 with the MM. C. component 1161 of the MM. C. server 110. In other words, the MM. C. relay component 1261 starts a TCP connection to send a TCP connection request to the MM. C. component 1161, and then receives a TCP connection response from the component 1161. Then, the MM. C. relay component 1261 and the MM. C. component 1161 transmit and receive send/receive ready messages 804 to and from each other, and then both of the components enter a state of waiting for receiving a multimedia data stream.

Referring back to FIG. 22, Phase II comes after Phase I, i.e., after both the TCP connections for signaling and multimedia communication are pre-established (702 and 802) between the MM. C. relay server 120 and the MM. C. server 110 to enter the state of waiting for a call termination request (704) and the state of waiting for receiving a multimedia data stream (804). In Phase II, when the user of the external network terminal 240 or 270 activates a multimedia communication application on the terminal to originate a call to the call center 10, the terminal 240 or 270 (the signaling section 2402) first establishes a TCP connection 706 with the MM. C. server 110 (the SIG. C. component 1141), and then sends a signaling message 708 indicative of an originating call or a call connection request in accordance with the SIP or H.323, to the MM. C. server 110 (the component 1141). The signaling message 708 contains information required for media communication between the terminal 240 or 270 and the MM. C. server 110, i.e., the IP address and the port number which are used for the media communication by the terminal 240 or 270, and the type of the media of the service or communication (for example, only audio, audio and video, or the like) which is requested by the terminal 240 or 270.

The MM. C. server 110 (the component 1141) checks the received signaling message 708 to see whether or not the protocol is proper. If it is proper, the server 110 sends a call termination request or signaling request message 710 to the MM. C. relay server 120 (the SIG. C. relay component 1241) in accordance with H.323. The signaling request message 710 contains information required for the media communication between the MM. C. server 110 and the MM. C. relay server 120, i.e., the IP address and the port number which are used for the media communication by the MM. C. server 110, and the type of the media of the service or communication (for example, only audio, audio and video, or the like) which is requested by the server 110. In the signaling procedure, the IP address and the port number of the MM. C. component 1141 which are used for the multimedia communication by the MM. C. server 110 are determined, and then stored into the database 1182 of the management component 118.

In response to the reception of the call termination request message 710, the MM. C. relay server 120 (the component 1241) first establishes a TCP connection 712 with the intranet terminal 162 (the signaling section 1642) via the call controlling apparatus 150, and then sends a signaling message 714 indicative of a call termination or a call connection request in accordance with H.323, to the terminal 162 (the signaling section 1642). The signaling message 714 contains information required for the media communication between the MM. C. relay server 120 and the terminal 162, i.e., the IP address and the port number which are used for the multimedia communication by the MM. C. relay server 120, and the type of the media of the service or communication (for example, only audio, audio and video, or the like) which is requested by the relay server 120.

The call controlling apparatus 150 determines which one of the terminals 162 to 166 is caused to terminate the call or to ring, so that the TCP connection 712 is established between the MM. C. relay server 120 and the determined terminal 162. The call controlling function of the call controlling apparatus 150 may be incorporated into the MM. C. relay server 120.

When the terminal 162 (the signaling section 1642) can establish a call or when the operator or agent receives the terminating call on the terminal, it sends, in response to the signaling message 714, a signaling completion message 716 indicative of call completion or call connection completion to the MM. C. relay server 120, to thereby establish the call. The completion message 716 contains a code indicative of completion of signaling, and further information required for the media communication between the terminal 162 and the MM. C. relay server 120, i.e., the IP address and the port number which are used for the media communication by the terminal 162, and the type of the media of the service or communication (for example, only audio, audio and video, or the like), the request for which is accepted by the terminal.

In response to the reception of the signaling completion message 716, the MM. C. relay server 120 (the component 1241) sends a call termination completion message 718 to the MM. C. server 110 (the component 1141). The call termination completion message 718 contains a code indicative of completion of signaling, and further information required for performing media communication between the MM. C. relay server 120 and the MM. C. server 110, i.e., the IP address and the port number which are used for the media communication by the MM. C. relay server 120, and the type of the media of the service or communication, the request for which is accepted by the relay server.

In response to the reception of the call termination completion message 718, the MM. C. server 110 (the component 1141) sends a signaling completion message 720 indicative of completion of the call connection to the terminal 240 or 270 (the signaling section 2402). The signaling completion message 720 contains a code indicative of completion of signaling, and further information required for the media communication between the terminal 240 or 270 and the MM. C. server 110, i.e., the IP address and the port number which are used for the media communication by the MM. C. server 110, and the type of the media of the service or communication which is accepted by the server 110.

In response to the reception of the signaling completion message 720, the terminal 240 or 270 establishes a call. Thus the user of the terminal 240 or 270 can perform multimedia communication with the operator or agent of the terminal 162 of the call center 10 (such as IP telephony) with each other.

After that, the communication procedure enters Phase III of FIG. 26, 27 or 28 which will be described later.

When all of the terminals 162 to 166 are busy, the call controlling apparatus 150 or a determined one of the terminals 162 to 166 sends a signaling message indicative of a busy status or completion of release to the MM. C. relay server 120. In response to the reception of the message, the MM. C. relay server 120 sends a busy or release message to the MM. C. server 110. In response to the reception of the message, the MM. C. server 110 sends a signaling message indicative of a busy status or completion of release to the terminal 240 or 270.

Referring back to FIG. 23, in Phase II after Phase I, when the user of the external network terminal 240 or 270 activates a multimedia communication application on the terminal to originate a call to the call center 10, similarly, the terminal 240 or 270 first establishes the TCP connection 706 with the MM. C. server 110, and then sends the signaling message 708 indicative of an originating call or a call connection request to the MM. C. server 110. In response to the reception of the message, the MM. C. server 110 sends the call termination request message 710 to the MM. C. relay server 120.

In response to the reception of the call termination request 710, the MM. C. relay server 120 (the component 1241) determines which one of the terminals 162 to 166 is caused to terminate the call or to ring, and sends a connection request 732 to the terminal 162 through the other communication path 638 described above.

When IRC (Internet Relay Chat) clients which are operating on the MM. C. relay server 120 and the intranet terminal 162 are connected to an IRC server on the intranet 140, for example, the SIG. C. relay component 1241 sends a connection request to a process of the IRC client on the MM. C. relay server 120 in response to the reception of the call termination request message 710 from the MM. C. server 110, through inter-process communication (which can be provided by UNIX domain socket, WindowMessage or the like). In response to the reception of the connection request, the IRC client on the server 120 selects one of the terminals 162 to 166 in the same manner as the call controlling apparatus 150 does, and sends a connection request to the IRC client operating on the selected terminal via the IRC server. In response to the reception of the connection request, the IRC client on the terminal 162 sends a connection request to a VoIP application which is operating on the terminal. The signaling section 1642 of the terminal 162 receives the connection request via a message through the VoIP application.

When the terminal 162 (the signaling section 1642) can establish a call or when the operator or agent receives the terminating call on the terminal, it first establishes, in response to the connection request 732 from the MM. C. relay server 120, a TCP connection 734 with the MM. C. relay server 120 (the component 1241), and then sends a signaling message 736 indicative of an originating call or a call connection request to the MM. C. relay server 120 (the component 1241). In response to the signaling message 736, the MM. C. relay server 120 (the component 1241) sends a signaling completion message 738 indicative of completion of the call connection or that of the call connection to the terminal 162 (the signaling section 1642), to thereby establish a call.

Next, similarly to the procedure shown in FIG. 22, the MM. C. relay server 120 sends a call termination completion message 740 to the MM. C. server 110, and the MM. C. server 110 sends a signaling completion message 742 to the terminal 240 or 270. Then, the terminal 240 or 270 establishes the call.

After that, the communication procedure enters Phase III of FIG. 26, 27 or 28 which will be described later.

Alternatively, in the signaling procedures of FIGS. 22 and 23, the MM. C. relay server 120 (the component 1241) may receive the signaling request message 710 from the SIG. C. component 1141 over another TCP connection 709 which is established with the SIG. C. component 1141 in response to the signaling message 708 that is detected by the MM. C. server 110 in an intermittent or periodic (T) monitoring period (D) in Phase II, in place of the establishment of the TCP connection 702 in Phase I immediately after the activation, as descried later with reference to FIGS. 29 to 44, the MM. C. relay server.

Referring back to FIG. 24, in Phase II after Phase I, when the operator or agent of the terminal 162 of the call center 10 activates a multimedia communication application on the terminal 162 to originate a call to the external network terminal 240 or 270, the terminal 162 (the signaling section 1642) first establishes a TCP connection 752 with the MM. C. relay server 120 (the component 1241), and then sends a signaling message 754 indicative of an originating call or a call connection request to the MM. C. relay server 120 (the component 1241). In response to the signaling message 754, the MM. C. relay server 120 (the component 1241) sends a call termination request message 756 to the MM. C. server 110 (the component 1141).

In FIG. 24, in order for the MM. C. server 110 to establish a TCP connection 758 with the specific terminal 240, 250 or 270 connected to the network 40, a specific fixed IP address or an IP telephone number must be allocated to the specific terminal 240, 250 or 270.

When the MM. C. server 110 establishes a TCP connection with the specific terminal 240 connected to the network 40 via the NAT router 210, the server 110 requests the NAT router 210 to select or designate a specific port connected to the specific terminal 240, and establishes a TCP connection with the specific terminal 240 via the selected specific port.

In response to the reception of the call termination request message 756, the MM. C. server 110 (the component 1141) first establishes a TCP connection 758 with the external network terminal 240 or 270 (the signaling section 2402), and then sends a signaling message 760 indicative of a call termination or a call connection request to the terminal 240 or 270 (the signaling section 2402). When the terminal 240 or 270 (the signaling section 2402) can establish a call or when the user receives the terminating call on the terminal, it sends, in response to the signaling message 760, a signaling completion message 762 to the MM. C. server 110 (the component 1141) to thereby establish a call. When the terminal 240 or 270 (the signaling section 2402) is busy, the terminal sends a signaling message indicative of a busy status or completion of release to the MM. C. server 110 (the component 1141).

In response to the reception of the signaling completion message 762, the MM. C. server 110 (the component 1141) sends a call termination completion message 764 to the MM. C. relay server 120 (the component 1241). In response to the reception of the call termination completion message 764, the MM. C. relay server 120 (the component 1241) sends a signaling completion message 766 to the terminal 162 (the signaling section 1642). In response to the reception of the signaling completion message 766, the terminal 162 (the signaling section 1642) establishes a call. Thus, the operator or agent of the terminal 162 of the call center 10 can communicate or talk with the user of the terminal 240 or 270. After that, the communication procedure enters Phase III of FIG. 26, 27 or 28 which will be described later.

Referring back to FIG. 25, in Phase II after Phase I, the terminal 240 or 270 (the signaling section 2402) pre-establishes a TCP connection 772 with the MM. C. server 110 (the component 1141), when, for example, the terminal is activated. When the operator or agent of the terminal 162 of the call center 10 originates a call to the external network terminal 240 or 270, the terminal 162 first establishes the TCP connection 752 with the MM. C. relay server 120, and then sends the signaling message 754 to the MM. C. relay server 120, similarly to the procedure shown in FIG. 24. In response to the signaling message 754, the MM. C. relay server 120 sends the call termination request message 756 to the MM. C. server 110.

In response to the reception of the call termination request message 756, the MM. C. server 110 sends the signaling message 760 indicative of a call termination or a call connection request to the terminal 240 or 270 over the TCP connection which has already been established. In response to the signaling message 760, similarly, the terminal 240 or 270 sends the signaling completion message 762 to the MM. C. server 110, to thereby establish a call.

Similarly to the procedure shown in FIG. 24, the MM. C. server 110 sends the call termination completion message 764 to the MM. C. relay server 120, and the MM. C. relay server 120 sends the signaling completion message 766 to the terminal 162. Then, the terminal 162 establishes a call. After that, the communication procedure enters Phase III of FIG. 26, 27 or 28, which will be described below.

Alternatively, in the signaling procedures of FIGS. 24 and 25, the MM. C. relay server 120 (the component 1241) may establish, in response to the signaling message 754 or the like, another TCP connection 713 with the SIG. C. component 1141, and send the call termination request message 756 to the MM. C. server 110 (the component 1141) over the TCP connection 713, independently of the TCP connection 702 between the SIG. C. relay component 1241 and the SIG. C. component 1141 which is established in Phase I, the MM. C. relay server may. The establishment of the TCP connection 713 may be used together with the signaling procedures which will be described with reference to FIGS. 29 to 44.

Referring back to FIG. 26, Phase III comes after Phases I and II of FIG. 22, 23, 24 or 25 and Phase I of FIG. 26, i.e., after the calls between the MM. C. server 110 and the terminal 240 or 270, and between the MM. C. server 110 and the terminal 162 are established in accordance with the signaling procedure shown in FIG. 22, 23, 24 or 25. In Phase III, the terminal 240 or 270 (the MM. C. section 2404) establishes a TCP connection 812 with the MM. C. server 110 (the MM. C. component 1161) using the IP address and the port number of the server 110 (the MM. C. component 1161) that have been determined by the signaling procedure. Then, the terminal 240 or 270 (the communication section 2404) and the MM. C. server 110 (the component 1161) transmit and/or receive a multimedia data stream 814 to and/or from each other. When the RTP is used to transmit and receive the multimedia data stream 814, the IP address and the UDP port number of the MM. C. server 110 (the component 1161) that have been determined by the signaling procedure are used. The MM. C. relay server 120 (the component 1261) and the terminal 162 (the MM. C. section 1644) establish a UDP connection 806 with each other with respective UDP ports which have been determined by the signaling procedure. The MM. C. relay server 120 (the component 1261) and the terminal 162 (the communication section 1644) transmit and/or receive a multimedia data stream 818 to and/or from each other in accordance with the RTP. The MM. C. server 110 (the component 1161) and the MM. C. relay server 120 (the component 1261)

transmit and/or receive a multimedia data stream 816 to and/or from each other over the TCP connection which has been pre-established.

Referring back to FIG. 27, in Phase III after Phases I and II of FIG. 22, 23, 24 or 25 and Phase I of FIG. 27, the MM. C. server 110 (the component 1161) establishes a TCP connection 822 with the terminal 240 or 270 (the communication section 2404). On the other hand, the MM. C. relay server 120 and the terminal 162 establish the UDP connection 806 with each other. Thus, the multimedia data stream 814 is transmitted and received between the terminal 240 or 270 and the MM. C. server 110, the multimedia data stream 816 is transmitted and received between the MM. C. server 110 and the MM. C. relay server 120, and the multimedia data stream 818 is transmitted and received between the MM. C. relay server 120 and the terminal 162.

Referring back to FIG. 28, in Phase III after Phases I and II of FIG. 22, 23, 24 or 25 and Phase I of FIG. 28, the MM. C. server 110 (the component 1161) and the terminal 240 or 270 (the communication section 2404) establish a TCP connection 832 with each other. On the other hand, the MM. C. relay server 120 and the terminal 162 establish the UDP connection 806 with each other. Thus, the multimedia data stream 814 is transmitted and received between the terminal 240 or 270 and the MM. C. server 110, the multimedia data stream 816 is transmitted and received between the MM. C. server 110 and the MM. C. relay server 120, and the multimedia data stream 818 is transmitted and received between the MM. C. relay server 120 and the terminal 162.

The call which has been established in Phase II of FIG. 22, 23, 24 or 25 is released as described below by another signaling message for call release to the MM. C. server 110 from the terminal 240 or 270 when the user releases the call, or by another signaling message for call release to the MM. C. relay server 120 from the terminal 162 when the operator releases the call. In response to the call release message from the terminal 240 or 270 (the communication section 2404), the MM. C. server 110 (the component 1141) sends a call release request to the MM. C. relay server 120 (the component 1241), and the MM. C. relay server 120 (the component 1241) sends the call release message in the signaling to the terminal 162 (the communication section 1644). In response to the call release message from the terminal 162 (the communication section 1644), the MM. C. relay server 120 (the component 1241) sends a call release request to the MM. C. server 110 (the component 1141), and the server 110 (the component 1141) sends the call release message in the signaling to the terminal 240 or 270 (the communication section 2404). After the servers 110 and 120 send the call release message and the call release request, the servers return to the state of waiting for a call termination request in FIG. 22, 23, 24 or 25, and to the state of waiting for receiving a multimedia data stream in FIG. 26, 27 or 28, and the connection is held for another call.

When the call has been established by the procedure of FIG. 22, 23 or 24, the TCP connections between the terminal 240 or 270 and the MM. C. server 110, and between the MM. C. relay server 120 and the terminal 162 are released after transmission and reception of the call release message. When the call has been established by the procedure of FIG. 25, the TCP connection between the MM. C. relay server 120 and the terminal 162 is released, but the TCP connection between the terminal 240 or 270 and the MM. C. server 110 is held for another call after transmission and reception of the call release message.

As described above, a TCP connection is pre-established between the MM. C. server 110 and the MM. C. relay server 120. When a call occurs on either one of the terminals, a TCP connection is established between the MM. C. server 110 and the terminal 240 or 270 to perform the signaling procedure over the established TCP connection, or the signaling procedure is performed over the pre-established TCP connection, and a TCP connection is established between the MM. C. relay server 120 and the terminal 162 to perform the signaling procedure over the established TCP connection. Thus, the terminal 240 or 270 and the terminal 162 can perform multimedia communication with each other through the firewalls 80 and 85 or 90 which are associated with the DMZ 100. The calls between the terminal 240 or 270 and the MM. C. server 110, and between the terminal 162 and the MM. C. server 110 are terminated by the MM. C. server 110, and associated and coupled with each other by the MM. C. server 110.

In FIGS. 22 to 28, the MM. C. relay server 120 pre-establishes a TCP connection with the MM. C. server 110, and, when a call is established, bidirectional media communication develops. Each of the MM. C. components 1161 to 1164 of the MM. C. server 110 uses ports dedicated for a call related to a specific type of media communication. Thus, at least two listen ports, i.e., one listen port for audio for example, and one listen port for the RTP/RTCP, are required. The number of ports of each component depends on the number of types of media communication, independently of the number of calls to be handled.

For the standard RTP/RTCP, a UDP port of each component is used. In this case, calls use different ports, and hence the number of listen ports depends on the number of calls to be handled and the number of types of media communication. The required number of ports is at least twice the number of calls to be handled. In this case, the communication quality and the speech quality are excellent.

In the embodiments described above, the TCP connection between the MM. C. relay server 120 and the MM. C. server 110 in the DMZ 100 is pre-established and maintained permanently. When the TCP connection between the MM. C. relay server 120 and the MM. C. server 110 in the DMZ 100 is permanently maintained, however, the user terminals 240 to 270 connected to the external network 40 can communicate with the intranet 140 via the MM. C. server 110. Consequently, there is a risk such that a malicious user hacks the MM. C. server 110. When such a user may have an illegal access to the MM. C. server 110, the MM. C. relay server 120 also may be illegally accessed by the user through the connection, because the MM. C. relay server 120 is permanently connected to the MM. C. server 110. Thus, the administrator of the call center 10 or the intranet 140 may have anxiety about such an undesirable access.

The inventors have recognized that such an undesirable access can be prevented by intermittently or periodically establishing and releasing a TCP connection between the MM. C. relay server 120 and the MM. C. server 110, detecting the presence of a call connection request by the external terminal 240 or 270 on the established TCP connection, and establishing a call in response to the detection.

The following describes other signaling procedures and multimedia communication procedures, in accordance with the invention, which are modifications of the signaling procedures and the multimedia communication procedures shown in FIGS. 22, 23, and 26 to 28.

Figure 29:
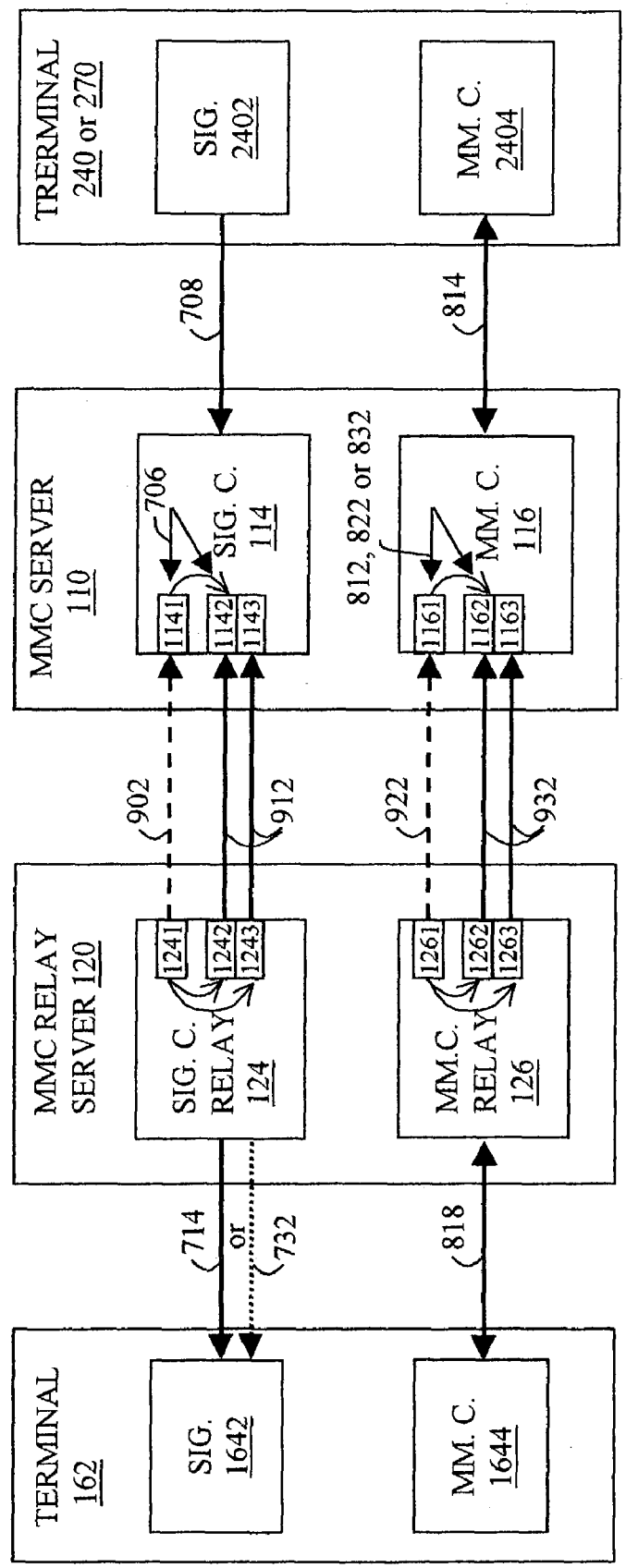
FIG. 29 shows a modification of the signaling procedures and the multimedia communication procedures shown in FIGS. 22, 23, and 26 to 28 in accordance with the invention.

FIG. 29 shows a modification of the signaling procedures and the multimedia communication procedures shown in FIGS. 22, 23, and 26 to 28, in accordance with the invention. In FIG. 29, particularly, the signaling procedure between the signaling communication relay section 124 and the signaling communication section 114, and the multimedia communication procedure between the multimedia communication relay section 126 and the multimedia communication section 116 are different from those shown in FIGS. 22, 23, and 26 to 28. FIGS. 31, 33, 35, and 37 to 40 show other modifications of the signaling procedures and the multimedia communication procedures shown in FIGS. 22, 23, and 26 to 28, in accordance with the invention.

Referring to FIG. 29, in the MM. C. relay server 120, the specific SIG. C. relay component 1241 of the SIG. C. relay section 124 (FIGS. 4, 6, 8 and 10) establishes one TCP connection 902 with the specific SIG. C. component 1141 of the SIG. C. section 114 (FIGS. 3, 5, 7 and 9) intermittently or periodically (period T) for an interval of predetermined duration (D), and then, on the established TCP connection 902, monitors and detects the presence or absence of a call connection request by the external terminal 240 or 270 received by the SIG. C. section 114.

Figure 30:
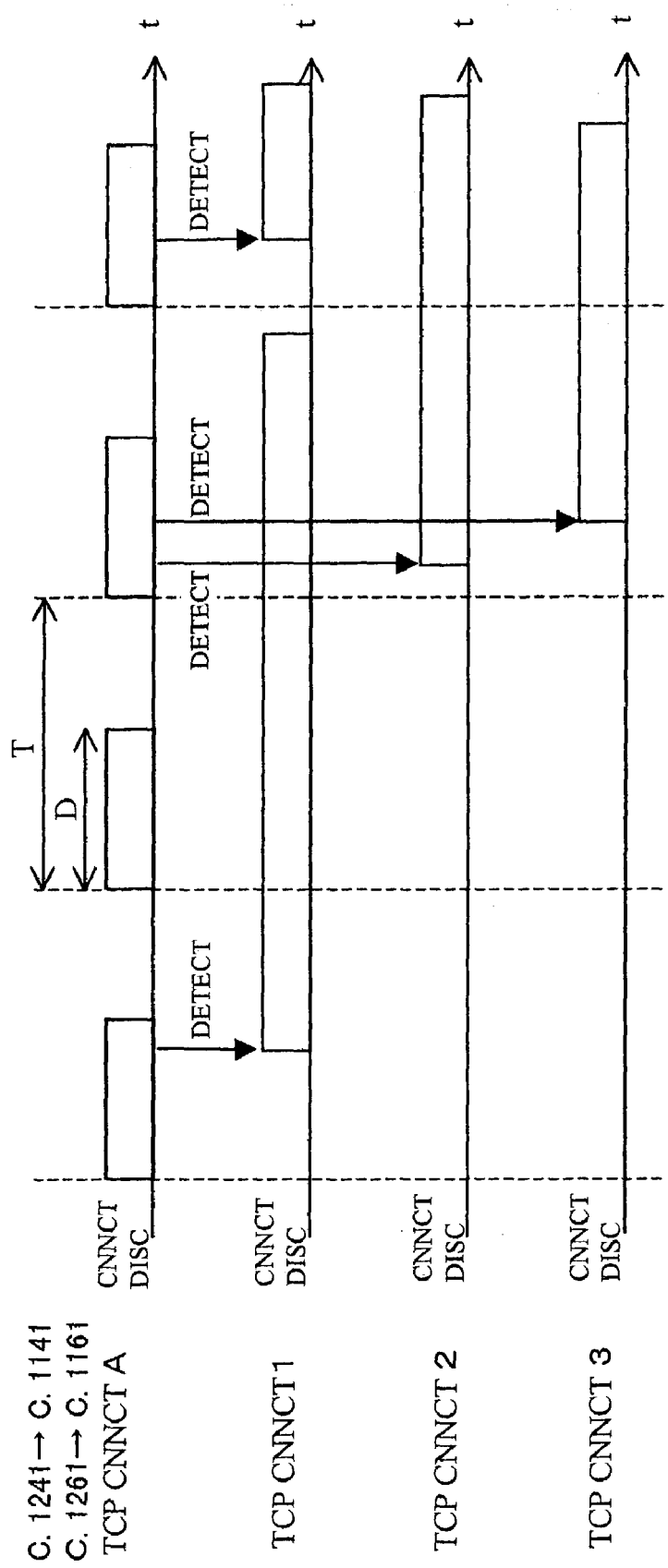
FIG. 30 shows a time chart of the TCP connection which is established by the SIG. C. relay component with the SIG. C. component, and by the MM. C. relay component with the MM. C. component intermittently or periodically for an interval of the predetermined duration, and call-connection TCP connections, each of which is established in response to detection of the presence of a call connection request.

FIG. 30 shows a time chart of the TCP connection A (902 and 922) which is established by the SIG. C. relay component 1241 with the SIG. C. component 1141, and by the MM. C. relay component 1261 with the MM. C. component 1161 intermittently or periodically (period T) for an interval of the predetermined duration (D), and call-connection TCP connections 1 to 3 (912 and 932), each of which is established in response to detection of the presence of a call connection request. A disconnected state for at least a few milli-seconds occurs between adjacent duration intervals (D) in the intermittent or periodic TCP connection A. The SIG. C. relay component 1241 and the SIG. C. component 1141 may change IP addresses and port numbers between successive TCP connection duration intervals (D), i.e. an IP address and a port number for one TCP connection may be different from those for the next TCP connection. As the duration D of each TCP connection is shorter, the security of the intranet is higher.

The SIG. C. component 1141 waits for the establishment of the TCP connection 706 with the signaling section 2402 of the terminal 240 or 270 shown in FIGS. 22 and 23, and for the reception of the signaling message 708 indicative of a call connection request, from the signaling section 2402. While the TCP connection 902 is established between the SIG. C. component 1141 and the SIG. C. relay component 1241, the SIG. C. component 1141 immediately sends, in response to the reception of the signaling message 708 from the terminal 240 or 270, on the TCP connection 902 a message indicative of the presence of a call connection request by the external terminal 240 or 270 to the SIG. C. relay component 1241. When the TCP connection 902 is not established between the SIG. C. component 1141 and the SIG. C. relay component 1241, the SIG. C. component 1141 waits for the TCP connection 902 to be established, and sends, in response to the reception of the signaling message 708 from the terminal 240 or 270, on the TCP connection 902 a message indicative of the presence of a call connection request by the external terminal 240 or 270 to the SIG. C. relay component 1241 immediately after the TCP connection 902 is established between the SIG. C. component 1141 and the SIG. C. relay component 1241. In response to the reception of the signaling message 708 from the terminal 240 or 270, the SIG. C. component 1141 passes or gives the connection 706 with the terminal 240 or 270 over to the SIG. C. component 1142 which is currently free or is not currently used, i.e. causes the SIG. C. component 1142 to inherit or take over the connection 706 from the SIG. C. component 1141.

The SIG. C. relay component 1241 intermittently or periodically establishes the TCP connection 902 with the SIG. C. component 1141. When SIG. C. relay component 1241 receives the presence of a call connection request, from the SIG. C. component 1141, on the established TCP connection, it causes the other SIG. C. relay component 1242-1244 to establish the TCP connection 1-3 912 with the other SIG. C. component 1142-1144 (FIG. 30). The other SIG. C. relay component 1242-1244 further receives the message 710 indicative of a call termination request or a call connection request on the TCP connection 912 (FIGS. 22 and 23). The SIG. C. relay component 1242-1244 then establishes the TCP connection 712 with the intranet terminal 162 and sends the signaling message 714 as shown in FIG. 22, or sends the connection request 732 to the terminal 162 through the communication path 638 as shown in FIG. 23. The subsequent signaling procedures are performed in accordance with FIGS. 22 and 23. After that, another TCP connection 712 is established in a similar manner.

After that, one of the SIG. C. relay component 1242-1244 and the SIG. C. component 1142-1144 between which a call is established sends the call release request to the other component in response to the call release message from the terminal 162 or the terminal 240 or 270, and then releases the TCP connection 1-3 912 between the two components.

After a call is established between the MM. C. server 110 and the terminal 240 or 270 and between the MM. C. server 110 and the terminal 162, the terminal 240 or 270 transmits and receives the multimedia data stream 814 on the TCP connection 812, 822 or 832 (FIGS. 26 to 28) which has been established with the MM. C. server 110. The terminal 162 transmits and receives the multimedia data stream 818 on the UDP connection 806 which has been established with the MM. C. relay server 120.

On the other hand, in the MM. C. relay server 120, the specific MM. C. relay component 1261 of the MM. C. relay section 126 establishes the TCP connection 922 with the specific MM. C. component 1161 of the MM. C. section 116 intermittently or periodically (period T) for an interval of the predetermined duration (D), and monitors and detects, on the TCP connection 922, the presence of a received multimedia data stream in the specific MM. C. component 1161.

The MM. C. component 116.1 of the MM. C. server 110 waits for the reception a multimedia data stream on the connection 812, 822 or 832 shown in FIGS. 26 to 28 established with the multimedia communication section 2404 of the terminal 240 or 270. While the TCP connection 922 is established between the MM. C. component 1161 and the MM. C. relay component 1261, the MM. C. component 1161 immediately sends, in response to the presence of a received multimedia data stream, on the TCP connection 922 a message indicative of the presence of a received multimedia data stream to the MM. C. relay component 1261. When the TCP connection 922 is not established between the MM. C. component 1161 and the MM. C. relay component 1261, the MM. C. component 1161 waits for the TCP connection 922 to be established, and sends, in response to the presence of a received multimedia data stream, on the TCP connection 922 a message indicative of the presence of a received multimedia data stream to the MM. C. relay component 1261 immediately after the TCP connection 922 is established between the MM. C. component 1161 and the MM. C. relay component 1261. In response to the message indicative of the presence of a received multimedia data stream from the terminal 240 or 270, the MM. C. component 1161 passes the connection 812, 822 or 832 with the terminal 240 or 270, to the MM. C. component 1162 which is currently free.

In response to the reception of the message indicative of the presence of a received multimedia data stream, the MM. C. relay component 1261 causes one of the other MM. C. relay components 1262 to 1264 to establish the TCP connection 932 with one of the other MM. C. components 1162 to 1164. The MM. C. relay component (1162-1164) sends the multimedia data stream 816 on the TCP connection 932 to the MM. C. relay component (1262-1264). As shown in FIGS. 24 to 26, the MM. C. relay component (1262-1264) sends the multimedia data stream 818 on the UDP connection 806 to the multimedia communication section 1644 of the terminal 162.

In response to the reception of the connection release message from the terminal 162 or the terminal 240 or 270, one of the MM. C. relay component 1262-1264 and the MM. C. component 1162-1164 sends the connection release request to the other component on the TCP connection 1-3 932, and then releases the TCP connection 1-3 932 between the two components.

Figure 31:
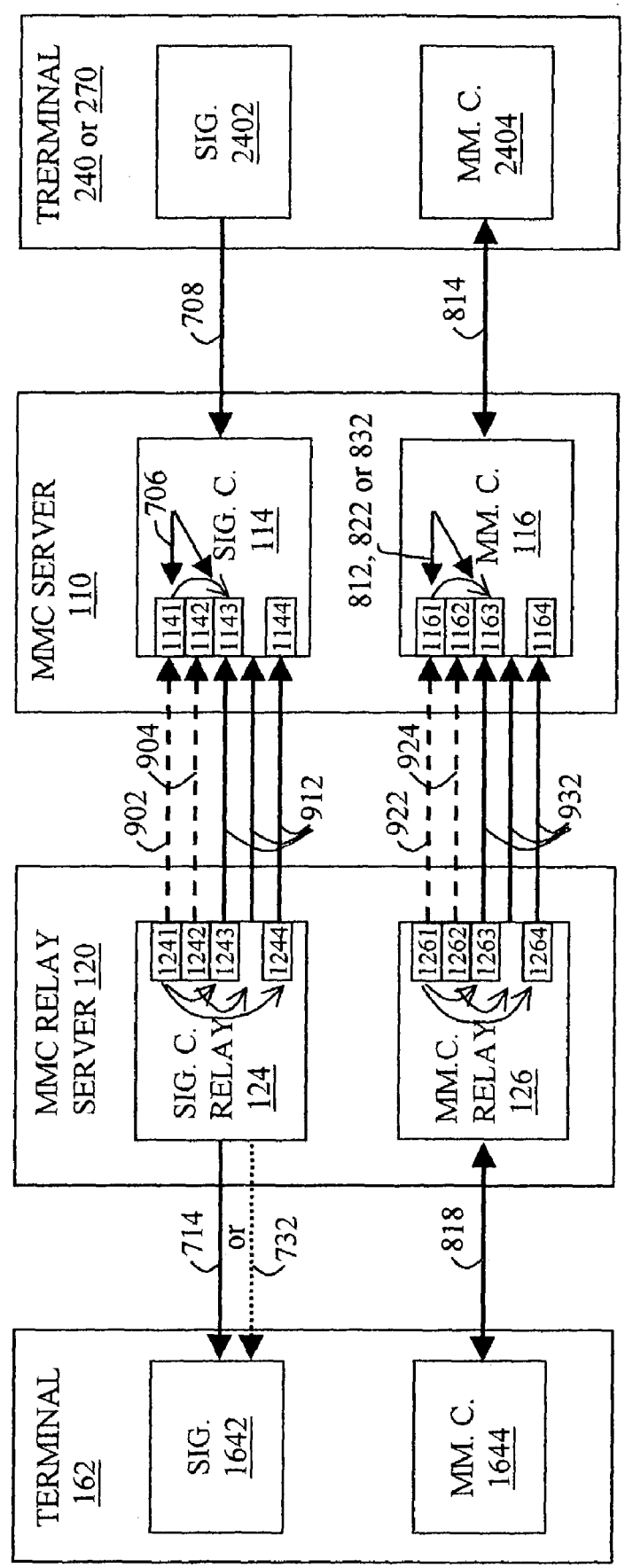
FIG. 31 shows a modification of the signaling procedure and the multimedia communication procedure of FIG. 29.

FIG. 31 shows a modification of the signaling procedure and the multimedia communication procedure of FIG. 29. In the figure, the two specific SIG. C. relay components 1241 and 1242 intermittently or periodically establish in an alternate manner the respective TCP connections 902 and 904 (A and B) with the SIG. C. components 1141 and 1142, and monitor and detect the presence of a call connection request by the external terminal 240 or 270 in the SIG. C. components 1141 and 1142, on the respective TCP connections 902 and 904 (A and B). The intermittent or periodic TCP connections 902 and 904 (A and B) are alternately established so that, in a disconnected state of one of the TCP connections, the other TCP connection is established, whereby the presence of a call connection request by the external terminal 240 or 270 in the SIG. C. components 1141 and 1142 can be monitored and detected without delay. Each of the SIG. C. relay components 1241 and 1242, and each of the SIG. C. components 1141 and 1142 operate in the same manner as the SIG. C. relay component 1241 and the SIG. C. component 1141 of FIG. 29, respectively. Alternatively, three or more specific SIG. C. relay components may intermittently or periodically establish in a cyclic manner the respective TCP connections 902 to 904 with the respective SIG. C. components, and monitor and detect the presence of a call connection request by the external terminal 240 or 270 in the SIG. C. component, on the respective TCP connections 902 to 904.

Figure 32:
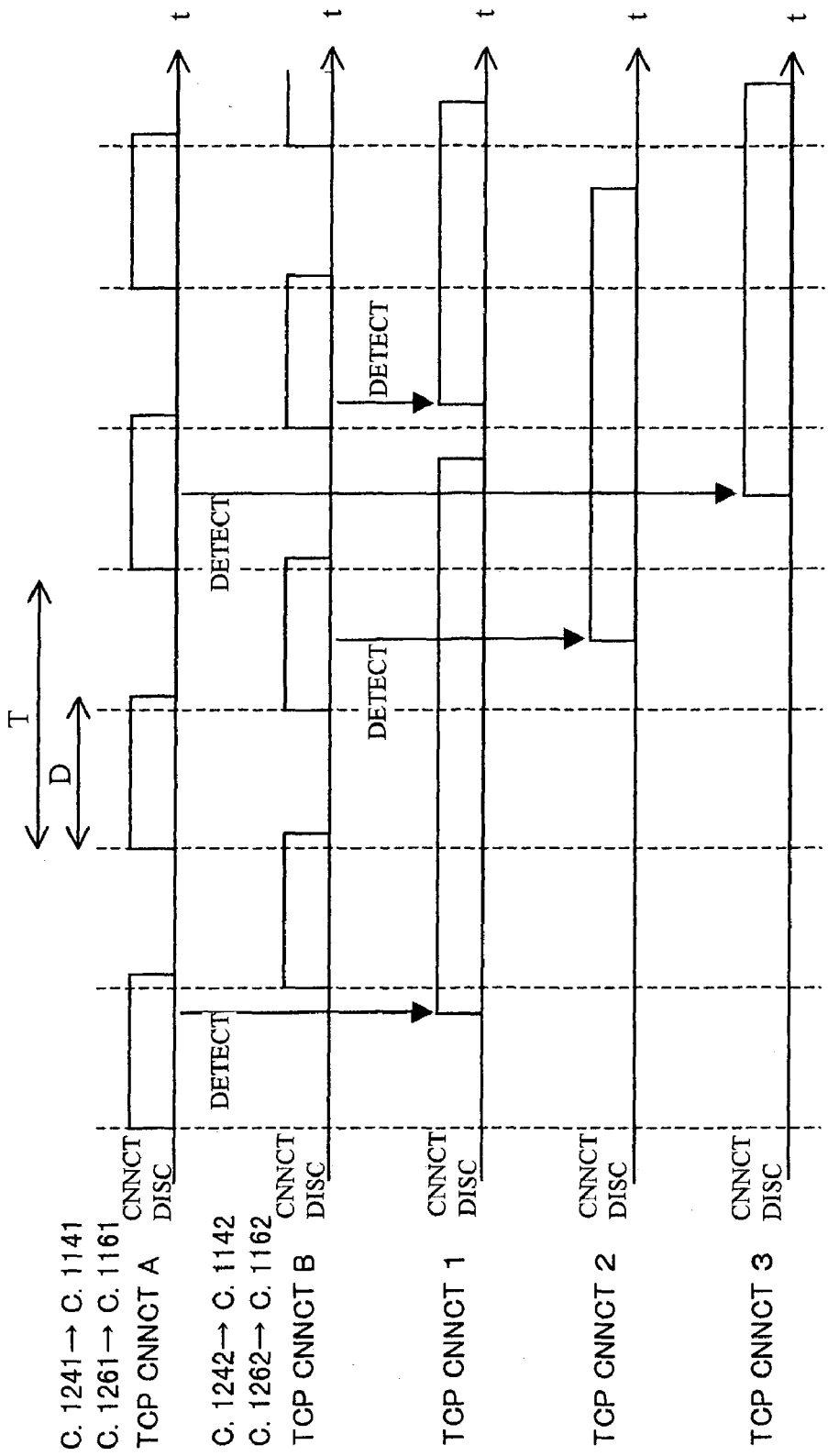
FIG. 32 shows a time chart of TCP connections which are intermittently or periodically established with the SIG. C. components by the SIG. C. relay components, and with the MM. C. components by the MM. C. relay components.

FIG. 32 shows a time chart of TCP connections 902 and 904, and 922 and 924 (A and B) which are intermittently or periodically established with the SIG. C. components 1141 and 1142 by the SIG. C. relay components 1241 and 1242, and with the MM. C. components 1161 and 1162 by the MM. C. relay components 1261 and 1262. A disconnected state for at least a few milli-seconds is produced between adjacent duration intervals (D) in each of the intermittent or periodic TCP connections A and B. Each of the SIG. C. relay components 1241 and 1242, and each of the SIG. C. components 1141 and 1142 may change IP addresses and port numbers between successive intermittent TCP connection duration intervals. As the duration D of each of the TCP connections 902 and 904, and 922 and 924 (A and B) is shorter, the security of the intranet is higher.

In FIG. 31, the two specific MM. C. relay components 1261 and 1262 intermittently or periodically establish in an alternate manner the respective TCP connections 922 and 924 (A and B) with the MM. C. components 1161 and 1162, and monitor and detect the presence of a received multimedia data stream from the MM. C. components 1161 and 1162, on the respective TCP connections 922 and 924 (A and B). The intermittent or periodic TCP connections 922 and 924 (A and B) are alternately established so that, in a disconnected state of one of the connections, the other connection is established, whereby the presence of different multimedia data streams from the MM. C. components 1161 and 1162 can be monitored and detected without delay. Each of the MM. C. relay components 1261 and 1262, and each of the MM. C. components 1161 and 1162 operate in the same manner as the MM. C. relay component 1261 and the MM. C. component 1161 of FIG. 29, respectively. Alternatively, three or more specific MM. C. relay components may intermittently or periodically establish in a cyclic manner the respective TCP connections 922 to 924 with the respective MM. C. components, and monitor and detect the presence of a call connection request by the external terminal 240 or 270 in the SIG. C. component, on the respective TCP connections 922 to 924.

Figure 33:
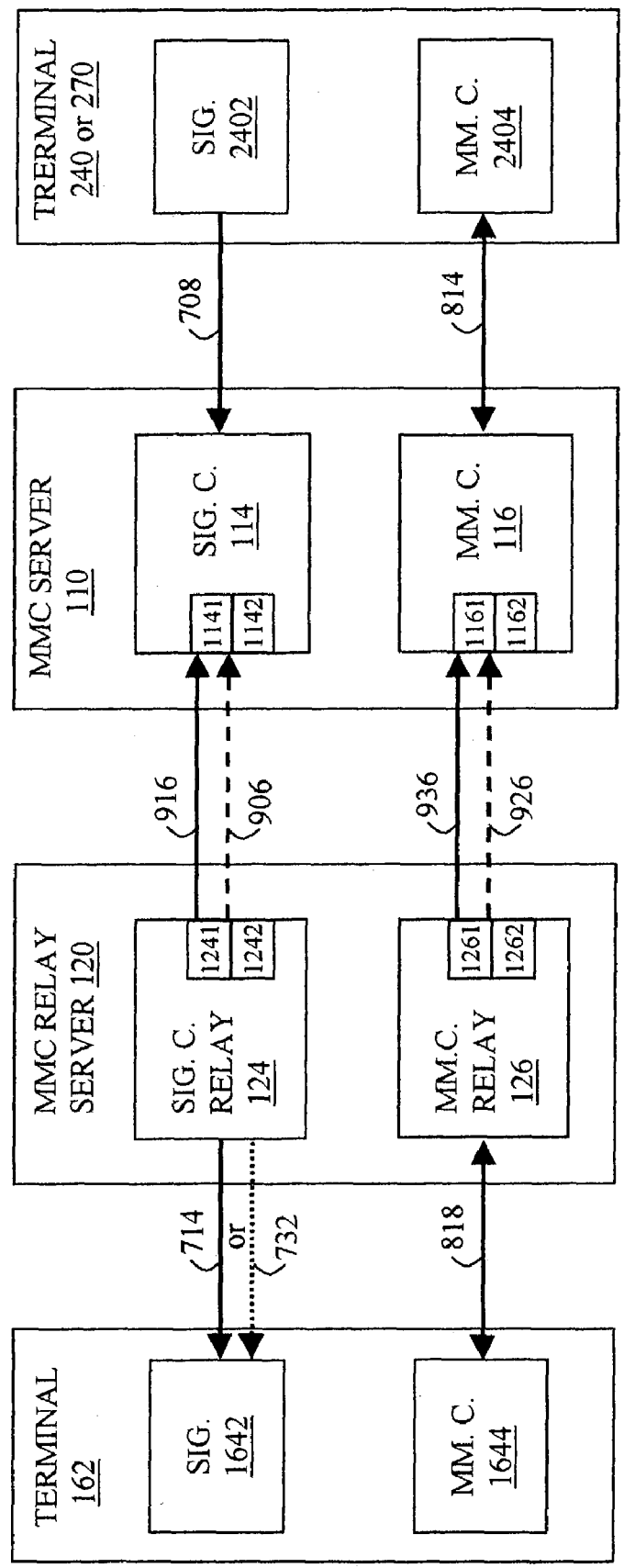
FIG. 33 shows another modification of the signaling procedures and the multimedia communication procedures shown in FIGS. 22, 23, and 26 to 28, in accordance with the invention.

Now, referring to FIG. 33, in the MM. C. relay server 120, one of the SIG. C. relay components 1241 to 1244 of the SIG. C. relay section 124 establishes the TCP connection 906 with one of the SIG. C. components 1141 to 1144 of the SIG. C. section 114 intermittently or periodically (period T) for an interval of the predetermined duration (D), and monitors and detects, on the established TCP connection 906, the presence of a call connection request by the external terminal 240 or 270 in the SIG. C. component 1141. In any period of time T (the duration D) for establishing a TCP connection, only one of the SIG. C. relay components 1241 to 1244 establishes and releases the TCP connection 906.

Figure 34:
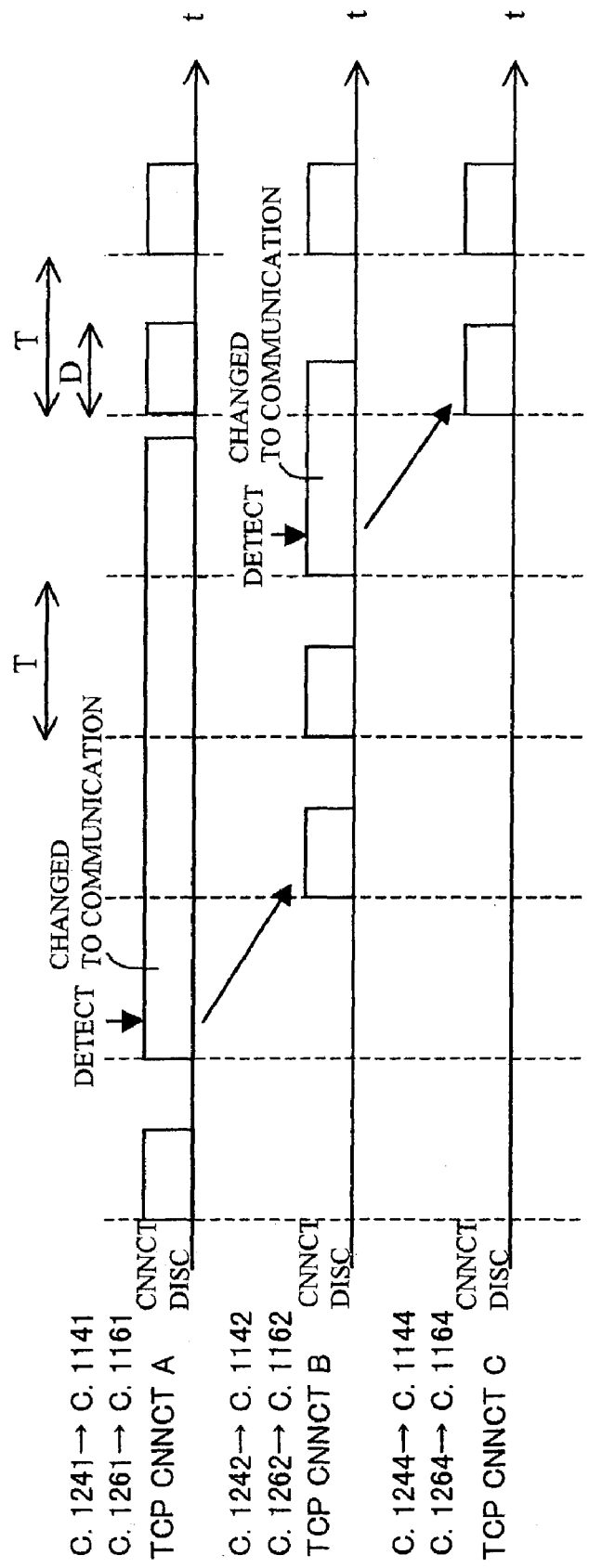
FIG. 34 shows a time chart of TCP connections which are established intermittently or periodically for an interval of the predetermined duration with one of the SIG. C. components by one of the SIG. C. relay components, and with one of the MM. C. components by one of the MM. C. relay components.

FIG. 34 shows a time chart of TCP connections 906 and 926 (A to C) which are established intermittently or periodically (period T) for an interval of the predetermined duration (D) with one of the SIG. C. components 1141 to 1144 by one of the SIG. C. relay components 1241 to 1244, and with one of the MM. C. components 1161 to 1164 by one of the MM. C. relay components 1261 to 1264. A disconnected state for at least a few milli-seconds is produced between adjacent duration intervals (D) in the intermittent or periodic TCP connections 906 and 926 (A to C). The SIG. C. relay component 1241 and the SIG. C. component 1141 change IP addresses and port numbers between successive intermittent TCP connection duration intervals (D). As the duration D of each of the TCP connections 906 and 926 is shorter, the security of the intranet is higher.

The first SIG. C. component 1141 of the MM. C. server 110 waits for the establishment of the TCP connection 706 shown in FIGS. 22 and 23 with the signaling section 2402 of the terminal 240 or 270, and the reception of the signaling message 708 indicative of a call connection request, from the signaling section 2402. While the TCP connection 906 (A) is established between the first SIG. C. component 1141 and the first SIG. C. relay component 1241, the first SIG. C. component 1141 immediately sends, in response with the reception of the signaling message 708, on the TCP connection 906 a message indicative of the presence of a call connection request by the external terminal 240 or 270 to the first SIG. C. relay component 1241. When the TCP connection 906 (A) is not established between the first SIG. C. component 1141 and the first SIG. C. relay component 1241, the first SIG. C. component 1141 waits for the TCP connection 906 (A) to be established, and sends, in response with the reception of the signaling message 708, on the TCP connection 906 a message indicative of the presence of a call connection request by the external terminal 240 or 270 to the first SIG. C. relay component 1241 immediately after the TCP connection is already established between the first SIG. C. component 1141 and the first SIG. C. relay component 1241.

The first SIG. C. relay component 1241 intermittently or periodically establishes the TCP connection 906 (A) with the first SIG. C. component 1141, and when the first SIG. C. relay component 1241 receives a message indicative of the presence of a call connection request by the external terminal 240 or 270, from the first SIG. C. component 1141 on the established TCP connection 906 (A), the SIG. C. relay component changes the intermittent or periodic TCP connection 906 (A) to a TCP connection 916 (A) for call establishment and maintains the TCP connection until the call is released, and receives, on the TCP connections 916 (A), the message 710 (FIGS. 22 and 23) indicative of a call termination request or a call connection request from the first SIG. C. component 1141. The first SIG. C. relay component 1241 then establishes the TCP connection 712 with the intranet terminal 162 and sends the signaling message 714 as shown in FIG. 22, or sends the connection request 732 to the terminal 162 through the communication path 638 as shown in FIG. 23. The subsequent signaling procedure is performed in accordance with FIGS. 22 and 23.

After a call is established over the TCP connections 916 (A) established by the first SIG. C. relay component 1241, the second SIG. C. relay component 1242 intermittently or periodically establishes, at the next timing or in the next period (T), the other TCP connection 906 (B) with the second SIG. C. component 1142, and monitors and detects, on the TCP connection 906 (B), the presence of a call connection request by the external terminal 240 or 270 in the SIG. C. component 1142. After that, the second SIG. C. relay component 1242 and the second SIG. C. component 1142 operate in a similar manner as the first SIG. C. relay component 1241 and the first SIG. C. component 1141, respectively. When a call is established and maintained on the TCP connections 916 (A and B) established by the first and second SIG. C. relay components 1241 and 1242, the third SIG. C. relay component 1243 and the third SIG. C. component 1143 operate at the next timing or in the next period (T) in a similar manner as the first and second SIG. C. relay components 1241 and 1242 and the first and second SIG. C. components 1141 and 1142.

Thus, one of the SIG. C. relay components 1241 to 1244 is used to establish the TCP connection 906 (A-C) at intermittent or periodic timings with one of the SIG. C. components 1141 to 1144, the presence of a call connection request by the external terminal 240 or 270 in the SIG. C. components 1141 to 1144 is monitored and detected on the TCP connection 906 (A-C), the TCP connection 906 (A-C) are changed in response to a call connection request to the TCP connection 916 (A to C) for call establishment, and the TCP connection is maintained until the call is released.

After a call is established between the MM. C. server 110 and the terminal 240 or 270 and between the MM. C. server 110 and the terminal 162, the terminal 240 or 270 transmits and receives the multimedia data stream 814 on the TCP connection 812, 822, or 832 which is established with the MM. C. server 110. The terminal 162 transmits and receives the multimedia data stream 818 on the UDP connection 806 which is established with the MM. C. relay server 120.

After that, one of the SIG. C. relay component 1241-1244 and the SIG. C. component 1141-1144 between which a call is established sends the call release request to the other component in response to the call release message from the terminal 162 or the terminal 240 or 270, and then releases the TCP connection 1-3 916 between the two components.

On the other hand, in the MM. C. relay server 120, by using the first MM. C. relay component 1261 of the MM. C. relay section 126, the TCP connection 926 (A) is intermittently or periodically established with the first MM. C. component 1161 of the MM. C. section 116, and the presence of a received multimedia data stream from the first MM. C. component 1161 is monitored and detected on the TCP connection 926 (A). When the presence of a received multimedia data stream is detected, the intermittent or periodic TCP connection 926 (A) is changed to a TCP connection 936 (A) for multimedia communication, and the TCP connection is maintained until the call is released. A multimedia data stream is received on the TCP connection 936 (A) from the first MM. C. component 1161. The multimedia data stream 818 is transmitted on the UDP connection 806 which is established with the multimedia communication section 1644 of the terminal 162. The subsequent multimedia communication procedure is performed in accordance with FIGS. 26 to 28.

After a second call is established between the MM. C. server 110 and the terminal 240 or 270 and between the MM. C. server 110 and the terminal 162, establishment and release of the second intermittent or periodic TCP connection 926 (B), a change of the TCP connection 926 (B) to the second TCP connection 936 (B), reception of a multimedia data stream from the second MM. C. component 1162, and transmission of the multimedia data stream 818 from the terminal 162 are similarly performed. The other intermittent or periodic TCP connection 926 (C) is also similarly processed.

Thus, one of the MM. C. relay component 1261-1264 is used to establish the TCP connection 926 (A-C) at intermittent or periodic timings with one of the MM. C. components 1161 to 1164, the presence of a multimedia data stream in the external terminal 240 or 270 in the MM. C. components 1161 to 1164 is monitored and detected on the TCP connections 926 (A to C), the TCP connection 926 (A-C) is changed in response to the presence of received multimedia data stream to the TCP connection 936 (A-C) for multimedia communication, and the TCP connection is maintained until the call is released.

Figure 35:
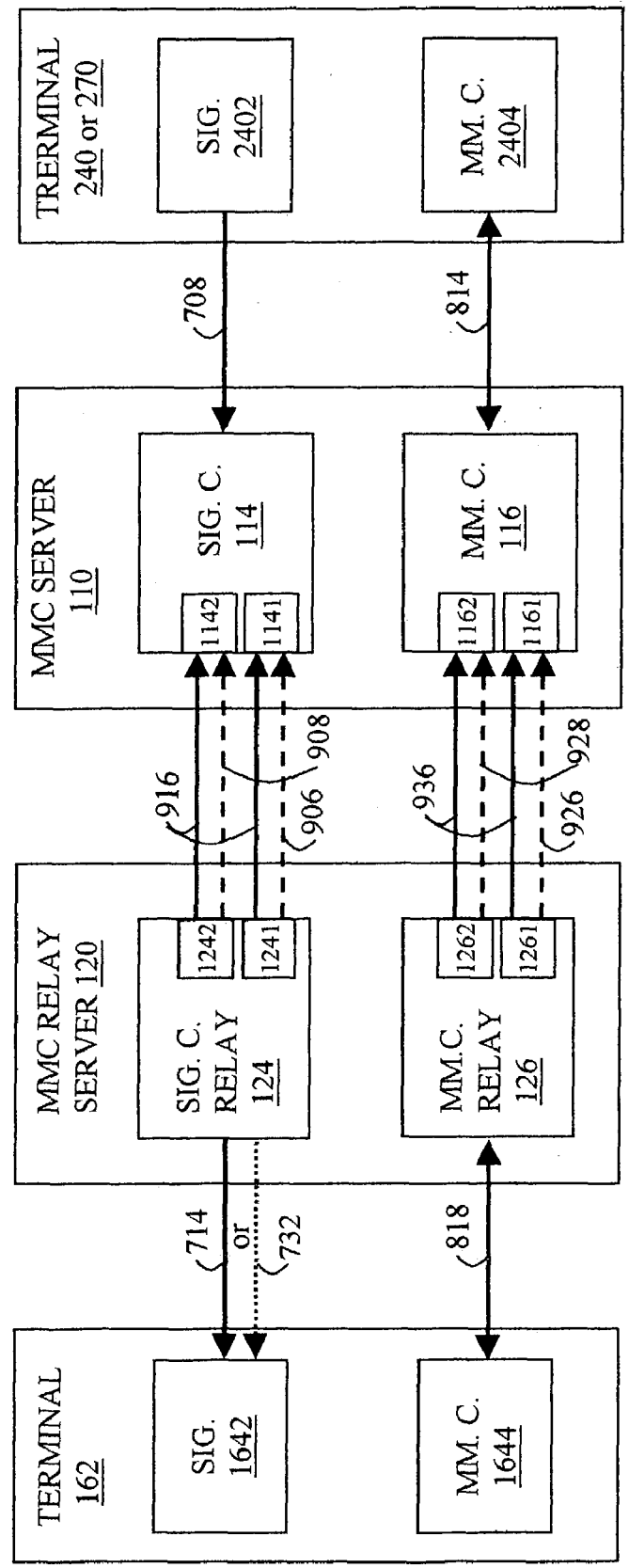
FIG. 35 shows a further modification of the signaling procedures and the multimedia communication procedures shown in FIGS. 22, 23, and 26 to 28, in accordance with the invention.

FIG. 35 shows a modification of the signaling procedure and the multimedia communication procedure of FIG. 33. In the figure, two of the SIG. C. relay components 1241 to 1244 intermittently or periodically establish in an alternate manner the respective TCP connections 906 and 908 (A to D) with two of the SIG. C. components 1141 to 1144, and monitor and detect the presence of a call connection request by the external terminal 240 or 270 in the SIG. C. section 114, on the respective TCP connections 906 and 908 (A to D). The intermittent or periodic TCP connections are alternately established so that, in a disconnected state of one of the TCP connections, the other TCP connection is established, whereby the presence of a call connection request by the external terminal 240 or 270 in the SIG. C. section 114 can be monitored and detected without delay. In an arbitrary time T for establishing a TCP connection, two of the SIG. C. relay components 1241 to 1244 alternately establish the TCP connection 906. Two of the SIG. C. relay components 1241 to 1244, and two of the SIG. C. components 1141 to 1144 operate in the same manner as one of the SIG. C. relay components 1241 to 1244 and one of the SIG. C. components 1141 to 1144 of FIG. 33, respectively.

Figure 36:
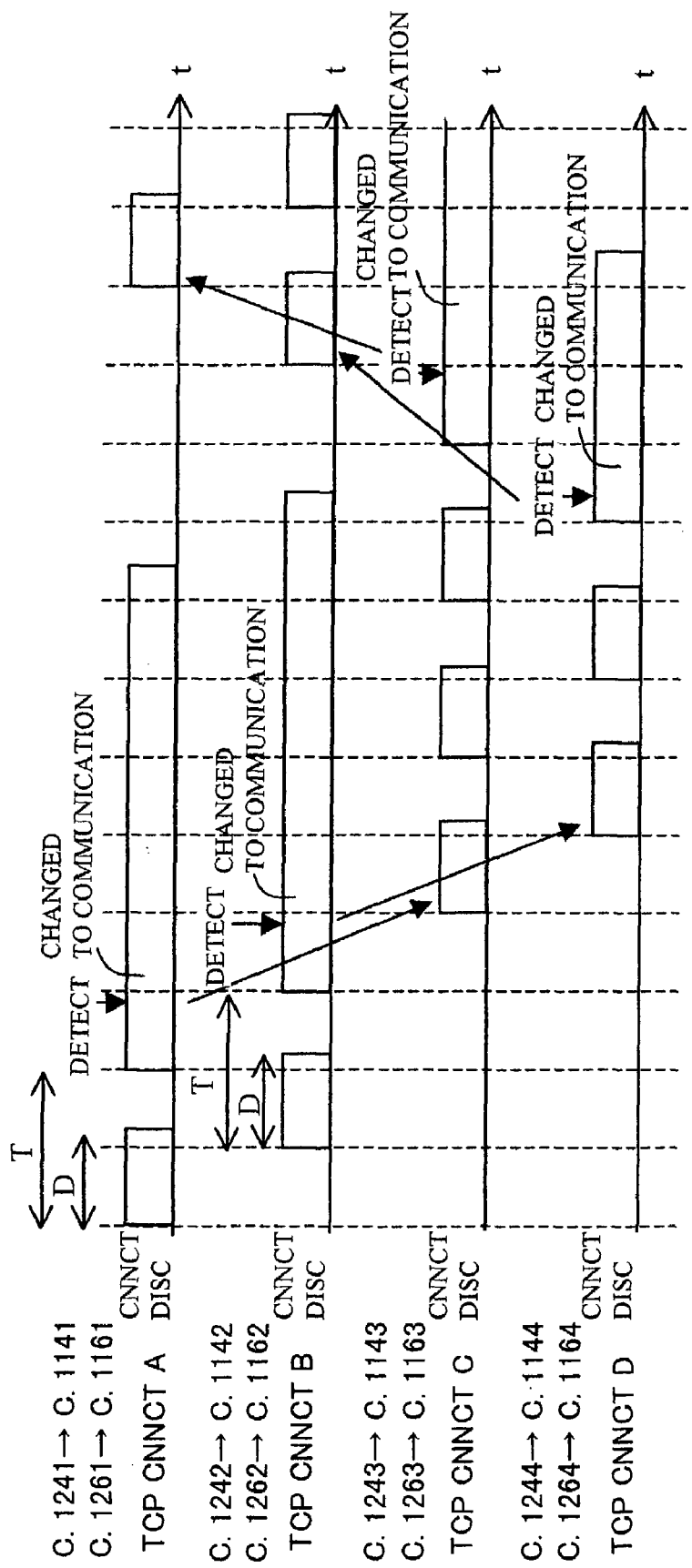
FIG. 36 shows a time chart of TCP connections which are intermittently or periodically established with two of the SIG. C. components by two of the SIG. C. relay components, and with two of the MM. C. components by two of the MM. C. relay components.

FIG. 36 shows a time chart of TCP connections 916 and 936 (A to D) which are intermittently or periodically (period T) established with two of the SIG. C. components 1141 to 1144 by two of the SIG. C. relay components 1241 to 1244, and with two of the MM. C. components 1161 to 1164 by two of the MM. C. relay components 1261 to 1264. A disconnected state for at least a few milli-seconds is produced between adjacent duration intervals (D) in the intermittent or periodic TCP connections. Each of the SIG. C. relay components 1241 to 1244, and each of the SIG. C. components 1141 to 1144 may change an IP addresses and a port number between successive intermittent TCP connection duration intervals (D). As the duration D of each of the TCP connections is shorter, the security of the intranet is higher.

On the other hand, in the MM. C. relay server 120, two of the MM. C. relay components 1261 to 1264 of the MM. C.

relay section 126 intermittently or periodically establish the TCP connections 926 and 928 (A and B) with two of the MM. C. components 1161 to 1164 of the MM. C. section 116 in an alternate manner, and monitor and detect the presence of a received multimedia data stream in the MM. C. component 1161 on the respective TCP connections 926 and 928 (A and B). Two of the MM. C. relay components 1261 to 1264, and two of the MM. C. components 1161 to 1164 operate in the same manner as one of the MM. C. relay components 1261 to 1264 of FIG. 33.

Thus, two of the MM. C. relay components 1261 to 1264 are used to establish the TCP connections 926 (A to D) are established at intermittent or periodic timings with two of the MM. C. components 1161 to 1164, the presence of a multimedia data stream in the external terminal 240 or 270 in the MM. C. components 1161 to 1164 is monitored and detected on the TCP connections 926 (A-D), the TCP connection 926 (A-D) is changed in response to the presence of received multimedia data stream to the TCP connection 936 (A-D) for multimedia communication, and the TCP connection is maintained until the call is released.

Figure 37:
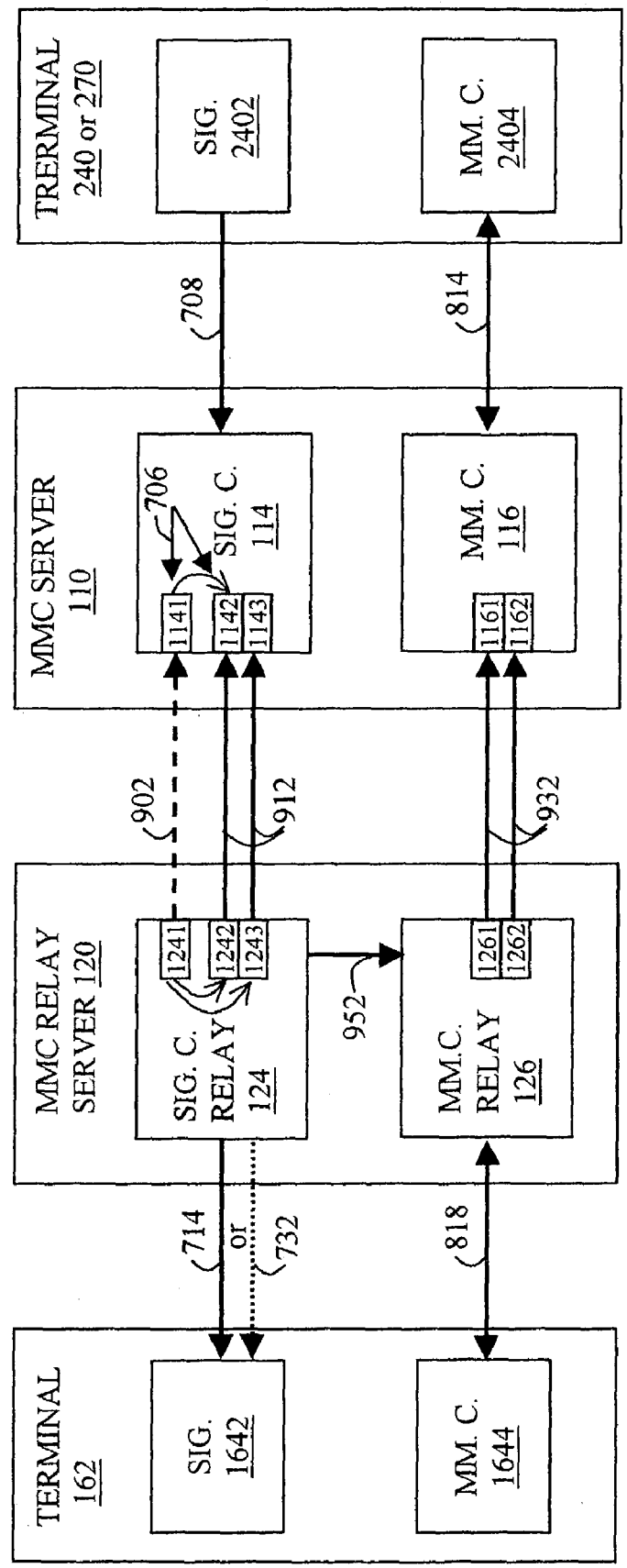
FIG. 37 shows a still further modification of the signaling procedures and the multimedia communication procedures shown in FIG. 29.

FIG. 37 shows a modification of the signaling procedure and the multimedia communication procedure shown in FIG. 29. The signaling procedure is similar to that of FIG. 29.

Referring to FIG. 37, in response to the detection of a call connection request by the external terminal 240 or 270 in the SIG. C. component 1141 on the established intermittent or periodic TCP connection 902, the SIG. C. relay component 1241 of the SIG. C. relay section 124 further provides a multimedia communication start request 952 to the one MM. C. relay component 1261, and establishes the TCP connection 932 for multimedia communication with the MM. C. component 1161. After that, the multimedia data stream 816 is transmitted and received between the MM. C. server 110 and the MM. C. relay server 120 over the TCP connection 812 or 822 or the UDP connection 832 (FIGS. 26 to 28), and the multimedia data stream 818 is transmitted and received between the MM. C. relay server 120 and the terminal 162 over the UDP connection 806.

Similarly the other TCP connection 932 for multimedia communication is established between the MM. C. server 110 and the MM. C. relay server 120 in FIG. 37.

Figure 38:
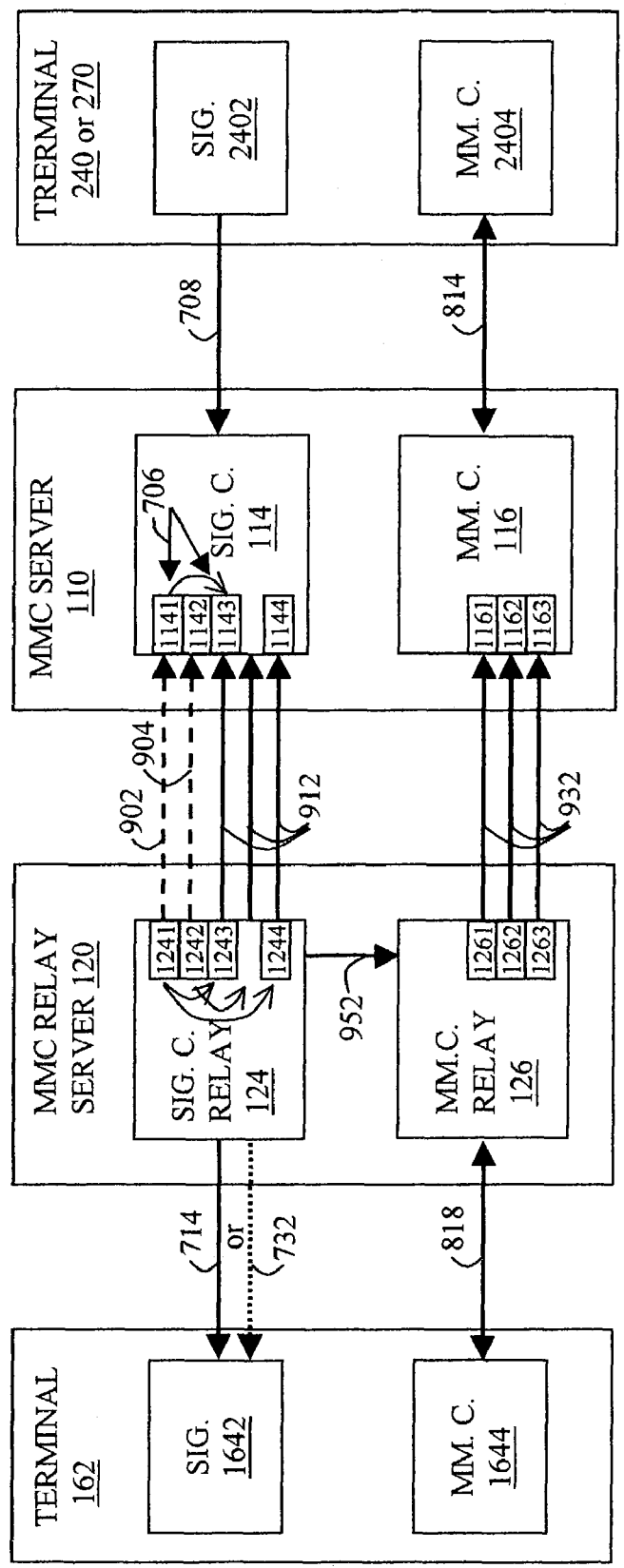
FIG. 38 shows a still further modification of the signaling procedures and the multimedia communication procedures shown in FIG. 31.

FIG. 38 shows a modification of the signaling procedure and the multimedia communication procedure shown in FIG. 31. The signaling procedure is similar to that of FIG. 31.

Referring to FIG. 38, in response to the reception of the signaling message indicative of a call termination request, from the corresponding one of the SIG. C. components 1141 and 1142, on the corresponding one of the established intermittent or periodic TCP connections 902 and 904, one of the two SIG. C. relay components 1241 and 1242 of the SIG. C. relay section 124 further provides the multimedia communication start request 952 to the MM. C. relay component 1261, and causes the TCP connection 932 for multimedia communication to be established with the MM. C. component 1161. After that, the multimedia data stream 816 is transmitted and received between the MM. C. server 110 and the MM. C. relay server 120 over the TCP connection 812 or 822 or the UDP connection 832 (FIGS. 26 to 28), and the multimedia data stream 818 is transmitted and received between the MM. C. relay server 120 and the terminal 162 over the UDP connection 806.

Similarly, the other TCP connection 932 for multimedia communication is established between the MM. C. server 110 and the MM. C. relay server 120 in FIG. 38.

Figure 39:
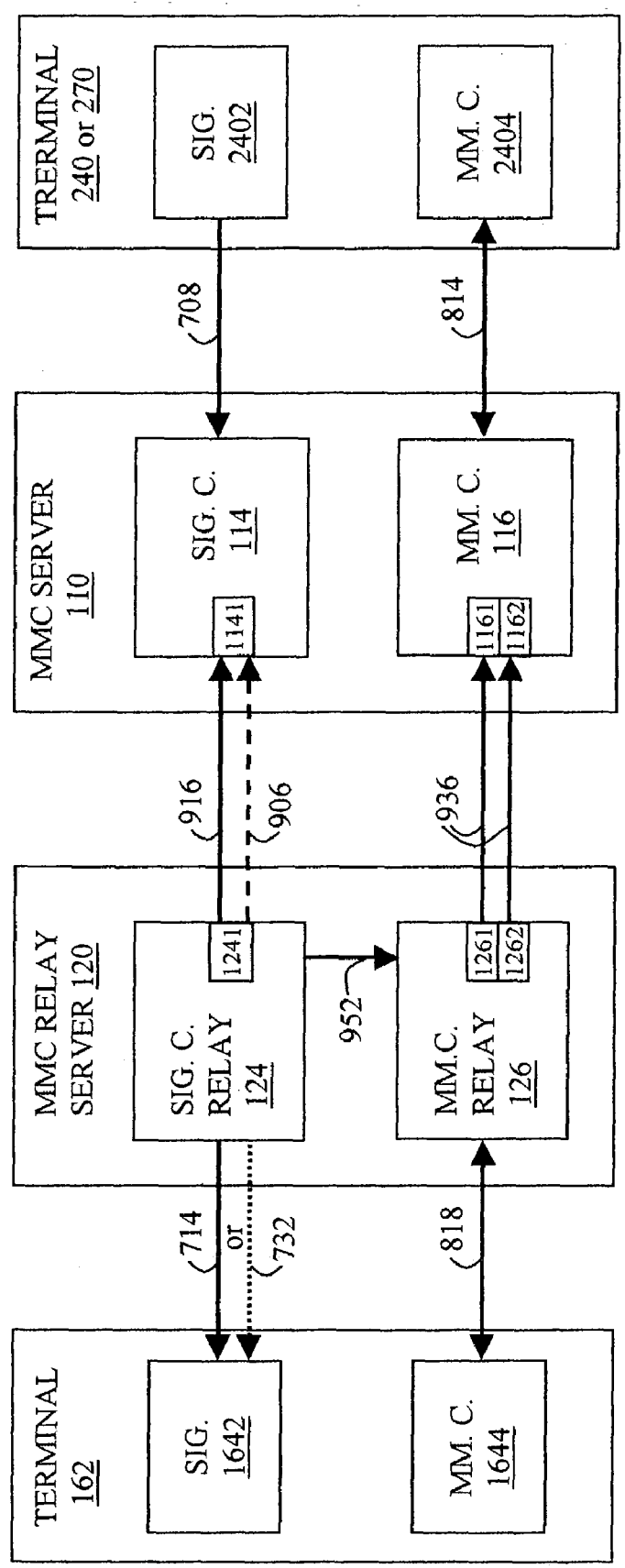
FIG. 39 shows a still further modification of the signaling procedures and the multimedia communication procedures shown in FIG. 33, in accordance with the invention.

FIG. 39 shows a modification of the signaling procedure and the multimedia communication procedure shown in FIG. 33. The signaling procedure is similar to that of FIG. 33.

Referring to FIG. 39, in response to the detection of a call connection request by the external terminal 240 or 270 in the SIG. C. section 114 on the established intermittent or periodic TCP connection 906, the SIG. C. relay component 1241 of the SIG. C. relay section 124 further provides the multimedia communication start request 952 to the one MM. C. relay component 1261, and establishes the TCP connection 936 for multimedia communication with the MM. C. component 1161. After that, the multimedia data stream 816 is transmitted and received between the MM. C. server 110 and the MM. C. relay server 120 over the TCP connection 812 or 822 or the UDP connection 832 (FIGS. 26 to 28), and the multimedia data stream 818 is transmitted and received between the MM. C. relay server 120 and the terminal 162 over the UDP connection 806.

Similarly, the other TCP connection 936 for multimedia communication is established between the MM. C. server 110 and the MM. C. relay server 120 in FIG. 39.

Figure 40:
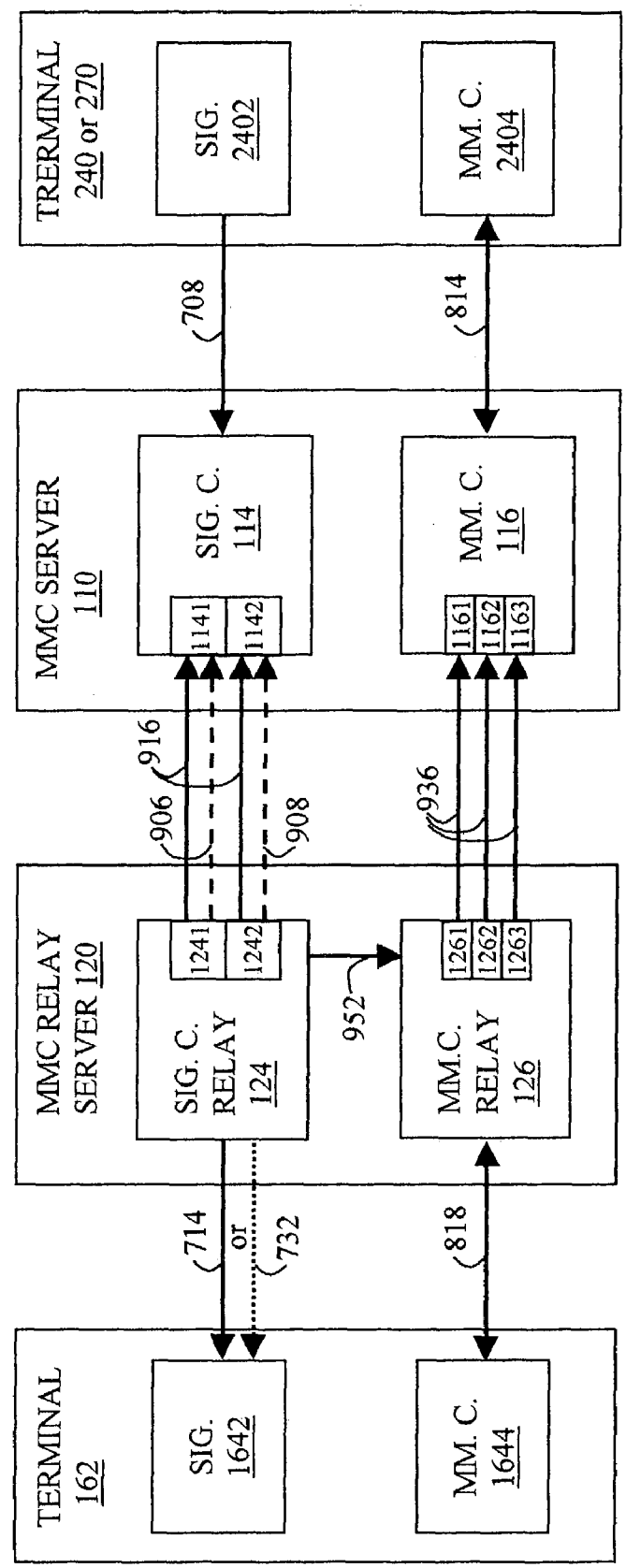
FIG. 40 shows a still further modification of the signaling procedures and the multimedia communication procedures shown in FIG. 35, in accordance with the invention.

FIG. 40 shows a modification of the signaling procedure and the multimedia communication procedure shown in FIG. 35. The signaling procedure is similar to that of FIG. 31.

Referring to FIG. 40, in response to the detection of a call connection request by the external terminal 240 or 270 of the corresponding one of the SIG. C. components 1141 and 1142 on the corresponding one of the established intermittent or periodic TCP connections 906 and 908, one of the two SIG. C. relay components 1241 and 1242 of the SIG. C. relay section 124 further provides the multimedia communication start request 952 to the MM. C. relay component 1261, and establishes the TCP connection 936 for multimedia communication with the MM. C. component 1161. After that, the multimedia data stream 816 is transmitted and received between the MM. C. server 110 and the MM. C. relay server 120 over the TCP connection 812 or 822 or the UDP connection 832 (FIGS. 26 to 28), and the multimedia data stream 818 is transmitted and received between the MM. C. relay server 120 and the terminal 162 over the UDP connection 806.

Similarly, the other TCP connection 936 for multimedia communication is established between the MM. C. server 110 and the MM. C. relay server 120 in FIG. 39.

Figure 41:
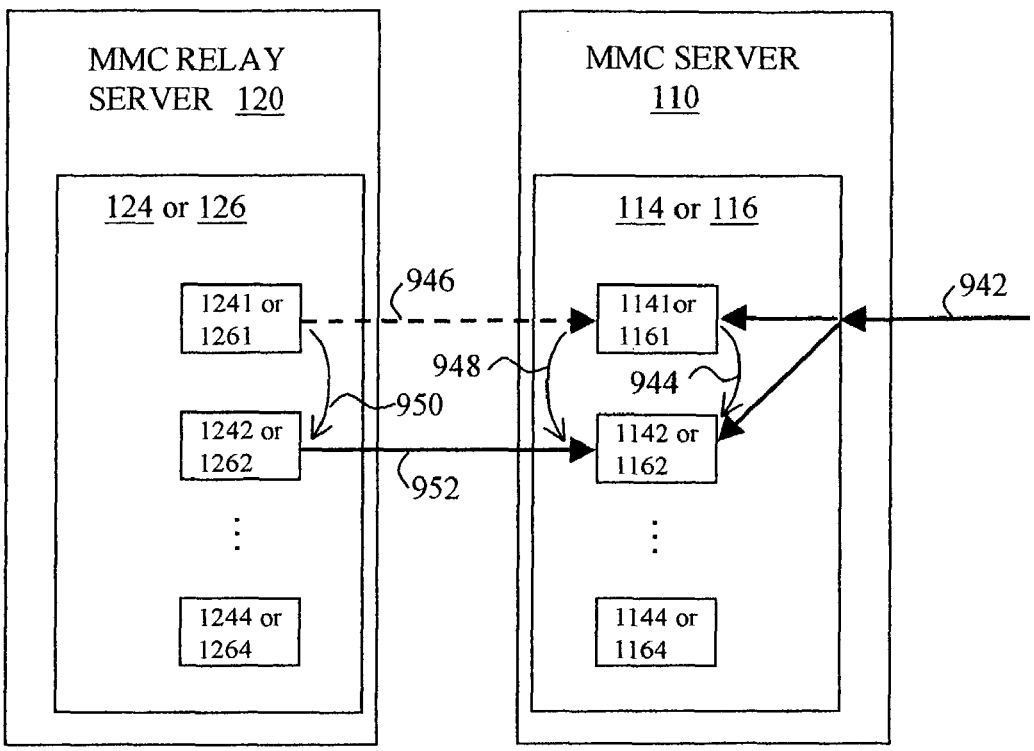
FIG. 41 shows a modification of the signaling procedure and the multimedia communication procedure between the MM. C. server and MM. C. relay server in FIGS. 29 to 40, in accordance with the invention.
Figure 42:
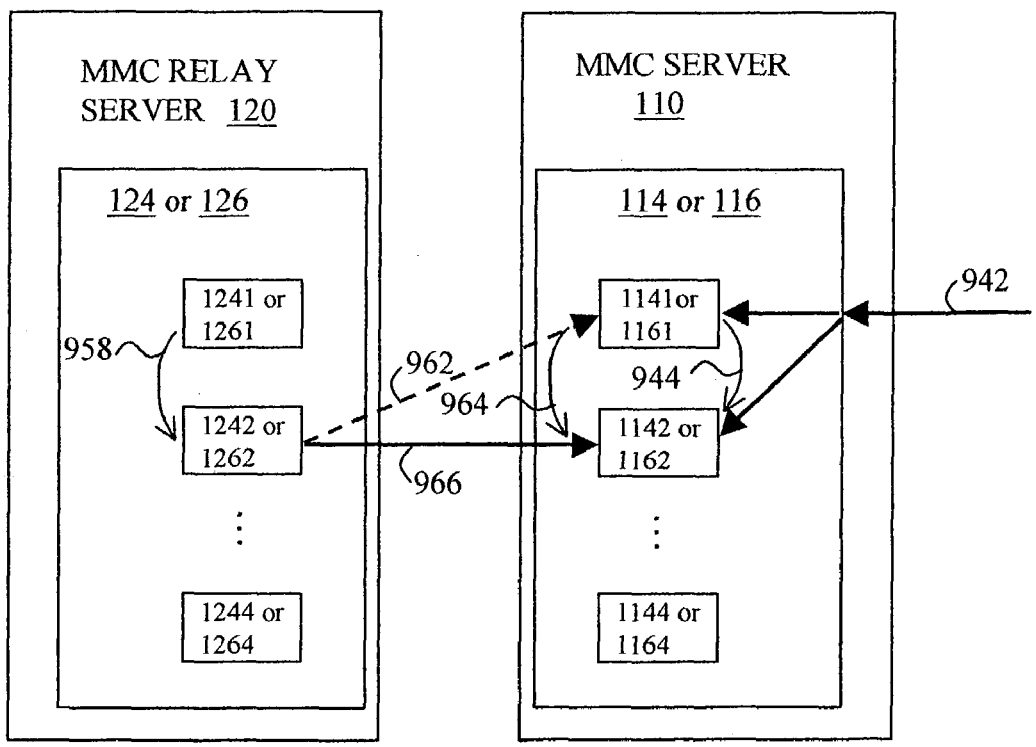
FIG. 42 shows another modification of the signaling procedure and the multimedia communication procedure between the MM. C. server and MM. C. relay server in FIGS. 29 to 40, in accordance with the invention.
Figure 43:
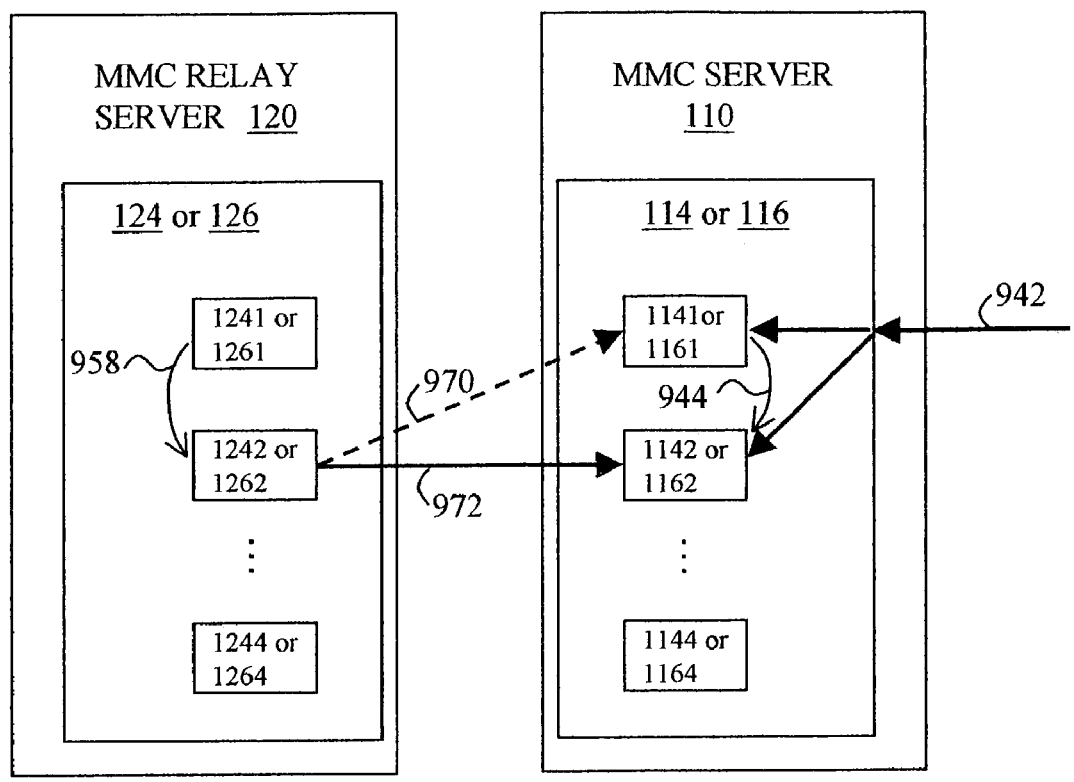
FIG. 43 shows another modification of the signaling procedure and the multimedia communication procedure between the MM. C. server and MM. C. relay server in FIGS. 29 to 40, in accordance with the invention.

FIG. 41 shows a modification of establishment of the connection for signaling or multimedia communication between the MM. C. relay server 120 and the MM. C. server 110 in FIGS. 29 to 40, in accordance with the invention. FIGS. 42 and 43 show other modifications of establishment of the connection for signaling or multimedia communication between the servers.

Referring to FIG. 41, for the signaling, the component 1141 passes a connection 942 (944) to the component 1142 in response to the reception of a signaling message indicative of a call connection request by the external terminal 240 or 270 on the connection 942. The component 1241 establishes an intermittent or periodic connection 946 with the component 1141, and monitors and detects the presence of a call connection request in the component 1141. When there is a call connection request, the component 1141 informs the component 1241 of the presence of a call connection request and the information of the component 1142, and passes the connection 946 to the component 1142 (948). The component 1241 changes the connection 946 to a connection 952 for signaling, and passes it to the component 1242 (950). In this way, the connection 952 for signaling is established between the component 1242 and the component 1162. Similarly, another connection 952 is established between the other components 1244 and 1144.

For multimedia communication, the component 1161 passes (944) the connection 942 to the component 1162 in response to the reception of multimedia data stream information from the external terminal 240 or 270 on the connection 942. The component 1261 establishes the intermittent or periodic connection 946 with the component 1161, and monitors and detects the presence of a received multimedia data stream in the component 1161. When there is a received multimedia data stream, the component 1161 informs the component 1261 of the presence of a received multimedia data stream and the information of the component 1162, and passes (948) the connection 946 to the component 1162. The component 1261 changes the connection 946 to a connection 952 for multimedia communication, and passes it to the component 1262 (950). In this way, the connection 952 for multimedia communication is established between the component 1262 and the component 1162. Similarly, another connection 952 is established between the other components 1264 and 1164.

Referring to FIG. 42, for the signaling, the component 1141 passes a connection 942 to the component 1142 (944) in response to the reception of a signaling message indicative of a call connection request by the external terminal 240 or 270 on the connection 942. The component 1241 causes the component 1242 which is currently free, to establish an intermittent or periodic connection 962 with the component 1141, and monitor and detect the presence of a call connection request in the component 1141 (958). When there is a call connection request, the component 1141 informs the component 1242 of the presence of a call connection request and the information of the component 1142, and passes the connection 962 to the component 1142 (948). The component 1242 changes the connection 962 to a connection 966 for signaling (964). In this way, the connection 966 for signaling is established between the component 1242 and the component 1162. Similarly, another connection 966 is established between the other components 1244 and 1144.

For multimedia communication, the component 1161 passes (944) the connection 942 to the component 1162 in response to the reception of multimedia data stream information from the external terminal 240 or 270 on the connection 942. The component 1261 causes the component 1262 to establish the intermittent or periodic connection 962 with the component 1161, and monitor and detect the presence of a received multimedia data stream in the component 1161 (958). When there is a received multimedia data stream, the component 1161 informs the component 1261 of the presence of a received multimedia data stream and the information of the component 1162, and passes the connection 962 to the component 1162 (964). The component 1262 changes the connection 966 to a connection 962 for multimedia communication. In this way, the connection 966 for multimedia communication is established between the component 1262 and the component 1162. Similarly, another connection 966 is established between the other components 1262 and 1164.

Referring to FIG. 43, with respect to the signaling, the component 1141 passes the connection 942 to the component 1142 (944) in response to the reception of a signaling message indicative of a call connection request by the external terminal 240 or 270 on the connection 942. The component 1241 causes the component 1242 which is not currently used, to establish an intermittent or periodic connection 970 with the component 1141, and monitor and detect the presence of a call connection request in the component 1141 (958). When there is a call connection request, the component 1141 informs the component 1242 of the presence of a call connection request and the information of the component 1142. The component 1242 establishes a connection 972 for signaling aside from the connection 970. In this way, the connection 972 for signaling is established between the component 1242 and the component 1162. Similarly, another connection 972 is established between the other components 1244 and 1144.

For multimedia communication, the component 1161 passes the connection 942 to the component 1162 (944) in response to the reception of multimedia data stream information from the external terminal 240 or 270 on the connection 942. The component 1261 causes the component 1262 to establish the intermittent or periodic connection 970 with the component 1161, and monitor and detect the presence of a received multimedia data stream in the component 1161 (958). When there is a received multimedia data stream, the component 1161 informs the component 1262 of the presence of a received multimedia data stream and the information of the component 1162. The component 1262 establishes the connection 972 for multimedia communication which is different from the connection 970. In this way, the connection 972 for multimedia communication is established between the component 1262 and the component 1162. Similarly, another connection 972 is established between the other components 1264 and 1164.

The inventors have recognized that, in order to prevent the above-discussed an undesirable access, an electronic mail containing a connection request can be sent as required from the MM. C. server 110 to the MM. C. relay server 120, a TCP connection can be established in accordance with the connection request in the electronic mail, and a call can be established over the established TCP connection.

Figure 44:
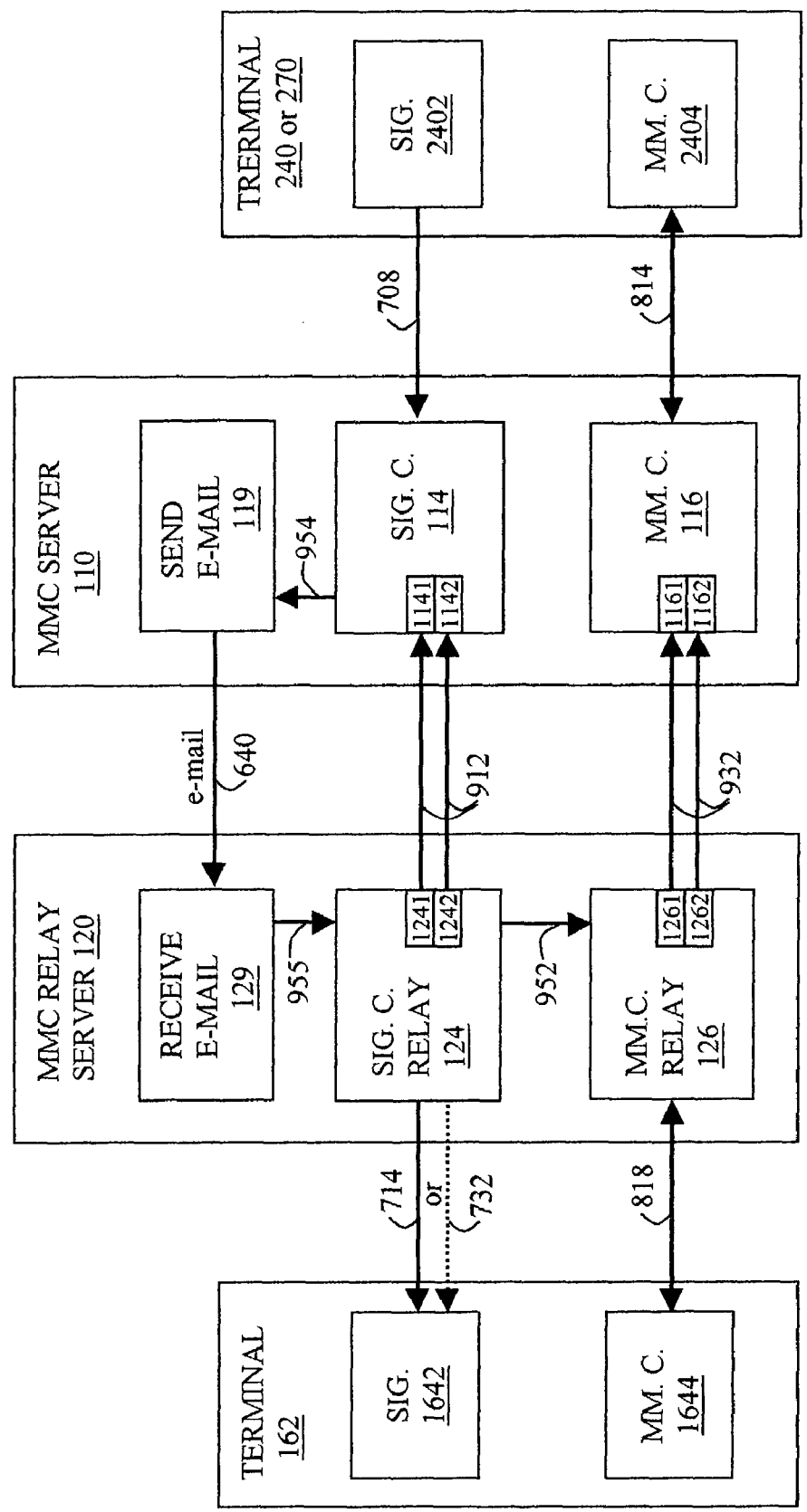
FIG. 44 shows a still further modification of the signaling procedure and the multimedia communication procedure of FIG. 37.

FIG. 44 shows a further modification of the signaling procedure and the multimedia communication procedure of FIG. 37. The multimedia communication procedure is similar to that of FIG. 37. The MM. C. server 110 further comprises an electronic mail transmitting section 119. The MM. C. relay server 120 further comprises an electronic mail receiving section 129.

Referring to FIG. 44, in the MM. C. server 110, when the SIG. C. component 1141 of the SIG. C. section 114 receives the signaling message 708 from the terminal 240 or 270 (the signaling section 2402), the SIG. C. component provides a connection request 954 to the electronic mail transmitting section 119 of the MM. C. server 110. The electronic mail transmitting section 119 transmits an electronic mail containing the connection request to the electronic mail receiving section 129 of the MM. C. relay server 120 through another communication path 640 for an electronic mail and the like. In response to the reception of the electronic mail containing the connection request, the electronic mail receiving section 129 sends a connection request 955 to the SIG. C. relay component 1241. In response to the reception of the connection request 955, the SIG. C. relay component 1241 establishes a TCP connection 912 with the SIG. C. component 1141, and receives a signaling message 912 indicative of a call connection request from the SIG. C. component 1141 over the TCP connection 912. Similarly, another TCP connection 912 between the other SIG. C. relay component 1242 and the other SIG. C. component 1142 is established.

The electronic mail may further contain information of a signaling message from the SIG. C. component 1241, i.e., information required for media communication between the MM. C. server 110 and the MM. C. relay server 120, i.e., the IP address and the port number which are used for the media communication by the MM. C. server 110, and the type of the media of the service or communication (for example, only audio, audio and video, or the like) which is requested by the server 110, i.e., the type of the service or communication which is requested by the terminal 240 or 270. The subsequent communication procedure is similar to that of FIG. 37.

Figure 45:
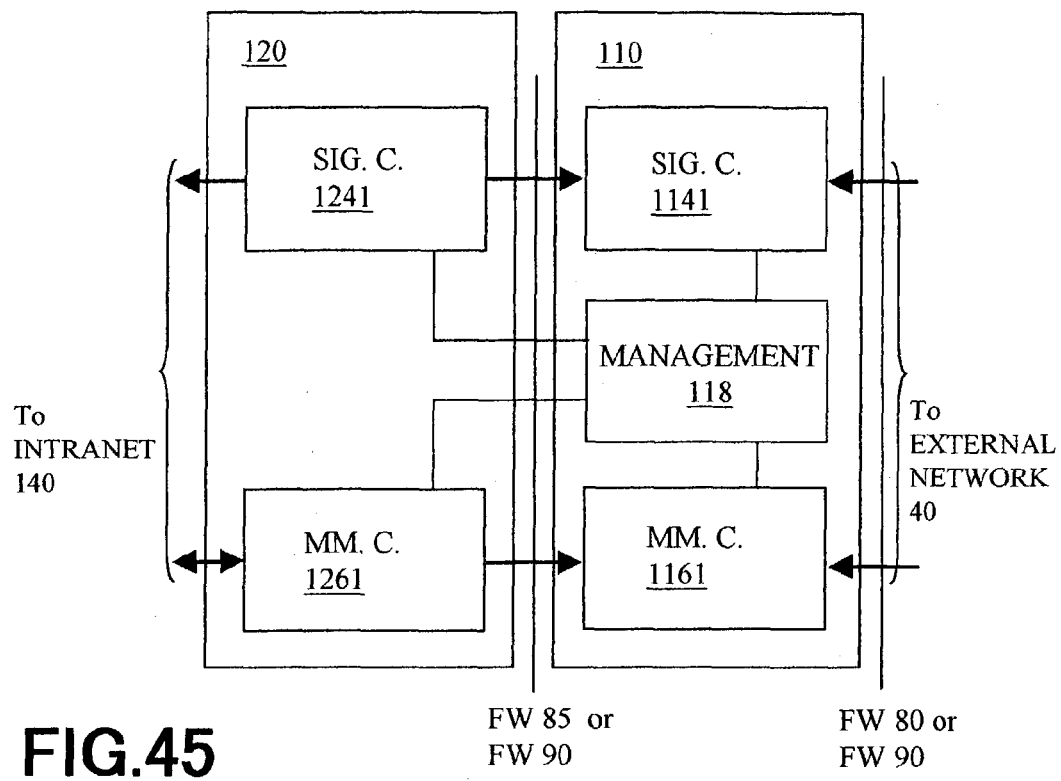
FIG. 45 shows the configurations of the MM. C. server installed in the DMZ and the MM. C. relay server connected to the MM. C. server via the firewall, where the communication procedures of FIGS. 22 and 26 are used.

FIG. 45 shows the configuration of the MM. C. server 110 and the MM. C. relay server 120, where the communication procedures of FIGS. 22 and 26 are used as an example. In this case, the MM. C. server 110 is placed in the DMZ 100 and connected to the external network 40 via the firewall (FW 80 of FIG. 1 or FW 90 of FIG. 2). The MM. C. relay server 120 is connected to the server 110 via the firewall (FW 85 of FIG. 1 or FW 90 of FIG. 2). In the figure, the unidirectional arrows indicate the directions of TCP connections, and the bidirectional arrows indicate bidirectional UDP connections.

The firewall (80 or 90) between the external network 40 and the MM. C. server 110 in the DMZ 100 provides additional filtering rules which permit a TCP connection conforming to following conditions (A1. 1) and (A1. 2) for designated machines and ports.

(A1. 1) For signaling,
a source address is an IP address of any machine, and source ports are its any one or more ports; and
a destination address is an IP address of a machine installed in the DMZ, and destination ports are its one port for the SIP or its two ports for H.323.

(A1. 2) For multimedia communication,
a source address is an IP address of any machine, and source ports are its any one or more ports; and
a destination address is an IP address of a machine installed in the DMZ, and destination ports are its at least two ports. For example, four ports are required, when the multimedia communication includes media communication for audio and video.

The firewall (85 or 90) between the MM. C. server 110 in the DMZ 100 and the MM. C. relay server 120 connected to the intranet 140 provides additional filtering rules which permit a TCP connection conforming to following conditions (B1. 1) to (B1. 3) for designated machines and ports.

(B1. 1) For signaling,
a source address is an IP address of an MM. C. relay server configured to the intranet, and source ports are its any one or more ports; and
a destination address is an IP address of a machine installed in the DMZ, and destination ports are its two ports.

(B1. 2) For multimedia communication,
a source address is an IP address of an MM. C. relay server, and source ports are its any one or more ports; and
a destination address is an IP address of a machine installed in the DMZ, and destination ports are its at least two ports.

(B1. 3) For management,
a source address is an IP address of any machine, and source ports are its any one or more ports; and
a destination address is an IP address of a machine installed in the DMZ, and a destination port is its one port.

When the external network terminal 240 or 270 operates in accordance with the RTP, the firewall (80 or 90) between the external network 40 and the MM. C. server 110 in the DMZ 100 provides additional filtering rules which permit a UDP packet, which conforms to following conditions (A2. 1) and (A2. 2) for designated machines and ports, to pass through the firewall.

(A2. 1) For signaling,
a source address is an IP address of any machine, and source ports are its any one or more ports; and
a destination address is an IP address of a machine installed in the DMZ, and destination ports are its one port for the SIP or two ports for H.323.

(A2. 2) For multimedia communication,
a source address is an IP address of any machine, and source ports are its any or more ports, and
a destination address is an IP address of a machine installed in the DMZ, and destination ports are its any one or more ports; and
a source address is an IP address of a machine installed in the DMZ, and source ports are its any one or more ports, and
a destination address is an IP address of any machine, and destination ports are its any one or more ports. When the RTP is used, the firewalls must permit multimedia data streams to pass through more ports.

Figure 46:
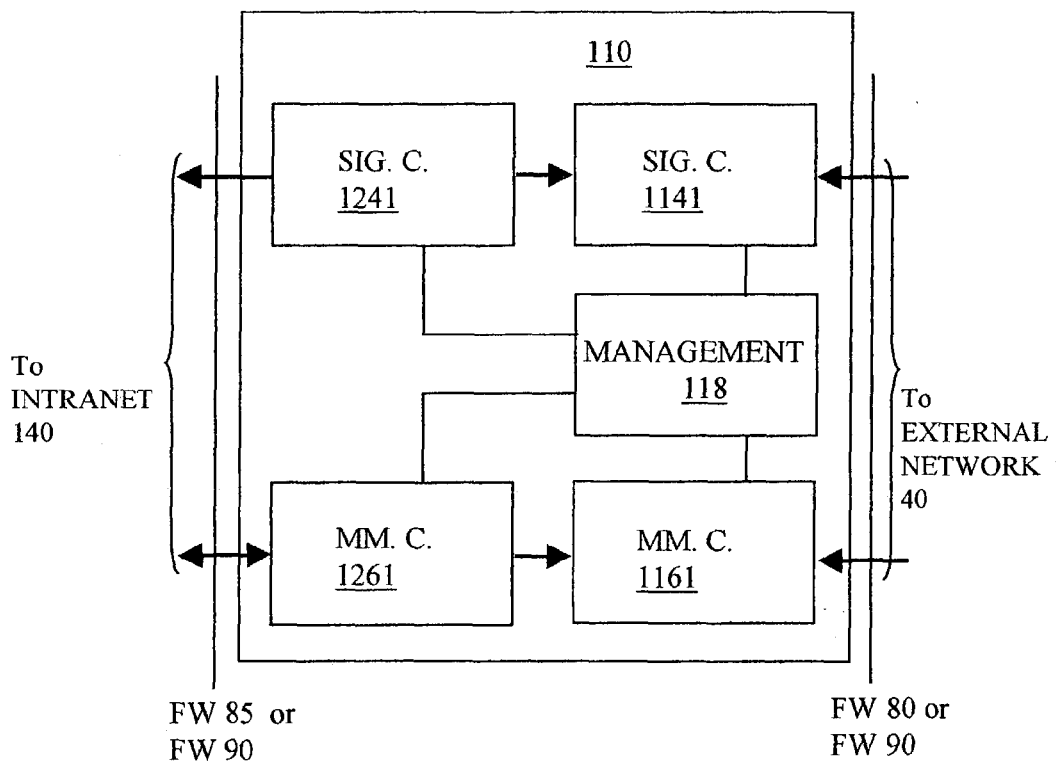
FIG. 46 shows the configuration of the MM. C. server, which is installed in the DMZ, and into which the function of an MM. C. relay server is incorporated, where the communication procedures of FIGS. 22 and 26 are used.

FIG. 46 shows the configuration of the MM. C. server 110, which is installed in the DMZ 100, and into which the function of an MM. C. relay server is incorporated, where the communication procedures of FIGS. 22 and 26 are used as an example. In this configuration, the number of machines can be reduced and the installation cost can be reduced. However, TCP/UDP communication between the intranet terminals and the machine installed in the DMZ must be permitted, and hence there arises a problem whether or not this configuration is acceptable in light of the security of the intranet.

The firewall (FW 80 or 90) between the network 40 and the MM. C. server 110 which is installed in the DMZ 100, and into which the an MM. C. relay server function is incorporated, provides additional filtering rules which permit a TCP connection conforming to the conditions (A1. 1) and (A1. 2), or a TCP connection conforming to the conditions (A2. 1), and permit a UDP packet conforming to the condition (A2. 2) to pass through the firewall.

The firewall (85 or 90) between the intranet 140 and the MM. C. server 110 which is installed in the DMZ 100, and into which the function of an MM. C. relay server is incorporated, provides additional filtering rules which permit a TCP connection conforming to the following conditions (B3. 1) for designated machines and ports, and a UDP packet conforming to the following conditions (B3. 2) for designated machines and ports, to pass through the firewall.

(B3. 1) For signaling,
a source address is an IP address of any intranet terminal, and source ports are its any one or more ports; and
a destination address is an IP address of a machine installed in the DMZ, and destination ports are its at least two ports.

(B3. 2) For multimedia communication,
a source address is an IP address of an IP address of any intranet terminal, and source ports are its any one or more ports, and
a destination address is an IP address of a machine installed in the DMZ, and destination ports are its any one or more ports; and
a source address is an IP address of a machine installed in the DMZ, and source ports are its any one or more ports, and
a destination address is an IP address of any intranet terminal, and destination ports are its any one or more ports.

In the configuration of FIG. 46, the firewalls 85 and 90 must permit a wider range of different signals and data streams to pass through the ports.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An information processing apparatus which can be installed in a DMZ and is connectable to an intranet through a first firewall and to an external network through a second firewall, the information processing apparatus comprising:
   a first processing unit for pre-establishing a first connection from the intranet through the first firewall to the first processing unit, and then transmitting or receiving, over the first connection and the intranet, a first signaling message for establishing a call, in accordance with an H.323 standard or a Session Initiation Protocol (SIP), and transmitting or receiving a second signaling message for establishing a call in accordance with the H.323 standard or the SIP, over a second connection which is dynamically established through the second fire wall over the external network,
   wherein a transmission of one of the first and second signaling messages occurs in response to a reception of another one of the first and second signaling messages so that the one of the first and second signaling messages is associated with the another one of the first and second signaling messages, and a reception and a transmission of the another one of the first and second signaling messages cause a call to be established over both of the intranet and the external network via the DMZ; and
   a second processing unit for transmitting and receiving data over the established call via the DMZ through the first and second firewalls,
   wherein, before the transmission or reception of the first signaling message, the first connection with the first processing unit is established by a third processing unit which is connectable to the intranet, and
   wherein the first processing unit causes the third processing unit to transmit or receive a third signaling message for establishing a call to or from a first terminal over the intranet, and transmits or receives the second signaling message to or from a second terminal over the external network, to thereby cause the call to be established between the first terminal and the second terminal.

2. An information processing apparatus according to claim 1, wherein the first processing unit transmits or receives the first signaling message to or from a third processing unit which is connectable to the intranet.

3. A storage medium storing a program thereon for an information processing apparatus, which can be installed in a DMZ and is connectable to an intranet through a first firewall and to an external network through a second firewall, the program being operable to effect:
   pre-establishing a first connection from the intranet through the first firewall to the information processing apparatus, and then transmitting or receiving, over the first connection and the intranet, a first signaling message for establishing a call, in accordance with an H.323 standard or a Session Initiation Protocol (SIP), and transmitting or receiving a second signaling message for establishing a call in accordance with the H.323 standard or the SIP, over a second connection which is dynamically established through the second fire wall over the external network, wherein a transmission of one of the first and second signaling messages occurs in response to a reception of another one of the first and second signaling messages so that the one of the first and second signaling messages is associated with the another one of the first and second signaling messages, and a reception and a transmission of the another one of the first and second signaling messages cause a call to be established over both of the intranet and the external network via the DMZ; and
   transmitting and receiving data over the established call via the DMZ through the first and second firewalls
   wherein, before the transmission or reception of the first signaling message, the first connection with a processing unit is established by another processing unit which is connectable to the intranet, and
   wherein the processing unit causes the another processing unit to transmit or receive a third signaling message for establishing a call to or from a first terminal over the intranet, and transmits or receives the second signaling message to or from a second terminal over the external network, to thereby cause the call to be established between the first terminal and the second terminal.

4. A storage medium according to claim 3, being operable to further effect transmitting a connection response, in response to a connection request by a particular processing unit which is connectable to the intranet, before the transmission or reception of the signaling message.

5. A storage medium according to claim 4, wherein the transmitting or receiving comprises causing a particular processing unit to transmit or receive a signaling message for establishing a call to or from a first terminal over the intranet, and transmitting or receiving the second signaling message to or from a second terminal over the external network, to thereby cause the call to be established between the first terminal and the second terminal.

6. A storage medium according to claim 3, wherein the transmitting or receiving comprises transmitting or receiving the first signaling message to or from a particular processing unit which is connectable to the intranet.

7. A method for communication in a DMZ, which is connectable to an intranet through a first firewall and to an external network through a second firewall, the method comprising:
   pre-establishing a first connection from the intranet through the first firewall to the DMZ, and then transmitting or receiving, over the first connection and the intranet, a first signaling message for establishing a call, in accordance with an H.323 standard or a Session Initiation Protocol (SIP), and transmitting or receiving a second signaling message for establishing a call in accordance with the H.323 standard or the SIP, over a second connection which is dynamically established through the second fire wall over the external network, wherein a transmission of one of the first and second signaling messages occurs in response to a reception of another one of the first and second signaling messages so that the one of the first and second signaling messages is associated with the another one of the first and second signaling messages, and a reception and a transmission of the another one of the first and second signaling messages cause a call to be established over both of the intranet and the external network via the DMZ; and
   transmitting and receiving data over the established call via the DMZ through the first and second firewalls,
   wherein, before the transmission or reception of the first signaling message, the first connection with a processing unit is established by another processing unit which is connectable to the intranet, and
   wherein a processing unit causes another unit to transmit or receive a third signaling message for establishing a call to or from a first terminal over the intranet, and transmits or receives the second signaling message to or from a second terminal over the external network, to thereby cause the call to be established between the first terminal and the second terminal.

8. A method for communication according to claim 7, further comprising transmitting a connection response, in response to a connection request by a particular processing unit which is connectable to the intranet, before the transmission or reception of the first signaling message.

9. A method for communication in a DMZ, which is connectable to an intranet through a first firewall and to an external network through a second firewall, the method comprising:
   pre-establishing a first connection from the intranet through the first firewall to the DMZ, and then establishing a call over the intranet and external network via the DMZ through the first and second fire walls by transferring a signaling message for establishing a call in accordance with an H.323 standard or a Session Initiation Protocol (SIP) via the DMZ over the first connection and over a second connection dynamically established through the second fire wall over the external network to transmit and receive data over the intranet and external network via the DMZ through the first and second firewalls once the call is established,
   wherein, before a transmission or reception of a first signaling message, the first connection with a processing unit is established by another processing unit which is connectable to the intranet, and
   wherein the processing unit causes the another processing unit to transmit or receive a third signaling message for establishing a call to or from a first terminal over the intranet, and transmits or receives the second signaling message to or from a second terminal over the external network, to thereby cause the call to be established between the first terminal and the second terminal.

10. An information processing apparatus which can be installed in a DMZ and is connectable to an intranet through a first firewall and to an external network through a second firewall, comprising:
    a first transmitting/receiving unit which pre-establishes a first connection from the intranet through the first firewall to the first transmitting/receiving unit, and then transmits or receives, over the first connection and the intranet, a first signaling message for establishing a call in accordance with an H.323 standard or a Session Initiation Protocol (SIP), and transmits or receives a second signaling message for establishing a call in accordance with the H.323 standard or the SIP, over a second connection which is dynamically established through the second fire wall over the external network, wherein a transmission of one of the first and second signaling messages occurs in response to a reception of another one of the first and second signaling messages so that the one of the first and second signaling messages is associated with the another one of the first and second signaling messages and a reception and a transmission of the another one of the first and second signaling messages cause a call to be established over both of the intranet and the external network via the DMZ; and
    a second transmitting/receiving unit which transmits and receives data over the established call via the DMZ through the first and second firewalls,
    wherein, before the transmission or reception of the first signaling message, the first connection with a processing unit is established by another processing unit which is connectable to the intranet, and
    wherein the processing unit causes the another processing unit to transmit or receive a third signaling message for establishing a call to or from a first terminal over the intranet, and transmits or receives the second signaling message to or from a second terminal over the external network, to thereby cause the call to be established between the first terminal and the second terminal.

11. A method for communication in a DMZ, the method comprising:
    transmitting or receiving, over a first connection pre-established from an intranet through a first firewall to the DMZ and over the intranet, a first signaling message for establishing a call in accordance with an H.323 standard or a Session Initiation Protocol (SIP), wherein a transmission of the first signaling message associated with a second signaling message for establishing a call occurs in response to reception of the second signaling message so that the reception and the transmission cause a call to be established over both of the intranet and an external network via the DMZ;
    transmitting or receiving, over a second connection dynamically established through a second firewall over the external network, the second signaling message for establishing a call in accordance with the H.323 standard or the SIP, wherein a transmission of the second signaling message associated with the first signaling message occurs in response to a reception of the first signaling message for establishing a call so that the reception and the transmission cause a call to be established over both of the intranet and the external network via the DMZ; and
    transmitting and receiving data over the established call via the DMZ through the first and second firewalls,
    wherein, before the transmission or reception of the first signaling message, the first connection with a processing unit is established by another processing unit which is connectable to the intranet, and
    wherein the processing unit causes the another processing unit to transmit or receive a third signaling message for establishing a call to or from a first terminal over the intranet, and transmits or receives the second signaling message to or from a second terminal over the external network, to thereby cause the call to be established between the first terminal and the second terminal.

* * * * *

UNITED STATES PATENT AND TRADEMARK OFFICE
CERTIFICATE OF CORRECTION

| | | |
|---|---|---|
| PATENT NO. | : 8,055,777 B2 | Page 1 of 1 |
| APPLICATION NO. | : 10/361726 | |
| DATED | : November 8, 2011 | |
| INVENTOR(S) | : Masahide Noda et al. | |

It is certified that error appears in the above-identified patent and that said Letters Patent is hereby corrected as shown below:

Column 35, Line 18, In Claim 1, delete "fire wall" and insert -- firewall --, therefor.

Column 35, Line 61, In Claim 3, delete "fire wall" and insert -- firewall --, therefor.

Column 36, Line 22, In Claim 4, after "the" insert -- first --.

Column 36, Line 48, In Claim 7, delete "fire wall" and insert -- firewall --, therefor.

Column 37, Line 16, In Claim 9, delete "fire walls" and insert -- firewalls --, therefor.

Column 37, Line 21, In Claim 9, delete "fire wall" and insert -- firewall --, therefor.

Column 37, Line 50, In Claim 10, delete "fire wall" and insert -- firewall --, therefor.

Signed and Sealed this
Nineteenth Day of June, 2012

David J. Kappos
*Director of the United States Patent and Trademark Office*